US012591271B2

(12) United States Patent
Yang et al.

(10) Patent No.: US 12,591,271 B2
(45) Date of Patent: Mar. 31, 2026

(54) SCREEN DISPLAY METHOD AND ELECTRONIC DEVICE

(71) Applicant: HONOR DEVICE CO., LTD., Shenzhen (CN)

(72) Inventors: Liu Yang, Shenzhen (CN); Qi Sun, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 59 days.

(21) Appl. No.: 18/026,548

(22) PCT Filed: Aug. 25, 2022

(86) PCT No.: PCT/CN2022/114897
§ 371 (c)(1),
(2) Date: Mar. 15, 2023

(87) PCT Pub. No.: WO2023/116012
PCT Pub. Date: Jun. 29, 2023

(65) Prior Publication Data
US 2024/0295905 A1 Sep. 5, 2024

(30) Foreign Application Priority Data

Dec. 25, 2021 (CN) .......................... 202111606004.0

(51) Int. Cl.
G06F 1/16 (2006.01)
G06F 3/04817 (2022.01)
(Continued)

(52) U.S. Cl.
CPC ........ G06F 1/1647 (2013.01); G06F 3/04817 (2013.01); G06F 3/0482 (2013.01); G06F 3/0488 (2013.01)

(58) Field of Classification Search
None
See application file for complete search history.

(56) References Cited

U.S. PATENT DOCUMENTS 10,901,574 B2 1/2021 Seol
11,630,577 B2 4/2023 Chen et al.
(Continued)

FOREIGN PATENT DOCUMENTS

CN 105721638 A 6/2016
CN 106210307 A 12/2016
(Continued)

OTHER PUBLICATIONS

Skadnetwork, "A class that validates advertisement-driven app installations" https://web.archive.org/web/20210514112135/https://developer.apple.com/documentation/storekit/skadnetwork/, May 14, 2021 (Year: 2021).*
(Continued)

*Primary Examiner* — Matthew Yeung
(74) *Attorney, Agent, or Firm* — WOMBLE BOND DICKINSON (US) LLP

(57) ABSTRACT

This application relates to the field of electronic technologies, provides a screen display method and an electronic device. The screen display method is applied to the electronic device, the electronic device includes a first screen and a second screen, and the method includes: receiving a first operation performed by a user; displaying a first interface on the first screen in response to the first operation, where the first interface includes a first control; receiving a second operation performed by the user; and displaying, in response to the second operation, a service code corresponding to the first control on the second screen. The method can improve portability of a code scanning operation.

20 Claims, 56 Drawing Sheets

CONT.
FROM
FIG. 9b

(51) Int. Cl.
  *G06F 3/0482*  (2013.01)
  *G06F 3/0488*  (2022.01)

(56) References Cited

U.S. PATENT DOCUMENTS

| | | | |
|---|---|---|---|
| 2012/0327106 A1* | 12/2012 | Won | A63F 13/843 |
| | | | 345/173 |
| 2019/0018454 A1* | 1/2019 | Jung | G06F 1/1652 |
| 2019/0138205 A1 | 5/2019 | Wu et al. | |
| 2021/0081158 A1 | 3/2021 | Gong et al. | |
| 2021/0389873 A1* | 12/2021 | Chen | G06F 3/0412 |

FOREIGN PATENT DOCUMENTS

| | | | |
|---|---|---|---|
| CN | 107645611 A | 1/2018 |
| CN | 107943380 A | 4/2018 |
| CN | 109547628 A | 3/2019 |
| CN | 109710132 A | 5/2019 |
| CN | 109739407 A | 5/2019 |
| CN | 109917956 A | 6/2019 |
| CN | 110007844 A | 7/2019 |
| CN | 110134476 A | 8/2019 |
| CN | 112394891 A | 2/2021 |
| CN | 112667074 A | 4/2021 |
| CN | 113518967 A | 10/2021 |
| CN | 113535054 A | 10/2021 |
| WO | 2018034402 A1 | 2/2018 |
| WO | 2018120533 A1 | 7/2018 |

OTHER PUBLICATIONS

Huber, Thomas Claudius, "Calling Windows 10 APIs From Your WPF Application", https://www.thomasclaudiushuber.com/2019/04/26/calling-windows-10-apis-from-your-wpf-application/, Apr. 26, 2019 (Year: 2019).*
OSX Daily, "How to Access Control Center in IOS 15/IOS 14 on Ipad and Iphone", https://osxdaily.com/2018/09/18/access-control-center-ios-12/, Sep. 18, 2018 (Year: 2018).*
GregglesTV, "iPadOS 14 Beta PIP Picture-in-Picture: YouTube, Netflix, Hulu, Disney+", https://www.youtube.com/watch?v=tpvg_E4vOuo, Jun. 23, 2020 (Year: 2020).*
OSX Daily, "How to Customize Control Center on iPhone and iPad", https://osxdaily.com/2018/02/22/customize-control-center-ios/, Feb. 22, 2018 (Year: 200).*
Foxtecc (Foxtecc; "Things I Like about iOS 11"; http://youtube.com/watch?v=0t3P-APD5Pw) (Year: 2017).*

* cited by examiner

CONT.
FROM

TO

TO

CONT.
FROM

TO

TO

CONT.
FROM

CONT. FROM FIG. 8a ~

CONT.
FROM

TO

CONT.
FROM

TO

CONT.
FROM

CONT. FROM FIG. 9c

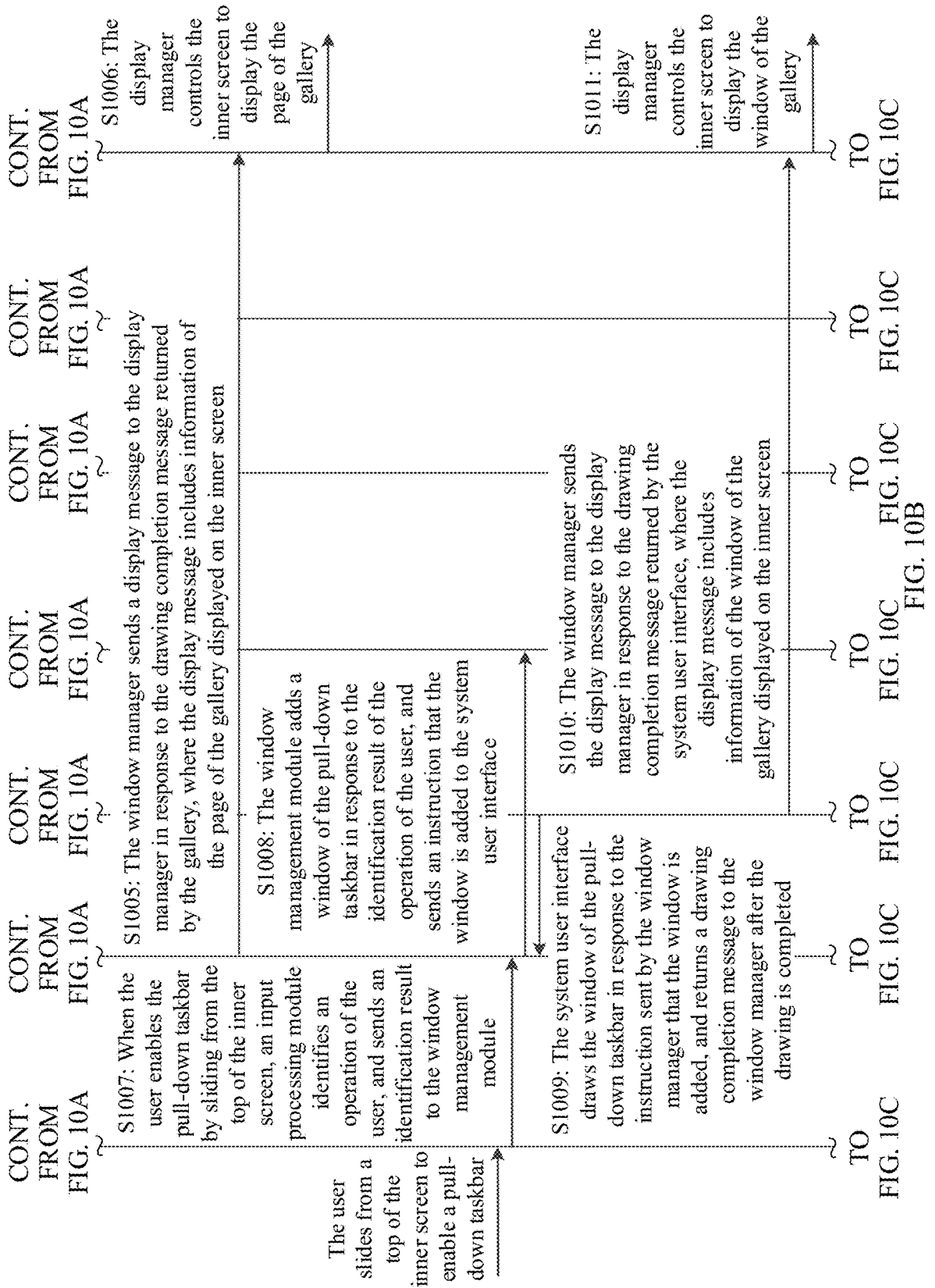

FIG. 10B

S1006: The display manager controls the inner screen to display the page of the gallery S1005: The window manager sends a display message to the display manager in response to the drawing completion message returned by the gallery, where the display message includes information of the page of the gallery displayed on the inner screen S1008: The window management module adds a window of the pull-down taskbar in response to the identification result of the operation of the user, and sends an instruction that the system window is added to the window management module S1007: When the user enables the pull-down taskbar by sliding from the top of the inner screen, an input processing module identifies an operation of the user, and sends an identification result to the window management module The user slides from a top of the inner screen to enable a pull-down taskbar S1009: The system user interface draws the window of the pull-down taskbar in response to the instruction sent by the window manager that the window is added, and returns a drawing completion message to the window manager after the drawing is completed S1010: The window manager sends the display message to the display manager in response to the drawing completion message returned by the system user interface, where the display message includes information of the window of the gallery displayed on the inner screen S1011: The display manager controls the inner screen to display the window of the gallery

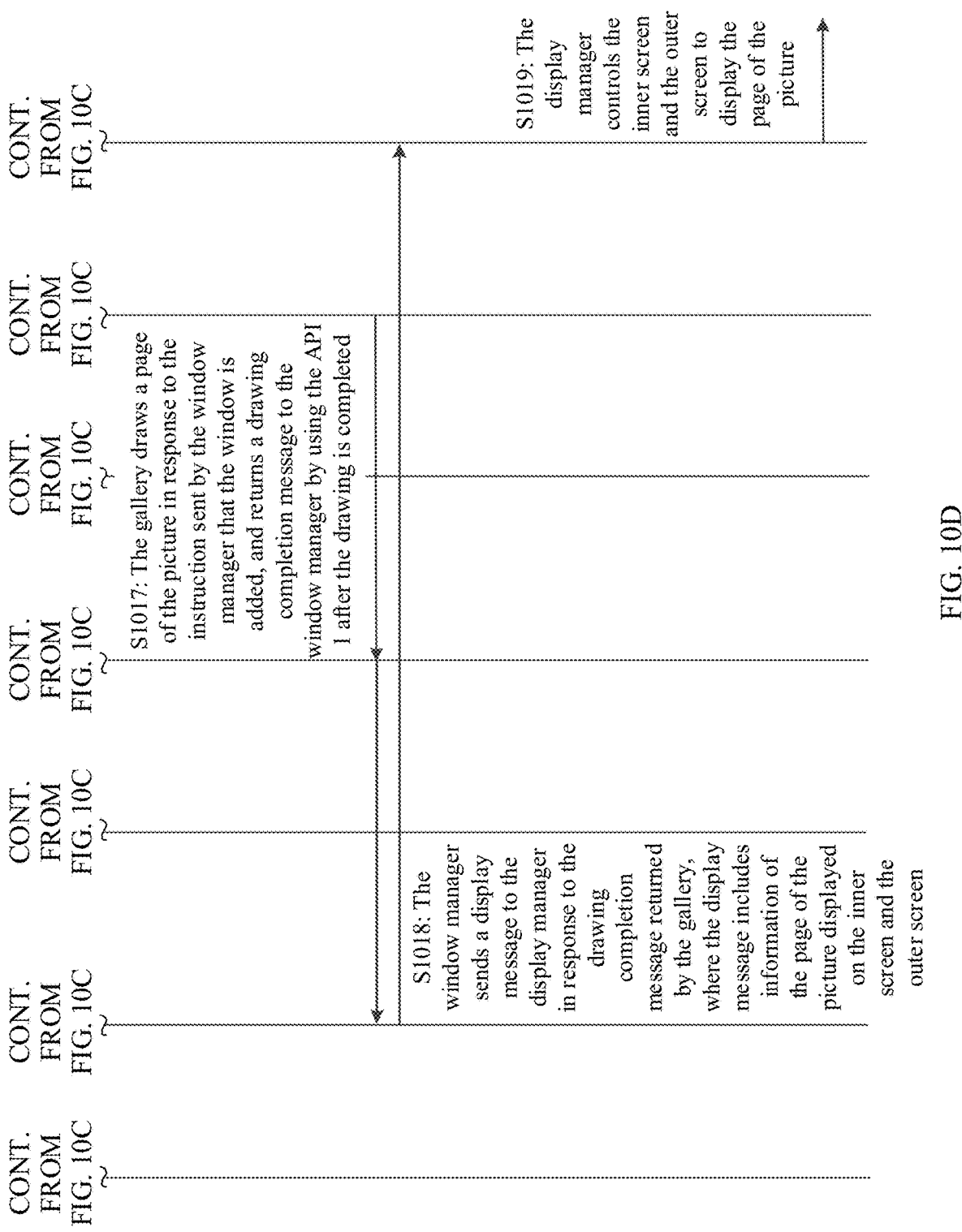

CONT. FROM FIG. 10C

CONT. FROM FIG. 10C

CONT. FROM FIG. 10C

CONT. FROM FIG. 10C

CONT. FROM FIG. 10C

CONT. FROM FIG. 10C

CONT. FROM FIG. 10C

S1017: The gallery draws a page of the picture in response to the instruction sent by the window manager that the window is added, and returns a drawing completion message to the window manager by using the API 1 after the drawing is completed S1018: The window manager sends a display message to the display manager in response to the drawing completion message returned by the gallery, where the display message includes information of the page of the picture displayed on the inner screen and the outer screen S1019: The display manager controls the inner screen and the outer screen to display the page of the picture

FIG. 10D

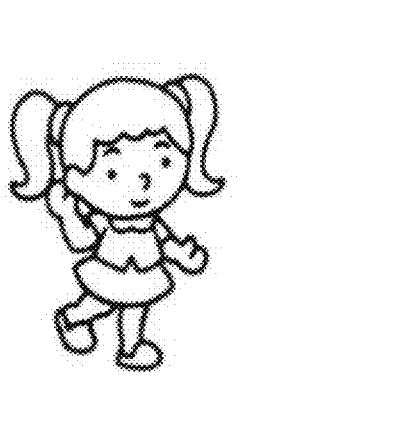
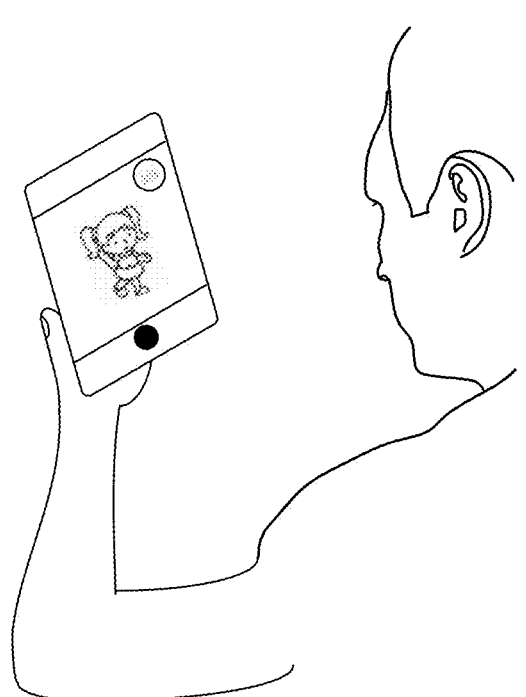
FIG. 11

TO

CONT.
FROM

TO

CONT.
FROM
FIG. 12c ~

TO

CONT.
FROM

TO

CONT.
FROM

TO

CONT.
FROM

TO

CONT.
FROM

TO

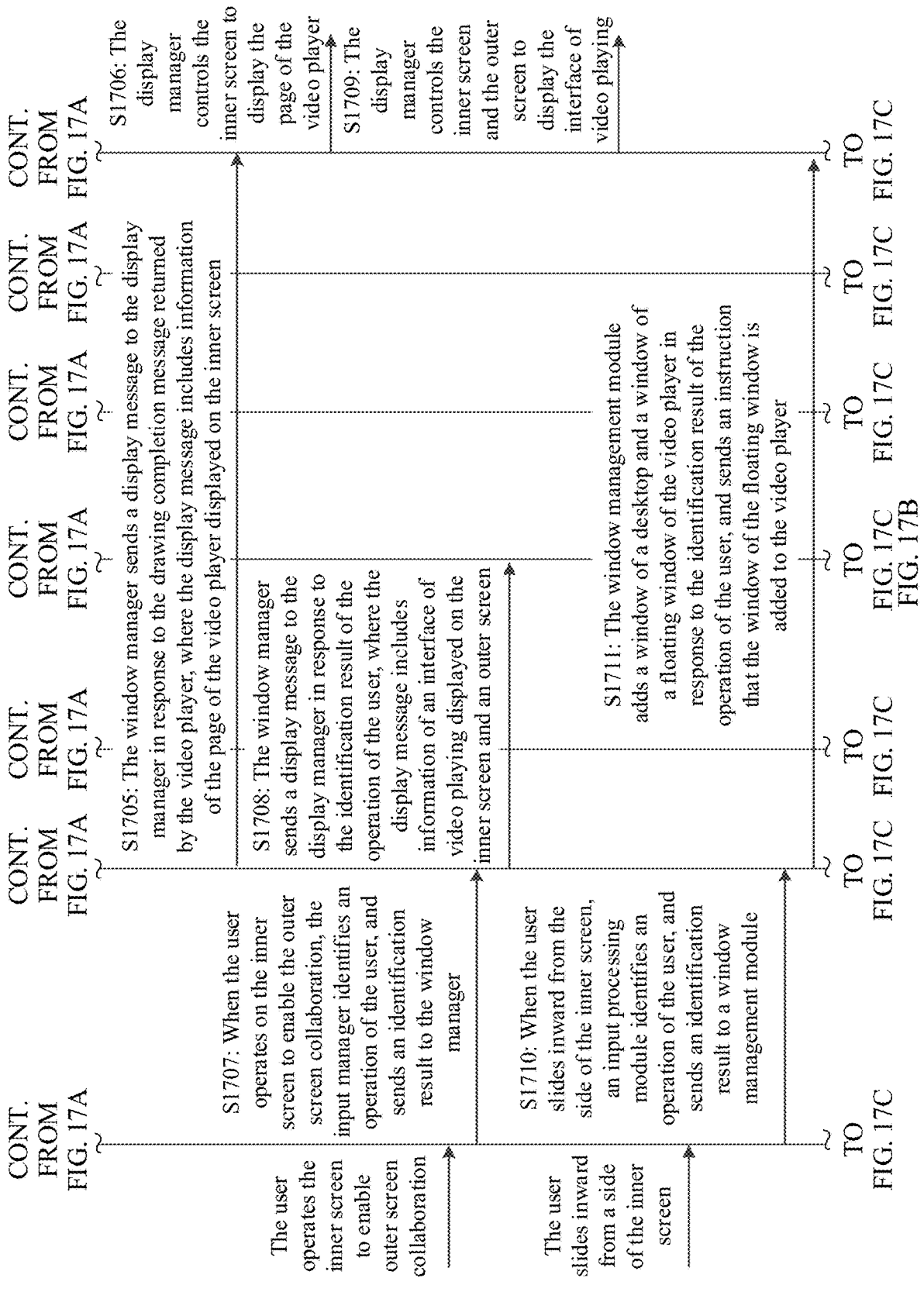

S1705: The window manager sends a display message to the display manager in response to the drawing completion message returned by the video player, where the display message includes information of the page of the video player displayed on the inner screen S1706: The display manager controls the inner screen to display the page of the video player S1707: When the user operates on the inner screen to enable the outer screen collaboration, the input manager identifies an operation of the user, and sends an identification result to the window manager S1708: The window manager sends a display message to the display manager in response to the identification result of the operation of the user, where the display message includes information of an interface of video playing displayed on the inner screen and an outer screen S1709: The display manager controls the inner screen and the outer screen to display the interface of video playing The user operates the inner screen to enable outer screen collaboration S1710: When the user slides inward from the side of the inner screen, an input processing module identifies an operation of the user, and sends an identification result to a window management module S1711: The window management module adds a window of a desktop and a window of a floating window of the video player in response to the identification result of the operation of the user, and sends an instruction that the window of the floating window is added to the video player The user slides inward from a side of the inner screen

FIG. 17B

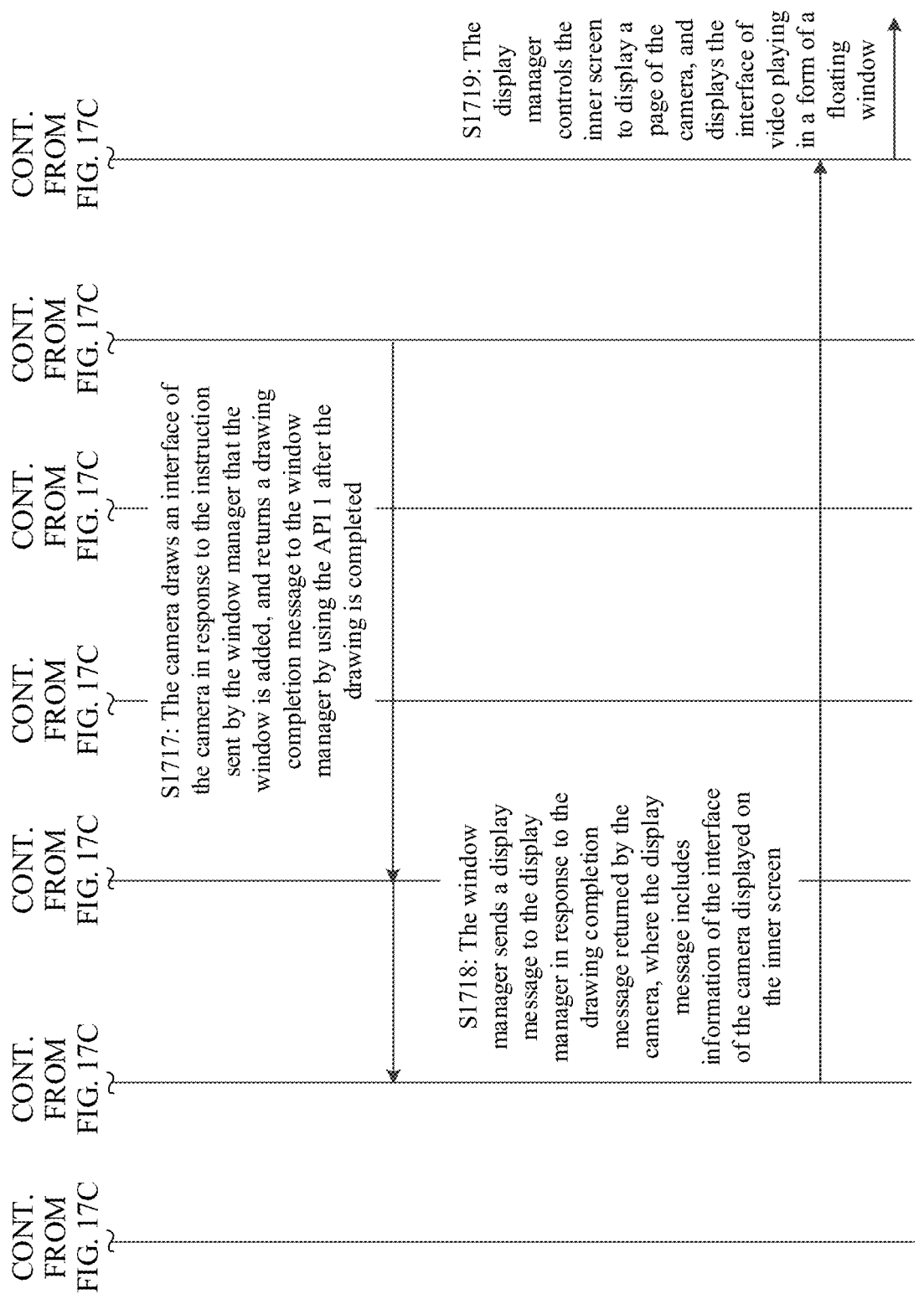

CONT. FROM FIG. 17C

CONT. FROM FIG. 17C

S1717: The camera draws an interface of the camera in response to the instruction sent by the window manager that the window is added, and returns a drawing completion message to the window manager by using the API 1 after the drawing is completed

CONT. FROM FIG. 17C

CONT. FROM FIG. 17C

CONT. FROM FIG. 17C

S1718: The window manager sends a display message to the display manager in response to the drawing completion message returned by the camera, where the display message includes information of the interface of the camera displayed on the inner screen

CONT. FROM FIG. 17C

CONT. FROM FIG. 17C

S1719: The display manager controls the inner screen to display a page of the camera, and displays the interface of video playing in a form of a floating window

CONT.
FROM

TO

CONT.
FROM

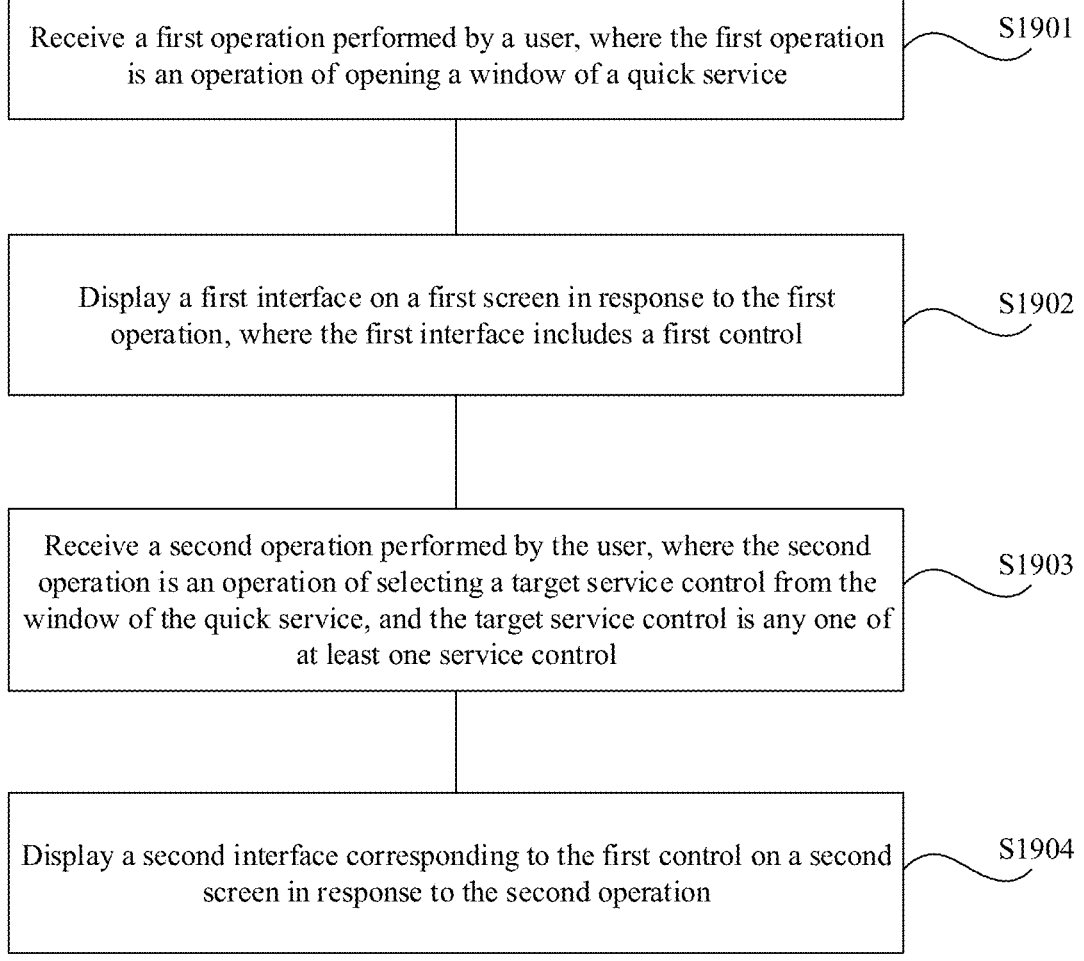

Receive a first operation performed by a user, where the first operation is an operation of opening a window of a quick service    S1901

Display a first interface on a first screen in response to the first operation, where the first interface includes a first control    S1902

Receive a second operation performed by the user, where the second operation is an operation of selecting a target service control from the window of the quick service, and the target service control is any one of at least one service control    S1903

Display a second interface corresponding to the first control on a second screen in response to the second operation    S1904

FIG. 19

Display a third interface on a first screen, where the third interface is an interface of a first APP    S2001

Receive a fifth operation performed by a user, where the fifth operation is an operation of enabling a collaboration function of the first screen and a second screen (such as a collaboration function of an inner screen and an outer screen)    S2002

In response to the fifth operation, display the interface of the first APP displayed on the first screen on the second screen    S2003

FIG. 20

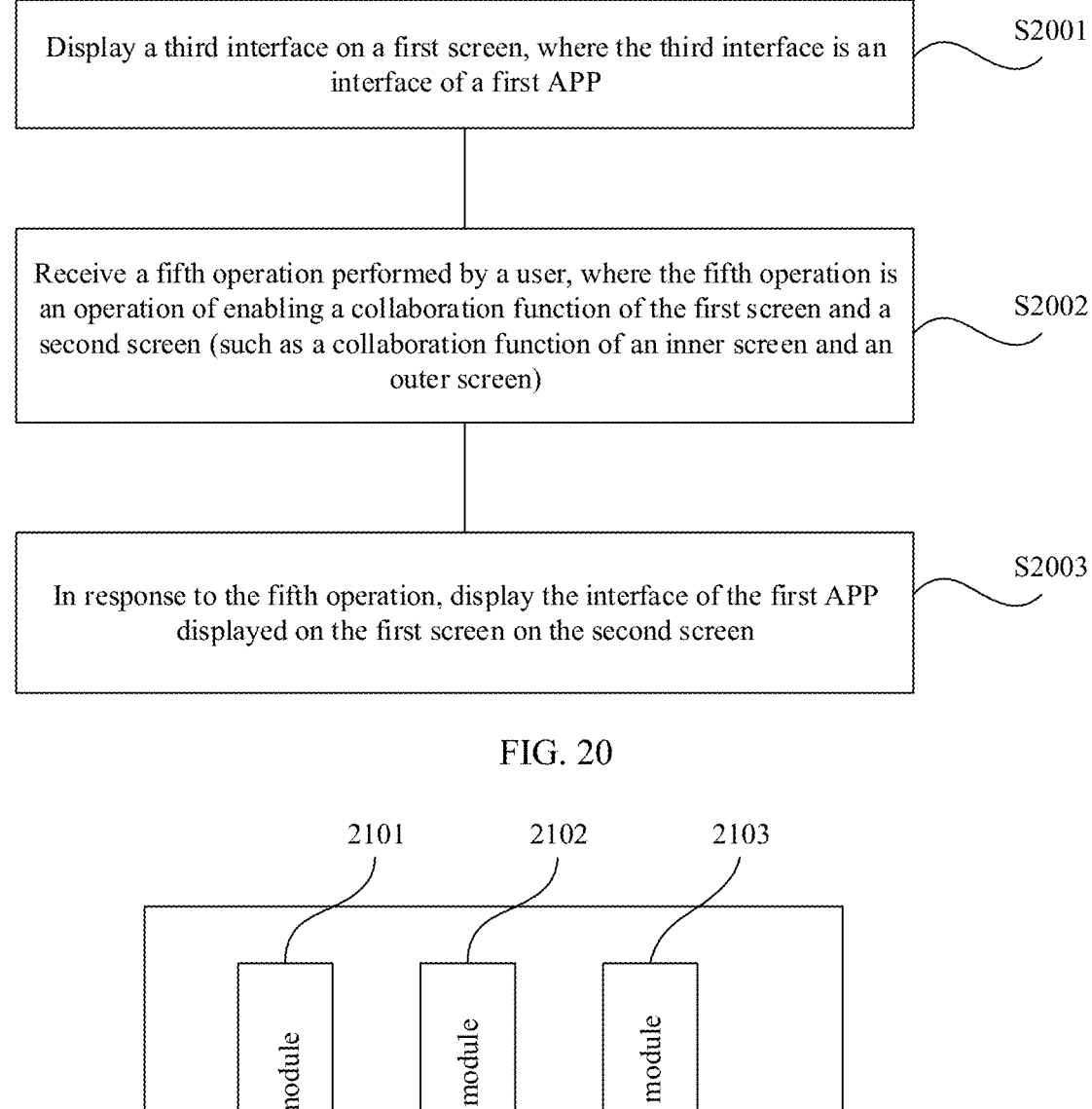

2101     2102     2103

First display module

First receiving module

Second display module

Outer screen display apparatus    2100

FIG. 21

SCREEN DISPLAY METHOD AND ELECTRONIC DEVICE

CROSS-REFERENCE TO RELATED APPLICATIONS

This application is a national stage of International Application No. PCT/CN2022/114897, filed on Aug. 25, 2022, which claims priority to Chinese Patent Application No. 202111606004.0, filed on Dec. 25, 2021. The disclosures of both of the aforementioned applications are hereby incorporated by reference in their entireties.

TECHNICAL FIELD

This application relates to the field of electronic technologies, and in particular, to a screen display method and an electronic device.

BACKGROUND

With the rapid development of an electronic technology, forms of terminal devices are becoming richer. The terminal devices with a foldable screen, namely, foldable screen devices are favored by many users because of their advantages such as a large screen and a good display effect.

To meet needs of a user for various usage scenarios, some foldable screen devices may be provided with two screens. One of the two screens is an inner screen that can be folded, namely, a foldable screen, and the user can unfold the inner screen for use when watching a video or playing a game. When the user does not use the inner screen, the foldable screen device can be folded to facilitate carrying, and in this case, the inner screen is folded. The other screen is an outer screen, and the outer screen is usually smaller than the inner screen. When the user folds the foldable screen device, the inner screen is folded, and the outer screen is exposed, to help the user directly operate on the outer screen to use the foldable screen device without unfolding the inner screen. For example, the user can operate on the outer screen to answer or make a call, view messages, and the like. Usually, when the user unfolds the inner screen of the foldable screen device, the foldable screen device assumes that the user needs to use the inner screen in this case, so that the outer screen is automatically turned off.

However, when the user needs to display a screen, for example, display a payment code for payment, or share a photo or video with another person, the user needs to flip over the foldable screen device to enable the inner screen to face a display object. For a large foldable screen device, this operation is inconvenient, which affects user experience.

SUMMARY

This application provides a screen display method, an apparatus, a chip, an electronic device, a computer-readable storage medium, and a computer program product, to improve portability of use.

According to a first aspect, a screen display method is provided, where the screen display method is applied to an electronic device, the electronic device includes a first screen and a second screen, and the first screen and the second screen are respectively disposed on two opposite sides of the electronic device, and the method includes: receiving a first operation performed by a user; displaying a first interface on the first screen in response to the first operation, where the first interface includes a first control;

receiving a second operation performed by the user on the first control; and displaying, in response to the second operation, a second interface corresponding to the first control on the second screen.

An example in which the first screen is the inner screen, the second screen is the outer screen, the first interface is a window of a quick service, and a first control is a service control in the window of the quick service is used for description. The user may perform the first operation on the inner screen, for example, may tap an icon of the quick service on a desktop, to open the window of the quick service. Optionally, the user may also perform the first operation on the outer screen, for example, may double-tap the outer screen or tap the outer screen with two fingers, to open the window of the quick service. In response to the first operation, the outer screen may display the window of the quick service. The window of the quick service may include one or more service controls, and each service control corresponds to an application (application, APP) or a set page of an APP. For example, a payment service control may correspond to a payment APP, or may correspond to a page of a payment code of the payment APP. Optionally, the service control in the window of the quick service may include a control corresponding to an APP that the user needs to quickly invoke. Through the window of the quick service, the electronic device receives the second operation performed by the user, and the second operation is an operation of tapping the first control that needs to be displayed from at least one service control in the window of the quick service. In some implementations, an operation authority of the outer screen may be in a turn-off state, to avoid privacy disclosure or information loss due to a misoperation performed by another person, and the user may perform the second operation on the inner screen. In some implementations, the operation authority of the outer screen may be in a turn-on state, and another person may perform the second operation on the outer screen to select the first control, to select a to-be-displayed service code as required with permission of an owner, thereby further facilitating use. In response to the second operation, the electronic device displays a service code corresponding to the first control on an outer screen. For example, if the first control selected by the user is a control of the payment APP, a corresponding service code may be the payment code; if the first control selected by the user is a control of a personal health APP, a corresponding service code may be a personal health code; and if the first control selected by the user is a control of a transport APP, a corresponding service code may be a transport code. It should be noted that the service code herein may be in a form of a bar code, a quick response code, or the like. A specific form of the service code is not limited in this application.

In the foregoing method, the electronic device can display an interface of the quick service on the outer screen based on the first operation of the user, and then under triggering of the second operation, display; by using the outer screen, the service code corresponding to the first control selected by the user, to avoid inconvenience caused to the user due to flipping over the electronic device for code scanning, and make a code scanning operation more convenient and fast.

In a possible implementation, the receiving a first operation performed by a user includes: receiving the first operation when a third interface is displayed on the first screen, where the third interface is one of the following interfaces; a lock screen interface, an always on display (always on display, AOD) interface, a desktop, and an interface of a first APP.

When the user views the interface of the first APP displayed on the inner screen, for example, when the user uses a browser to display the content of a novel, and in this case, if the user needs to perform an operation such as code scanning payment or code scanning ride, the first operation may be performed to open the window of the quick service, and the second operation may be performed in the window of the quick service to enable the outer screen to display a service code that needs to be displayed, so that the user can use the outer screen to perform the code scanning operation without flipping over the electronic device. Because only the service code is displayed on the outer screen, the first interface of the first APP does not need to be displayed to another person or device, so that information of the user is prevented from being disclosed, and the user can perform code scanning while continuously using the first APP, thereby protecting privacy of the user and improving code scanning experience of the user.

In a possible implementation, the first APP is any one of a browser APP, a video APP, a game APP, a conference APP, a document APP, and a video call APP. That the user operates the electronic device to display the service code that needs to be displayed on the outer screen may not affect that the user uses any one of the browser APP, the video APP, the game APP, the conference APP, the document APP, and the video call APP on the inner screen, thereby improving the code scanning experience of the user.

In a possible implementation, the first operation is an operation of sliding down on the first screen to enable a pull-down taskbar and tapping a control of a quick service in the pull-down taskbar. When using the inner screen, the user can slide down from the top of the inner screen to enable the pull-down taskbar, and tap the control of the quick service in the pull-down taskbar to open the window of the quick service. This manner is more accurate and does not cause misoperation.

In a possible implementation, the first operation is an operation of double-tapping the second screen. The user can also perform an operation of double-tapping on the outer screen to turn on the outer screen and open the first interface on the outer screen (for example, the window of the quick service). In this way, the user can open the first interface through the quick operation such as double-tapping on the outer screen, without a need to accurately operate on the inner screen, so that an operation manner is more flexible and more convenient.

In a possible implementation, the first interface includes at least one of a control of a payment code, a control of a transport code, and a control of a personal health code. The payment code, the transport code, and the personal health code are most frequently used service codes, and one or more of these service codes are stored on the first interface (that is, the window of the quick service), to significantly reduce a quantity of times that the user manually enables an APP to open a service code, thereby improving user experience.

In a possible implementation, the first interface is a window of the quick service, and the method further includes: receiving a third operation performed by the user, where the third operation is an operation of tapping a second control on the first interface; displaying an APP management list on the first screen in response to the third operation, where the APP management list includes icons of a plurality of APPs supporting quick services and a plurality of state buttons, and the icons of the plurality of APPS supporting quick services are in an one-to-one correspondence with the plurality of state buttons; receiving a fourth operation performed by the user, where the fourth operation is an operation performed on a target state button, and the target state button is any one of the state buttons; and in response to the fourth operation, adding or deleting an icon of an APP that supports the quick service and that corresponds to the target state button in the window of the quick service.

The second control may be a menu control or an edit control. The user can open the APP management list by operating the menu control in the window of the quick service, and then manage the service control in the window of the quick service by operating the state button corresponding to the icon of the APP supporting the quick service in the APP management list. In the method, the user may manages a type of the service control in the window of the quick service, so that personalized requirements of different users can be satisfied by an operation of invoking the service code through the window of the quick service, thereby improving user experience.

According to a second aspect, a screen display method is provided, where the screen display method is applied to an electronic device, the electronic device includes a first screen and a second screen, the first screen and the second screen are respectively disposed on two opposite sides of the electronic device, and the method includes: displaying a third interface on the first screen, where the third interface is an interface of a first application APP; receiving a fifth operation performed by a user, where the fifth operation is an operation of enabling a collaboration function of the first screen and the second screen; and in response to the fifth operation, displaying the interface of the first APP displayed on the first screen on the second screen.

For example, the first screen is the inner screen and the second screen is the outer screen, when the user uses the first APP, the electronic device may display the third interface of the first APP on the inner screen. A type of the first APP is not limited in this application, and may include, but is not limited to, any one of a browser APP, a video APP, a game APP, a conference APP, a document APP, and a video call APP. A first interface of the first APP may be an interface displayed by the game APP, may be a video playing interface displayed by the video APP, or may be an interface of document content displayed by the document APP. This is not limited herein. When the user needs to perform code scanning, the fifth operation of enabling the collaboration function of the first screen and the second screen (such as a collaboration function of the inner screen and the outer screen) may be performed, for example, the user taps an enable button of the collaboration function on a desktop, or slides down a pull-down taskbar on the inner screen and taps a control of outer screen collaboration in the pull-down taskbar. In this case, the electronic device may display, under triggering of the fifth operation of the user, the first interface displayed on the inner screen on the outer screen. When the user continues to operate the first APP on the inner screen, the outer screen may continue to follow the inner screen to display the interface of the first APP displayed on the inner screen. For example, when the inner screen displays a first interface, that is, thumbnails of pictures in a gallery, the outer screen displays the thumbnails of the pictures in the gallery displayed on the inner screen if the user performs the fifth operation. In this case, if the user taps one of the pictures on the inner screen to display an enlarged picture of the picture, the outer screen synchronously displays the enlarged picture of the picture displayed on the inner screen.

In the foregoing method, when the user performs the fifth operation, the electronic device may enable the collaboration function of the first screen and the second screen, to enable the outer screen to display content displayed on the inner screen, so that the interface of the first APP can be displayed to another user for viewing without a need to flip over the electronic device, so as to avoid inconvenience caused by flipping over the electronic device to share the screen, make screen sharing more convenient, and improve user experience of sharing screen.

In a possible implementation, when a mode of the collaboration function is an asynchronous collaboration mode, the method further includes: receiving a sixth operation performed by the user, where the sixth operation is an operation of enabling a second APP on the first screen; and in response to the sixth operation, displaying an interface of the second APP on the first screen, and displaying the interface of the first APP in a form of a floating window on the first screen.

When the user enables the collaboration function, if the mode of the asynchronous collaboration is selected, the outer screen can display content that is not identical with the content on the inner screen. That is, if the user enables the asynchronous collaboration mode when the interface of the first APP is displayed on the inner screen, the interface of the second APP is displayed on the inner screen when the user operates on the inner screen to enable the second APP, that is, performs the sixth operation. In this case, the outer screen still displays the interface of the first APP, and the interface of the first APP may be displayed in a floating window on the inner screen, to prompt the user with content displayed on the outer screen. In this implementation, after the collaboration function of the asynchronous collaboration mode is enabled, the interface display of the first APP can be maintained to display on the outer screen, and the user can use the second APP on the inner screen. In addition, the user can monitor a presentation status of the first APP by using the interface of the first APP displayed on a floating window on the inner screen, so that screen sharing forms are richer, to enrich functions of the electronic device, facilitate use of the user, and improve user experience.

In a possible implementation, the fifth operation is an operation of sliding down on the first screen to enable the pull-down taskbar, tapping a control of outer screen collaboration in the pull-down taskbar, and selecting asynchronous collaboration in a pop-up selection window of the outer screen collaboration.

That is, when the user slides down from the top of the inner screen, the pull-down taskbar can be pulled out. The pull-down taskbar includes the control of the outer screen collaboration. When the user taps the control of the outer screen collaboration or taps a menu button of the control of the outer screen collaboration, the inner screen can pop up the selection window of the outer screen collaboration. The selection window of the outer screen collaboration may include a control of the asynchronous collaboration. When the user taps the control of the asynchronous collaboration, the electronic device enables the asynchronous collaboration mode of the collaboration function. Optionally, the outer screen collaboration selection window may further include a control of mirror collaboration, and when the user taps the control of the mirror collaboration, the electronic device enables a mirror collaboration mode of the collaboration function. The user can select different modes of the collaboration function as required to adapt to the current usage scenario.

In a possible implementation, the sixth operation is an operation that is performed on the first screen for exiting the interface of the first APP and enabling the second APP from the desktop; or, an operation that is performed on the first screen for invoking a sidebar and tapping an icon of the second APP in the sidebar.

In a possible implementation, when a mode of the collaboration function is a mirror collaboration mode, the method further includes: receiving a seventh operation performed by the user, where the seventh operation is an operation that is performed on the first APP on the first screen; and in response to the seventh operation, synchronously displaying, content indicated by the seventh operation on the first screen and the second screen.

When the user enables the collaboration function, if the mirror collaboration mode is selected, the outer screen can display content that is the same as the content on the inner screen. In this method, after a collaboration function of a mirror collaboration mode is enabled, the user can maintain a same interface between the outer screen and the inner screen to implement screen sharing, so as to avoid operation inconvenience caused by flipping over the electronic device due to a same screen viewed by a plurality of people. In this method, screen sharing is more convenient and user experience is improved.

In a possible implementation, the fifth operation is an operation of sliding down on the first screen to enable a pull-down taskbar, tapping a control of outer screen collaboration in the pull-down taskbar, and selecting the mirror collaboration in a pop-up selection window of the outer screen collaboration.

In a possible implementation, the first APP is any one of a gallery APP, a video APP, and a document APP. The user can share a gallery APP interface, a video APP interface, a document APP interface, and the like to the outer screen by enabling the collaboration function of the inner screen and the outer screen, to help the user share a picture, a video, a document, and the like.

In a possible implementation, the second APP is a camera APP when the first APP is a video APP. When a parent needs to take a picture for a child and is worried that inattention of the child affects a shooting effect, the parent can enable the video APP, and enable the asynchronous collaboration mode, to share a video APP interface to the outer screen to attract attention of the child. Then the parent enables the camera APP for shooting. This ensures that the attention of the child can be directed towards a shooting electronic device, so that the user can shoot the child easily and the shooting effect is ensured.

According to a third aspect, a screen display apparatus is provided, where the screen display apparatus includes a unit including software and/or hardware, and the unit is configured to perform any method in the technical solution described the first aspect or the second aspect.

According to a fourth aspect, an electronic device is provided, where the electronic device includes a first screen and a second screen, the first screen and the second screen are respectively disposed on two opposite sides of the electronic device, and the electronic device further includes: a processor, a memory and an interface, where the processor, the memory, and the interface respectively match with each other, so that the electronic device performs any method in the technical solution described the first aspect or the second aspect.

According to a fifth aspect, a chip is provided, where the chip includes a processor, and the processor is configured to read and execute a computer program stored in a memory; to perform any method in the technical solution described the first aspect or the second aspect.

Optionally, the chip further includes the memory, and the memory is connected to the processor through a circuit or a wire.

Further optionally; the chip further includes a communication interface.

According to a sixth aspect, a computer-readable storage medium is provided, where the computer-readable storage medium stores a computer program, and when the computer program is executed by a processor, the processor is enabled to perform any method in the technical solution described the first aspect or the second aspect.

According to a seventh aspect, a computer program product is provided, where the computer program product includes computer program code, and when the computer program code is run on an electronic device, the electronic device is enabled to perform any method in the technical solution described the first aspect or the second aspect.

BRIEF DESCRIPTION OF DRAWINGS

FIG. 10*a*-FIG. 10*d* are a process interaction diagram of another example screen display method according to an embodiment of this application;

FIG. 11 is a schematic scenario diagram of another example screen display method according to an embodiment of this application;

FIG. 17A-FIG. 17D are a process interaction diagram of another example screen display method according to an embodiment of this application;

FIG. 19 is a flowchart of another example screen display method according to an embodiment of this application;

FIG. 20 is a flowchart of another example screen display method according to an embodiment of this application;

FIG. 21 is a schematic diagram of a structure of an example screen display apparatus according to an embodiment of this application.

DESCRIPTION OF EMBODIMENTS

The following describes technical solutions in embodiments of this application with reference to accompanying drawings in embodiments of this application. In descriptions of embodiments of this application, unless otherwise specified, "/" means "or", for example, A/B may mean "A or B"; "and/or" used herein is only used to describe an association relationship between associated objects, and indicates that three relationships may exist. For example, "A and/or B" may indicate the following: Only A exists, both A and B exist, and only B exists. In addition, in the descriptions of embodiments of this application, "a plurality of" means two or more than two.

In the following, the terms "first", "second" and "third" are used for descriptive purposes only, and cannot be construed as indicating or implying relative importance or implicitly indicating the quantity of technical features indicated. Therefore, the features defined with "first", "second", and "third" may explicitly or implicitly include one or more of the features.

A screen display method of an electronic device that is provided in an embodiment of this application may be applied to a terminal device such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). The terminal device is a terminal device including a first screen and a second screen that are respectively disposed on two opposite sides of the terminal device. A specific type of the terminal device is not limited in this embodiment of this application.

Figure 1:
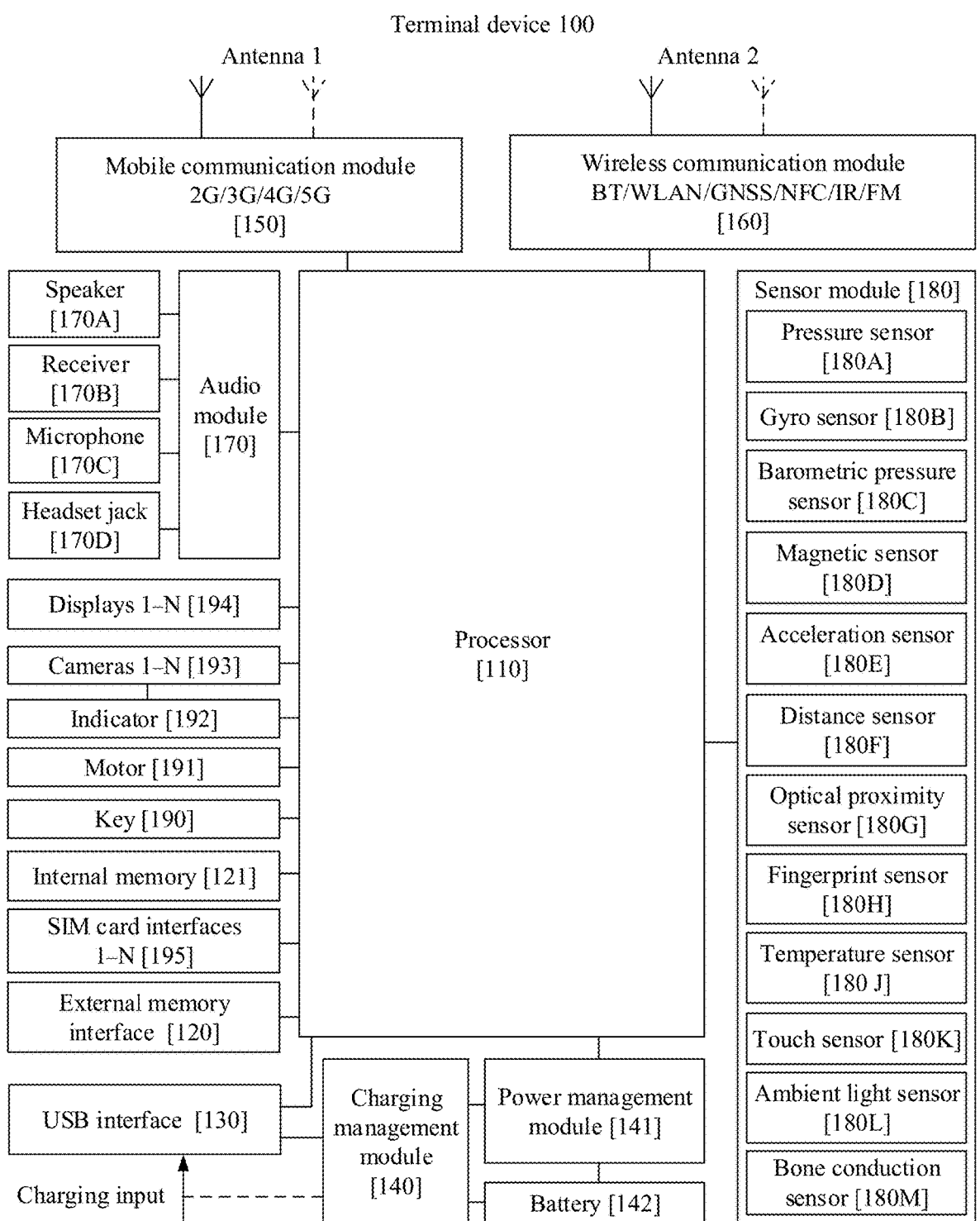
FIG. 1 is a schematic diagram of a structure of an example terminal device 100 according to an embodiment of this application.

For example, FIG. 1 is a schematic diagram of a structure of an example terminal device 100 according to an embodiment of this application. The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that a structure shown in this embodiment of this application does not constitute a specific limitation on the terminal device 100. In some other embodiments of this application, the terminal device 100 may include more or fewer components than those shown in the figure, or combine some components, or split some components, or have different component arrangements. The illustrated components may be implemented by using hardware, software or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent devices, or may be integrated into one or more processors.

The controller may be a nerve center and a command center of the terminal device 100. The controller can generate an operation control signal based on instruction operation codes and a timing signal, and complete the control of fetching and executing instructions.

The processor 110 may be further provided with a memory for storing instructions and data. In some embodiments, the memory in the processor 110 is a cache. The memory can store an instruction or data that the processor 110 has just used or used cyclically. If the processor 110 needs to use the instruction or data again, the instruction or data can be directly invoked from the memory. Repeated access is avoided, and a waiting time of the processor 110 is reduced, thereby improving system efficiency.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

The I2C interface is a bidirectional synchronous serial bus, and includes a serial data line (serial data line, SDA) and a serial clock line (derial clock line, SCL). In some embodiments, the processor 110 may include a plurality of groups of I2C buses. The processor 110 may be coupled to the touch sensor 180K, a charger, a flash, the camera 193, and the like by using different I2C bus interfaces. For example, the processor 110 may be coupled to the touch sensor 180K by using an I2C interface, so that the processor 110 communicates with the touch sensor 180K by using the I2C bus interface, thereby implementing a touch function of the terminal device 100.

The I2S interface may be configured to perform audio communication. In some embodiments, the processor 110 may include a plurality of groups of I2S buses. The processor 110 may be coupled to the audio module 170 by using the I2S bus to implement communication between the processor 110 and the audio module 170. In some embodiments, the audio module 170 can transmit an audio signal to the wireless communication module 160 by using the I2S interface, to implement a function of answering calls by using a Bluetooth headset.

The PCM interface can also be used for audio communication to sample, quantize, and encode analog signals. In some embodiments, the audio module 170 may be coupled to the wireless communication module 160 by using a PCM bus interface. In some embodiments, the audio module 170) can also transmit an audio signal to the wireless communication module 160 by using the PCM interface, to implement a function of answering calls by using a Bluetooth headset. Both the I2S interface and the PCM interface can be used for audio communication.

The UART interface is a universal serial data bus used for asynchronous communication. The bus may be a bidirectional communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 can transmit an audio signal to the wireless communication module 160 by using the UART interface, to implement a function of playing music by using a Bluetooth headset.

The MIPI interface may be configured to connect the processor 110 to peripheral devices such as the display 194 and the camera 193. The MIPI interface includes a camera serial interface (camera serial interface, CSI), a display serial interface (display serial interface, DSI), and the like. In some embodiments, the processor 110 and the camera 193 communicate with each other by using the CSI interface, to implement a shooting function of the terminal device 100. The processor 110 and the display 194 communicate with each other through the DSI interface, to implement a display function of the terminal device 100.

The GPIO interface may be configured by using software. The GPIO interface may be configured as a control signal interface, or may be configured as a data signal interface. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that complies with USB standard specifications, and may be specifically a Mini USB interface, a Micro USB interface, a USB Type C interface, or the like. The USB interface 130 may be configured to connect to the charger to charge the terminal device 100, or may be configured to transmit data between the terminal device 100 and peripheral devices. The USB interface 130 may be further configured to connect to a headset and play audio by using the headset. The interface may be further configured to connect to another terminal device, such as an AR device.

It can be understood that the interface connection relationship between the modules illustrated in the embodiments of this application is merely an example for description, and does not constitute a limitation on the structure of the terminal device 100. In some other embodiments of this application, the terminal device 100 may alternatively use an interface connection mode that is different from those in the foregoing embodiments, or use a combination of a plurality of interface connection modes.

The charging management module 140 is configured to receive a charging input from a charger. The charger may be a wireless charger, or may be a wired charger. In some wired charging embodiments, the charging management module 140 can receive a charging input of the wired charger by using the USB interface 130. In some embodiments of wireless charging, the charging management module 140 can receive a wireless charging input by using a wireless charging coil of the terminal device 100. In addition to charging the battery 142, the charging management module 140 may further supply power to the terminal device by using the power management module 141.

The power management module 141 is configured to connect the battery 142, the charging management module 140, and the processor 110. The power management module 141 receives an input of the battery 142 and/or an input of the charging management module 140, and supplies power to the processor 110, the internal memory 121, an external memory, the display 194, the camera 193, the wireless communication module 160, and the like. The power management module 141 may be further configured to monitor parameters such as a battery capacity, a quantity of battery cycles, and a battery health status (leakage or impedance). In some other embodiments, the power management module 141 may alternatively be disposed in the processor 110. In some other embodiments, the power management module 141 and the charging management module 140 may alternatively be disposed in a same device.

The wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. In FIG. 1, structures of the antenna 1 and the antenna 2 are merely an example. Each antenna in the terminal device 100 may be configured to cover one or more communication frequency bands. Different antennas may also be multiplexed to improve antenna utilization. For example, the antenna 1 may be multiplexed into a diversity antenna of a wireless local area network. In some other embodiments, the antenna may be used in combination with a tuning switch.

The mobile communication module 150 can provide a wireless communication solution that is applied to the terminal device 100, including 2G/3G/4G/5G and the like. The mobile communication module 150 may include at least one filter, a switch, a power amplifier, a low noise amplifier (low noise amplifier, LNA), and the like. The mobile communication module 150 can receive an electromagnetic wave by using the antenna 1, perform processing such as filtering and amplification on the received electromagnetic wave, and transmit a processed electromagnetic wave to the modem processor for demodulation. The mobile communication module 150 may further amplify a signal modulated by the modem processor and convert, by using the antenna 1, the signal into electromagnetic waves for radiation. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to module a to-be-sent low-frequency baseband signal into a medium-high-frequency signal. The demodulator is configured to demodulate a received electromagnetic wave signal into a low-frequency baseband signal. The demodulator then transmits a demodulated low-frequency baseband signal to the baseband processor for processing. After being processed by the baseband processor, the low-frequency baseband signal is transmitted to the application processor. The application processor outputs a sound signal by using an audio device (not limited to the speaker 170A, the receiver 170B, and the like), or displays an image or video by using the display 194. In some embodiments, the modem processor may be an independent device. In some other embodiments, the modem processor may be independent of the processor 110 and disposed in a same device as the mobile communication module 150 or another functional module.

The wireless communication module 160 may provide a wireless communication solution that is applied to the terminal device 100, including wireless local area network (wireless local area network, WLAN) (such as a wireless fidelity (wireless fidelity, Wi-Fi) network), Bluetooth (bluetooth, BT), global navigation satellite system (global navigation satellite system. GNSS), frequency modulation (frequency modulation, FM), near field communication (near field communication, NFC), infrared (infrared, IR), and the like. The wireless communication module 160 may be one or more devices integrating at least one communication processing module. The wireless communication module 160 receives electromagnetic waves by using the antenna 2, performs frequency modulation and filtering on an electromagnetic wave signal, and sends a processed signal to the processor 110. The wireless communication module 160 can further receive a to-be-sent signal from the processor 110, and perform frequency modulation and amplification on the signal, and the signal is converted into an electromagnetic wave and radiated by the antenna 2.

In some embodiments, the antenna 1 of the terminal device 100 is coupled to the mobile communication module 150, and the antenna 2 is coupled to the wireless communication module 160, so that the terminal device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS), and/or a satellite based augmentation system (satellite based augmentation system, SBAS).

The terminal device 100 implements a display function by using the GPU, the display 194, the application processor, and the like. The GPU is an image processing microprocessor, which is connected to the display 194 and the application processor. The GPU is configured to perform mathematical and geometric calculations to render graphics. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini LED, a micro LED, a micro-OLED, a quantum dot light emitting diode (quantum dot light emitting diodes, QLED), or the like. In some embodiments, the terminal device 100 may include one or N displays 194, where N is a positive integer greater than 1.

When the terminal device 100 is a foldable screen device, an inner screen of the terminal device 100 may be disposed as a display that can be folded (which is referred to as a foldable screen). The foldable screen may be an integrated flexible display, may be a spliced display including a plurality of flexible displays and hinges between every two flexible displays, or may be a spliced display including a plurality of rigid displays and hinges between every two rigid displays. This is not limited in this embodiment of this application.

Figure 2A:
FIG. 2*a*-FIG. 2*c* are a block diagram of a software architecture of a terminal device 100 according to an embodiment of this application.
Figure 2B:
Figure 2C:
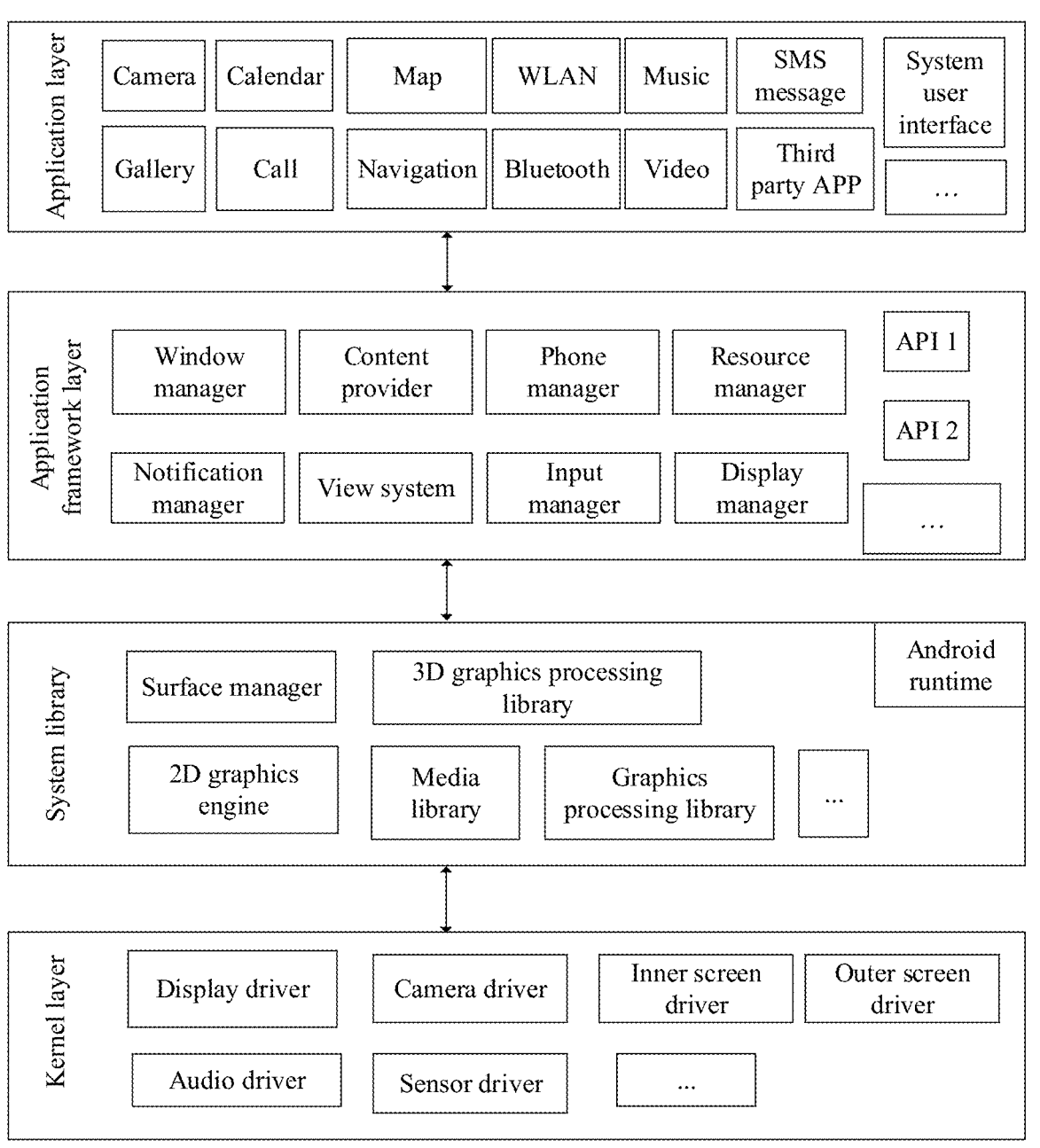

For example, the terminal device 100 may be a foldable mobile phone. FIG. 2a-FIG. 2c are a schematic diagram of a structure of an example foldable screen mobile phone. Referring to FIG. 2a-FIG. 2c, a display of the foldable screen mobile phone includes a first screen and a second screen, where the first screen may be an inner screen, the second screen may be an outer screen, the inner screen is a foldable screen, and a size of the inner screen is greater than a size of the outer screen. FIG. 2a is a schematic diagram of an outer side of a foldable screen mobile phone in an unfolded state. Referring to FIG. 2a, a first portion 201 of the outer side of the foldable screen mobile phone may be disposed as the outer screen of the foldable screen mobile phone, and a second portion 202 may be disposed as a housing of the mobile phone. The first portion 201 and the second portion 202 on the outer side of the foldable screen mobile phone each may be provided with a camera. In another example of the foldable screen mobile phone, both the first portion 201 and the second portion 202 of the outer side of the foldable screen mobile phone may be disposed as the outer screen of the foldable screen mobile phone, and both the first portion 201 and the second portion 202 of the outer side of the foldable screen mobile phone may be disposed as the housing of the foldable screen mobile phone. FIG. 2b is a schematic diagram of an inner side of a foldable screen mobile phone in an unfolded state. Referring to FIG. 2b, the inner screen (namely, the foldable screen) of the foldable screen mobile phone includes a first display unit 301 and a second display unit 302. The first display unit 301 and the second display unit 302 may display different display interfaces, or may display one display interface together. A posture or form of the foldable screen may be determined based on an included angle between the first display unit 301 and the second display unit 302. When the included angle between the first display unit 301 and the second display unit 302 is 0 degrees, the foldable screen is in a fully folded state; when the included angle between the first display unit 301 and the second display unit 302 is 180 degrees, the foldable screen is in a fully unfolded state; and when the included angle between the first display unit 301 and the second display unit 302 is greater than 0 degrees and less than 180 degrees, the foldable screen is in a semi-folded state. It should be noted that the foldable screen is in the semi-folded state means that the foldable screen mobile phone is in the semi-folded state, that the foldable screen is in the fully folded state means that the foldable screen mobile phone is in the fully folded state, and that the foldable screen is in the fully unfolded state means that the foldable screen mobile phone is in the fully unfolded state.

The terminal device 100 can implement a shooting function by using the ISP, the camera 193, the video codec, the GPU, the display 194, the application processor, and the like.

The ISP is configured to process data fed back by the camera 193. For example, during shooting, a shutter is pressed, light is transmitted to a light-sensitive element of the camera through a lens, an optical signal is converted into an electrical signal, and the light-sensitive element of the camera transfers the electrical signal to the ISP for processing, so that the electrical signal is converted into an image visible to a naked eye. The ISP can further optimize algorithms for noise, luminance, and a skin color of the image. The ISP can further optimize parameters such as exposure and a color temperature in a shooting scenario. In some embodiments, the ISP may be disposed in the camera 193.

The camera 193 is configured to capture a still image or a video. An optical image is generated for an object through the lens and is projected to the light-sensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transfers the electrical signal to the ISP. The ISP converts the electrical signal into a digital image signal. The ISP outputs the digital image signal to the DSP for processing. The DSP converts the digital image signal into an image signal in a standard format of RGB, YUV, or the like. In some embodiments, the terminal device 100 may include one or N cameras 193, where N is a positive integer greater than 1.

The digital signal processor is configured to process a digital signal. In addition to processing a digital image signal, the digital signal processor can further process another digital signal. For example, when the terminal device 100 selects a frequency; the digital signal processor is configured to perform Fourier transform or the like on energy of the frequency.

The video codec is configured to compress or decompress a digital video. The terminal device 100 may support one or more types of video codecs. Therefore, the terminal device 100 may play or record videos in a plurality of encoding formats, such as moving picture experts group (moving picture experts group, MPEG) 1, MPEG 2, MPEG 3, and MPEG 4.

The NPU is a neural-network (neural-network, NN) computing processor. By referring to a structure of a biological neural network, such as a transfer mode between human brain neurons, the NPU quickly processes input information, and can further perform continuous self-learning. The NPU can implement applications such as intelligent cognition of the terminal device 100, for example, image recognition, face recognition, voice recognition, and text understanding.

The external memory interface 120 may be configured to connect to an external memory card such as a Micro SD card, so as to expand a storage capacity of the terminal device 100. The external memory card communicates with the processor 110 by using the external memory interface 120 to implement a data storage function. For example, music, video, and other files are stored in the external memory card.

The internal memory 121 may be configured to store computer executable program code, where the executable program code includes an instruction. The processor 110 executes various function applications and data processing of the terminal device 100 by running an instruction stored in the internal memory 121. The internal memory 121 may include a program storage area and a data storage area. The program storage area can store an operating system, an application required by at least one function (for example, a sound play function or an image play function), or the like. The data storage area can store data (such as audio data or a phone book) created during use of the terminal device 100. In addition, the internal memory 121 may include a high-speed random access memory, and may further include a non-volatile memory, such as at least one magnetic disk storage device, a flash memory device, or a universal flash storage (universal flash storage, UFS).

The terminal device 100 can implement audio functions (such as music playing and sound recording) by using the audio module 170, the speaker 170A, the receiver 170B, the microphone 170C, the headset jack 170D, the application processor, and the like.

The audio module 170 is configured to convert digital audio information into an analog audio signal for outputting, and is further configured to convert an analog audio input into a digital audio signal. The audio module 170 may be further configured to encode and decode audio signals. In some embodiments, the audio module 170 may be disposed in the processor 110, or some functional modules of the audio module 170 may be disposed in the processor 110.

The speaker 170A, also referred to as a "horn", is configured to convert an audio electrical signal into a sound signal. The terminal device 100 can listen to music or answer a hands-free call by using the speaker 170A.

The receiver 170B, also referred to as an "earpiece", is configured to convert an audio electrical signal into a sound signal. When the terminal device 100 receives a call or a voice message, the receiver 170B can be placed close to an ear to receive the voice.

The microphone 170C, also referred to as a "loud-speaker", is configured to convert a sound signal into an electrical signal. When making a call or sending a voice message, the user can make the mouth approach the microphone 170C and emit a sound, to input a sound signal to the microphone 170C. The terminal device 100 may be provided with at least one microphone 170C. In some other embodiments, the terminal device 100 may be provided with two microphones 170C, which can implement noise reduction function in addition to collecting sound signals. In some other embodiments, the terminal device 100 may alternatively be provided with three, four, or more microphones 170C to implement sound signal collection, noise reduction, sound source recognition, directional recording, and the like functions.

The headset jack 170D is configured to connect to a wired headset. The headset jack 170D may be a USB interface 130, or may be a 3.5 mm open mobile terminal device platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates with conductive material. When a force is applied to the pressure sensor 180A, a capacitance between electrodes changes. The terminal device 100 determines a pressure intensity based on a change of the capacitance. When a touch operation is performed on the display 194, the terminal device 100 detects a touch operation intensity based on the pressure sensor 180A. The terminal device 100 can further calculate a touch position based on the detection signal of the pressure sensor 180A. In some embodiments, touch operations that are performed on a same touch position but have different touch operation intensities may correspond to different operation instructions. For example, when a touch operation whose touch operation intensity is less than a first pressure threshold is applied to an SMS application icon, an instruction for viewing an SMS message is executed. When a touch operation whose touch operation intensity is greater than or equal to the first pressure threshold is performed on the SMS application icon, an instruction for creating an SMS message is executed.

The gyro sensor 180B may be configured to determine a movement posture of the terminal device 100. In some embodiments, the gyro sensor 180B may be configured to determine angular velocities of the terminal device 100 around three axes (that is, x, y, and z axes). The gyro sensor 180B may be configured to implement image stabilization during shooting. For example, when the shutter is pressed, the gyro sensor 180B detects a shake angle of the terminal device 100, calculates a distance that a lens module needs to compensate based on the angle, and allows the lens to counteract the shake of the terminal device 100 through reverse movement to implement image stabilization. The gyro sensor 180B can further be used in navigation and somatosensory gaming scenarios.

The barometric pressure sensor 180C is configured to measure a barometric pressure. In some embodiments, the terminal device 100 calculates an altitude based on a barometric pressure value measured by the barometric pressure sensor 180C, to assist in positioning and navigation.

The magnetic sensor 180D includes a Hall sensor. The terminal device 100 can use the magnetic sensor 180D to detect opening and closing of a flip holster. In some embodiments, when the terminal device 100 is a flip phone, the terminal device 100 can detect opening and closing of a flip based on the magnetic sensor 180D, so as to set features such as automatic unlocking of the flip based on the detected opening and closing state of the holster or the opening and closing state of the flip.

The acceleration sensor 180E can detect magnitudes of acceleration of the terminal device 100 in various directions (generally three axes). When the terminal device 100 is still, a gravity and a direction may be detected. The acceleration sensor 180E may be further configured to identify the posture of the terminal device, and be used in applications such as switching between a landscape screen and a portrait screen, and a pedometer.

The distance sensor 180F is configured to measure a distance. The terminal device 100 may measure a distance by using infrared or laser. In some embodiments, in a shooting scenario, the terminal device 100 can use the distance sensor 180F to measure a distance to implement quick focusing.

The optical proximity sensor 180G may include, for example, a light-emitting diode (LED) and an optical detector such as a photodiode. The light-emitting diode may be an infrared light emitting diode. The terminal device 100 emits infrared light outward by using the light-emitting diode. The terminal device 100 uses the photodiode to detect infrared reflected light from a nearby object. When sufficient reflected light is detected, it can be determined that there is an object near the terminal device 100. When insufficient reflected light is detected, the terminal device 100 can determine that there is no object near the terminal device 100. The terminal device 100 can use the optical proximity sensor 180G to detect that the user holds the terminal device 100 close to the ear, to automatically turn off the screen to save power. The optical proximity sensor 180G may alternatively be used in a holster mode or a pocket mode to automatically unlock or lock the screen.

The ambient light sensor 180L is configured to sense brightness of ambient light. The terminal device 100 can adaptively adjust luminance of the display 194 based on the sensed luminance of the ambient light. The ambient light sensor 180L can also be configured to automatically adjust white balance during shooting. The ambient light sensor 180L can further cooperate with the optical proximity sensor 180G to detect whether the terminal device 100 is in a pocket, to prevent accidental touch.

The fingerprint sensor 180H is configured to collect a fingerprint. The terminal device 100 can use the collected fingerprint characteristics to implement fingerprint-based unlocking, application lock accessing, fingerprint-based shooting, fingerprint-based incoming call receiving, and the like.

The temperature sensor 180J is configured to detect a temperature. In some embodiments, the terminal device 100 executes a temperature processing policy based on the temperature detected by the temperature sensor 180J. For example, when a temperature reported by the temperature sensor 180J exceeds a threshold, the terminal device 100 degrades performance of a processor located near the temperature sensor 180J, to reduce power consumption and implement thermal protection. In some other embodiments, when the temperature is lower than another threshold, the terminal device 100 heats the battery 142, to avoid abnormal shutdown of the terminal device 100 due to a low temperature. In some other embodiments, when the temperature is lower than still another threshold, the terminal device 100 boosts an output voltage of the battery 142, to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch-controlled screen". The touch sensor 180K is configured to detect a touch operation performed on or near the touch sensor 180K. The touch sensor can transmit a detected touch operation to the application processor to determine a type of a touch event. The display 194 may be configured to provide a visual output related to the touch operation. In some other embodiments, the touch sensor 180K may alternatively be disposed on a surface of the terminal device 100, which is different from the position of the display 194.

The bone conduction sensor 180M can obtain a vibration signal. In some embodiments, the bone conduction sensor 180M can obtain a vibration signal obtained from bone mass vibration by a human voice part. The bone conduction sensor 180M can be further in contact with the human pulse to receive a blood pressure and pulse signal. In some embodiments, the bone conduction sensor 180M may alternatively be disposed in a headset to be combined into a bone conduction headset. The audio module 170) can obtain a speech signal through parsing based on the vibration signal that is obtained by the bone conduction sensor 180M from bone mass vibration by the voice part, to implement a speech function. The application processor can parse heart rate information based on the blood pressure and pulse signal obtained by the bone conduction sensor 180M, to implement a heart rate detection function.

The key 190 includes a power-on key, a volume key, or the like. The key 190 may be a mechanical key, or may be a touch key. The terminal device 100 can receive a key input, and generate a key signal input related to user setting and function control of the terminal device 100.

The motor 191 can generate a vibration prompt. The motor 191 may be configured to provide an incoming call vibration prompt, or may be configured to provide a touch vibration feedback. For example, touch operations that act on different applications (such as shooting and audio playback) may be corresponding to different vibration feedback effects. The motor 191 may also correspond to different vibration feedback effects for touch operations performed on different areas of the display 194. Different application scenarios (such as time reminding, receiving information, alarm clock and games) can also correspond to different vibration feedback effects. A touch vibration feedback effect may further be customized.

The indicator 192 may be an indicator light, which may be configured to indicate a charging state and a power change, or to indicate a message, a missed call, a notification, or the like.

The SIM card interface 195 is configured to connect to a SIM card. The SIM card may be inserted into the SIM card interface 195 or removed from the SIM card interface 195 to implement contact and separation from the terminal device 100. The terminal device 100 can support one or N SIM card interfaces, where N is a positive integer greater than 1. The SIM card interface 195 can support the Nano SIM card, the Micro SIM card, the SIM card, and the like. A same SIM card interface 195 may be connected to a plurality of cards. The plurality of cards may be of the same type or different types. The SIM card interface 195 can also be compatible with different types of SIM cards. The SIM card interface 195 can also be compatible with an external memory card. The terminal device 100 interacts with a network by using the SIM card, to implement functions such as making a call and data communication. In some embodiments, the terminal device 100 uses an eSIM, that is, an embedded SIM card. The eSIM card can be embedded in the terminal device 100 and cannot be separated from the terminal device 100.

A software system of the terminal device 100 may use a hierarchical architecture, an event-driven architecture, a microkernel architecture, a micro-service architecture, or a cloud architecture. In this embodiment of this application, an Android system with a hierarchical architecture is used as an example to describe a software architecture of a terminal device 100.

FIG. 2c is a block diagram of a software architecture of a terminal device 100 according to an embodiment of this application. The hierarchical architecture divides software into layers, and each layer has a clear function and division of labor. The layers communicate with each other by using a software interface. In some embodiments, the Android system is divided into four layers: an application layer, an application framework layer, an Android runtime (Android runtime) and system library layer, and a kernel layer from top down. The application layer may include a series of application packages.

As shown in FIG. 2c, the application packages may include applications such as camera, gallery, calendar, call, map, navigation, WLAN, Bluetooth, music, video, SMS, system user interface (system UI), and another third party application (application, APP).

The system user interface is used to display a quick service interface and a pull-down taskbar.

The application framework layer provides an application programming interface (application programming interface, API) and a programming framework for applications at the application layer. The application framework layer includes some predefined functions. The API may include an API 1 and an API 2, where the API 1 is an interface for adding a window display, and the API 2 is an interface for registering a collaboration service.

As shown in FIG. 2c, the application framework layer may include a window manager (window manager), a content provider, a view system, a phone manager, a resource manager, a notification manager, an input manager (input manager), a display manager (display manager, that is, a screen manager), and the like.

The window manager is used to manage a window program. The window manager may obtain a display size, determine whether there is a status bar, lock a screen, take a screenshot, and the like.

The content provider is used to store and obtain data, and enables these data to be accessible to an application. The data may include videos, images, audio, calls made and received, browsing history and bookmarks, phone books, and the like.

The view system includes visual controls, such as a control for displaying text and a control for displaying pictures. The view system may be used to build an application. The display interface may include one or more views. For example, a display interface that includes an SMS notification icon may include a view for displaying text and a view for displaying pictures.

The phone manager is used to provide communication functions of a terminal device 100, such as call state management (including connecting, hanging up, or the like).

The resource manager provides resources for applications, such as localized strings, icons, images, layout files, and video files.

The notification manager enables an application to display notification information in the status bar, which can be used to convey a notification-type message, and can automatically disappear after a short stay without user interaction. For example, the notification manager is used for notifying download completion or as a message reminder. The notification manager may alternatively be a notification that appears in the status bar at the top of the system in the form of a chart or scroll bar text, such as a notification for an application running in the background, or a notification that appear on the screen in the form of a dialog window. For example, a text message is displayed in the status bar, a prompt tone is made, a terminal device is vibrating and, an indicator light is flashing.

The input manager is used to a handle touch operation of a user, such as a tap operation, a slide operation, a double-tap operation, or the like.

The display manager is used to manage the inner screen and the outer screen, and control display content to be displayed on the inner screen and/or the outer screen.

The Android runtime includes a core library and a virtual machine. The Android runtime is responsible for scheduling and management of the Android system.

The core library includes two parts: a function that needs to be invoked in JAVA language and a core library of the Android.

The application layer and the application framework layer run on the virtual machine. The virtual machine executes JAVA files at the application layer and the application framework layer as binary files. The virtual machine is configured to implement functions such as object lifecycle management, stack management, thread management, security and exception management, and garbage collection.

A system library may include a plurality of function modules, such as a surface manager (surface manager), media libraries (media libraries), 3D graphics processing library (for example, OpenGL ES), and a 2D graphics engine (for example, SGL).

The surface manager is used to manage a display subsystem, and provide fusion of 2D and 3D layers for multiple applications.

The media libraries support multiple common audio and video formats for playback and recording, as well as static image files. The media libraries may support a variety of audio and video encoding formats, such as MPEG4, H.264, MP3, AAC, AMR, JPG, and PNG.

The 3D graphics processing library is used to implement 3D graphics drawing, image rendering, compositing, and layer processing.

The 2D graphics engine is a graphics engine for 2D graphics.

The kernel layer is a layer between hardware and software. The kernel layer includes at least a display driver, a camera driver, an audio driver, a sensor driver, an inner screen driver, and an outer screen driver.

The terminal device may be an electronic device including an inner screen and an outer screen, or may be a foldable screen device including an outer screen. Using the foldable screen device including the outer screen as an example, one of screens is an inner screen that can be folded, namely, a foldable screen, and the user can unfold the inner screen for use when watching a video or playing a game. When the user does not use the inner screen, the foldable screen device can be folded to facilitate carrying. The other screen is an outer screen, and the outer screen is disposed on an opposite side of the inner screen. When the user folds the foldable screen device, the inner screen is folded, and the outer screen is exposed, to help the user directly operate on the outer screen to use the foldable screen device without unfolding the inner screen. For example, the user can operate on the outer screen to answer or make a call, turn off an alarm clock, and the like. Usually, when the user unfolds the foldable screen device, the inner screen is unfolded, the foldable screen device assumes that the user needs to use the inner screen in this case, and the outer screen is automatically turned off. However, when the user uses the inner screen, if code scanning payment is required, the user needs to open a payment code on the inner screen and flip over the foldable screen device, to enable the inner screen to face a barcode scanner, to perform code scanning. This is inconvenient for operation of a big-volume foldable screen device and affects user experience.

Figure 3:
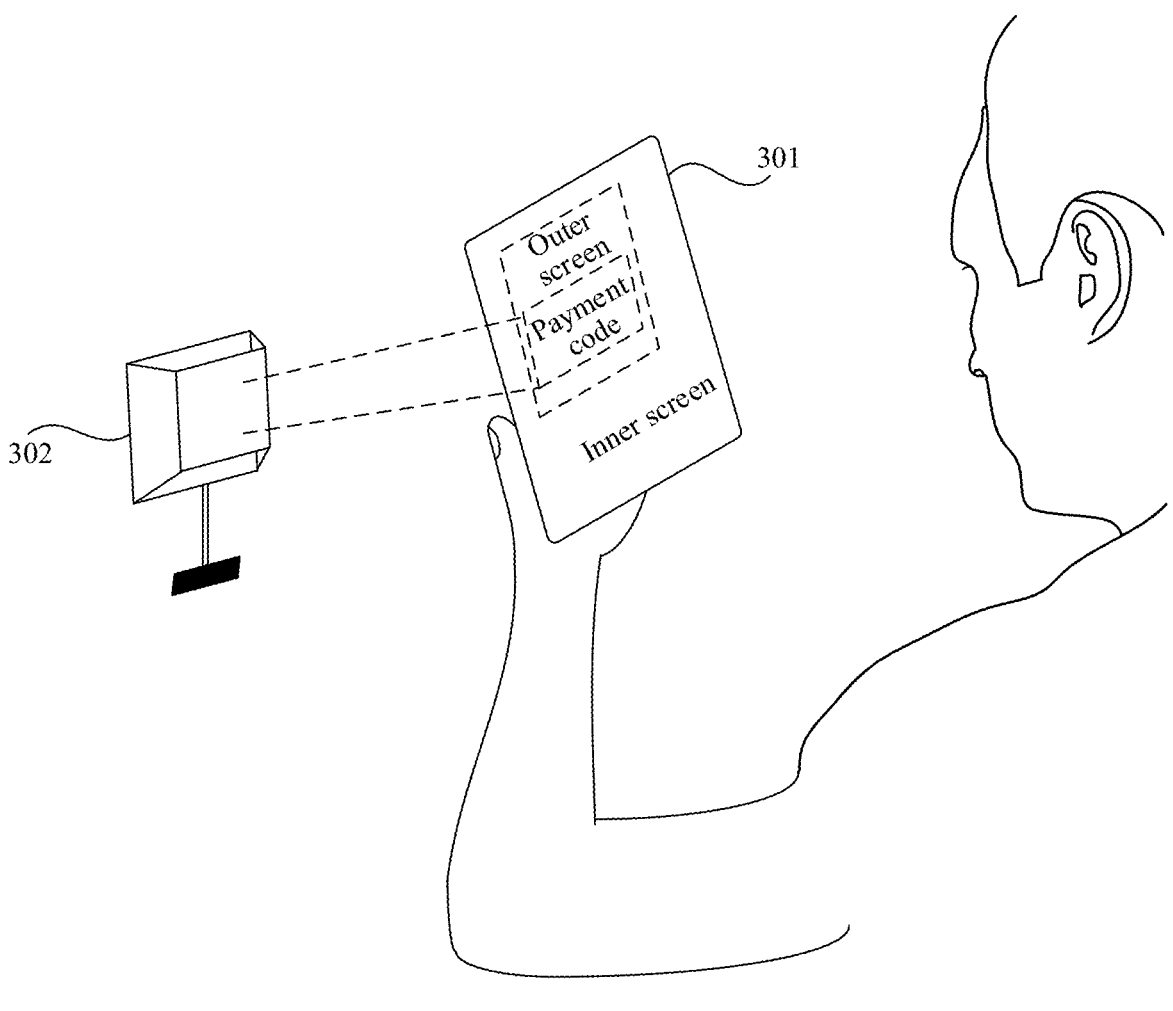
FIG. 3 is a schematic scenario diagram of an example in which an outer screen is used for code scanning according to an embodiment of this application.

In a technical solution of this application, when the user needs to display a screen to another person or another device, for example, display a payment code for payment, the outer screen may be turned on by a quick operation, and the payment code that needs to be displayed is projected to the outer screen of an electronic device 301 for display. As shown in FIG. 3, for example, when the user needs to perform code scanning payment, the operation of code scanning payment can be completed by displaying the payment code to a barcode scanner 302 by using the outer screen without a need to flip over the electronic device 301, so that the code scanning is more convenient, portability of the electronic device 301 to perform code scanning is improved, and viewing of the user on the inner screen is not affected, so as to improve user experience.

For ease of understanding, in the following embodiments of this application, a terminal device having the structure shown in FIG. 1 and FIG. 2a-FIG. 2c is used as an example, and a screen display method of an electronic device provided in this embodiment of this application is described in detail with reference to accompanying drawings and application scenarios.

Figure 4A:
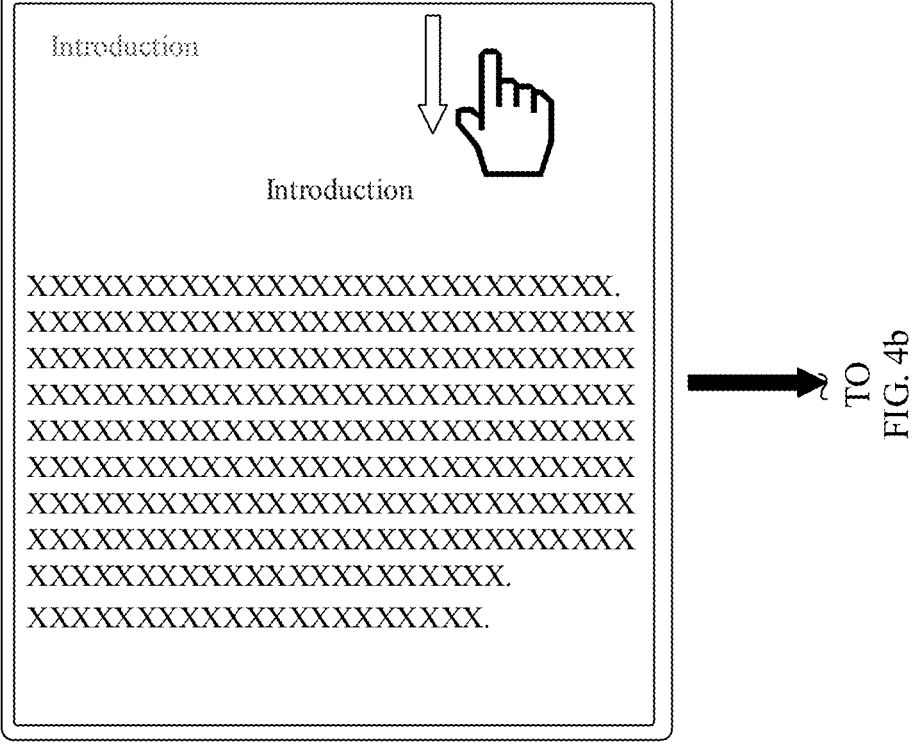
FIG. 4*a*-FIG. 4*d* are a schematic diagram of an example interface displayed on an inner screen and an outer screen according to an embodiment of this application.
Figures 4A, 4B, 4C, 4D:
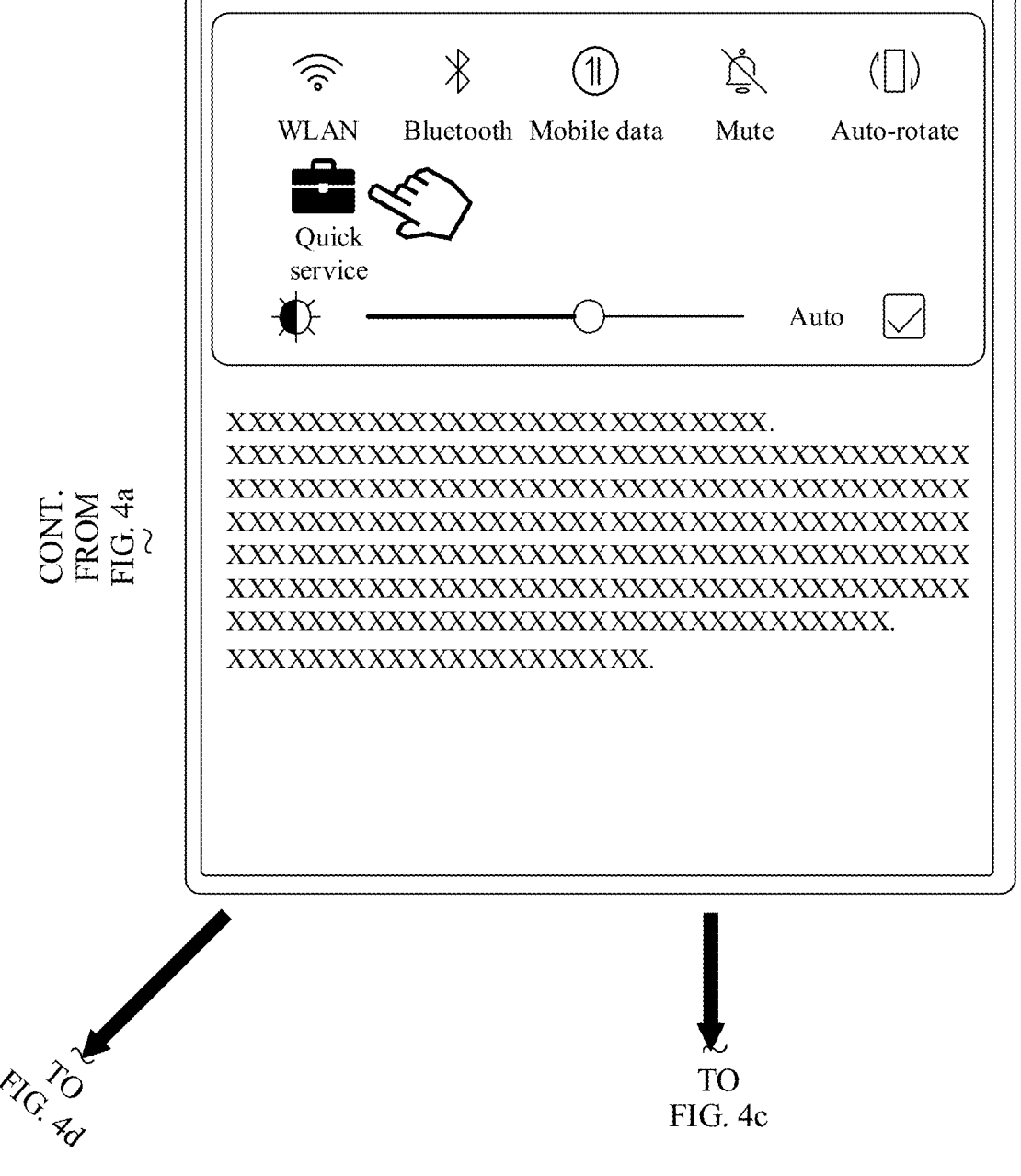
Figures 4B, 4C:
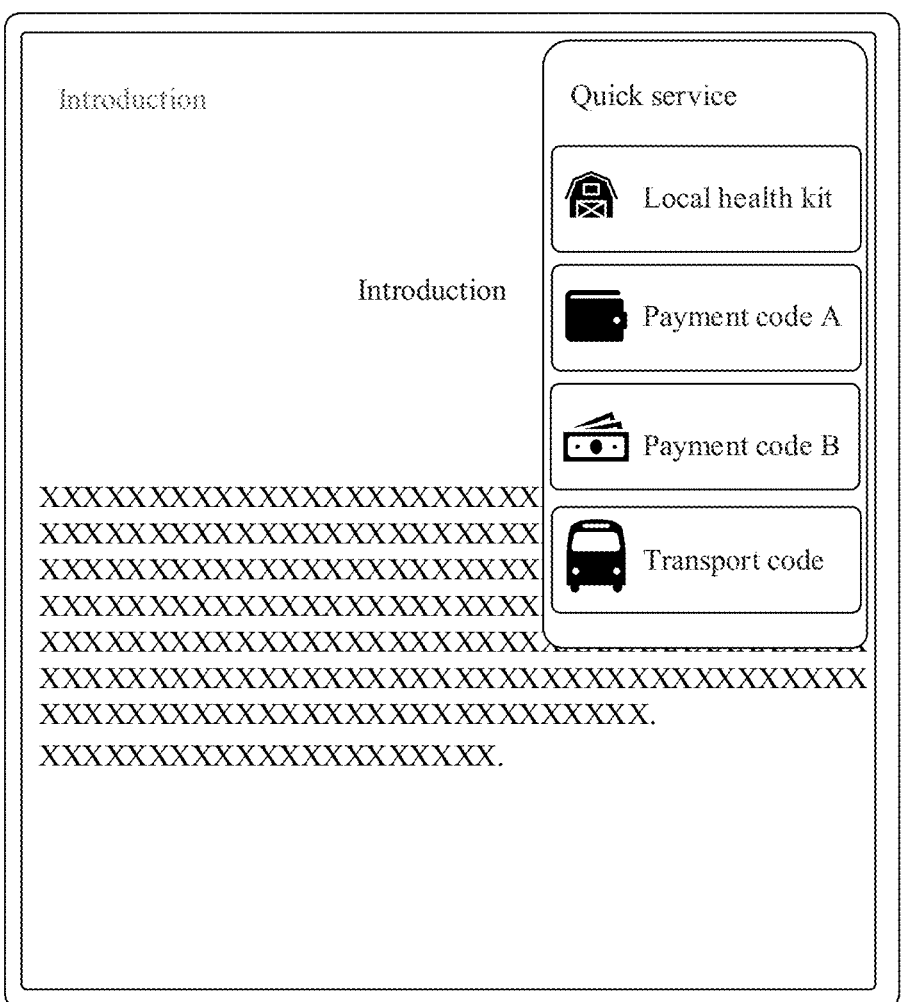
Figure 4D:
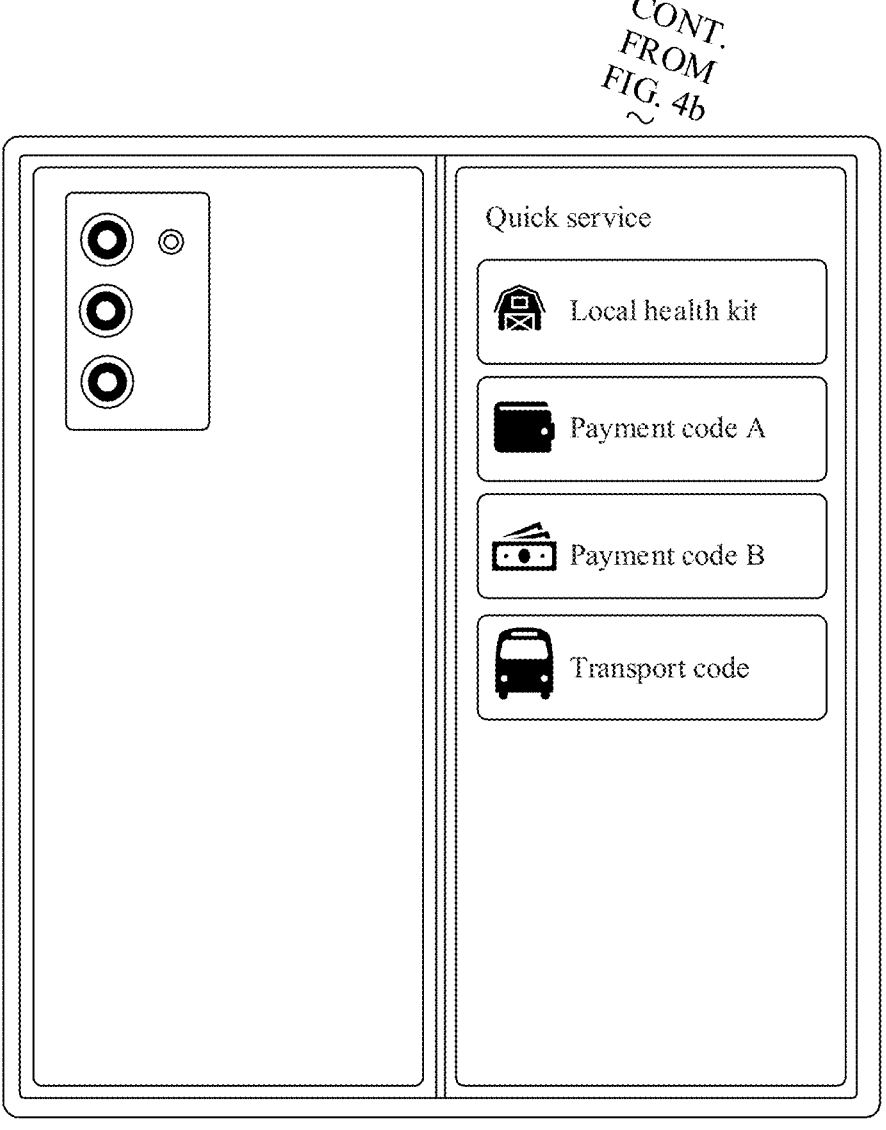

When a user uses an inner screen, for example, when the user reads a novel by viewing the inner screen, the inner screen may display an interface of novel content as shown in FIG. 4a, and an outer screen is turned off. If the user needs to perform code scanning payment on a purchase at this time, the user can operate on the inner screen to open a payment code and project the payment code to the outer screen for display, so as to scan the code. For example, when the user needs to display the payment code, an operation, as shown in FIG. 4a, that a pull-down taskbar is enabled by pulling down from the top of the inner screen may be performed on the inner screen. In this case, the inner screen displays a pull-down taskbar as shown in FIG. 4b, and the pull-down taskbar includes a "quick service" icon. As an operation shown in FIG. 4b, the user may tap the "quick service" icon, to open a window of the quick service as shown in FIG. 4c. The window of the quick service may include at least one control, each control corresponds to one APP, and the user can open a corresponding page of a corresponding APP by tapping the control. Optionally, the window of the quick service may be displayed in a form of a floating window as shown in FIG. 4c, and the outer screen also synchronously displays a window of the quick service as shown in FIG. 4d. FIG. 4d is a schematic diagram of a rear view of an unfolded electronic device, and the diagram includes an outer screen and a rear cover with a camera.

Figures 5A, 5B, 5C:
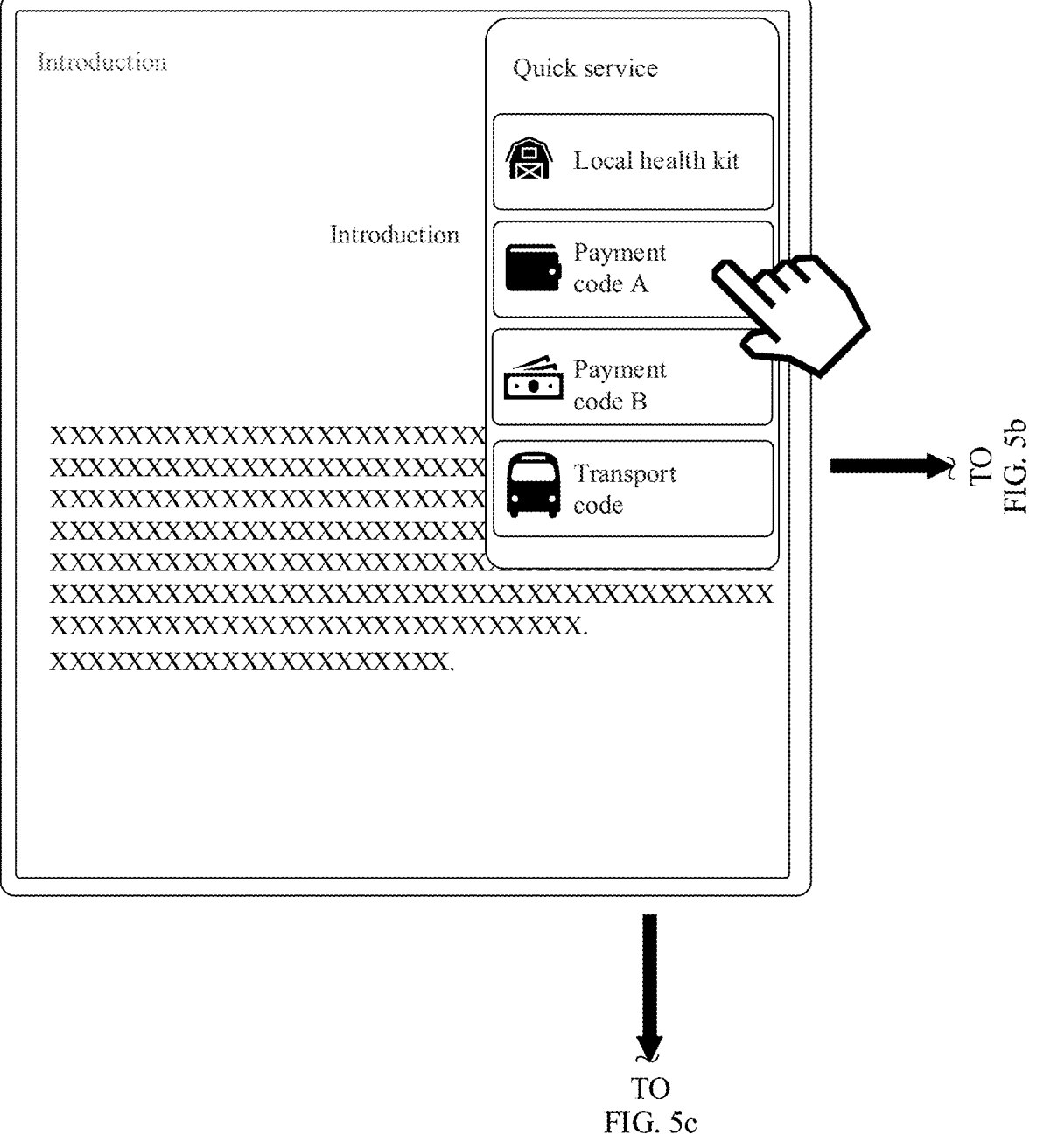
FIG. 5*a*-FIG. 5*c* are a schematic diagram of another example interface displayed on an inner screen and an outer screen according to an embodiment of this application.
Figure 5B:
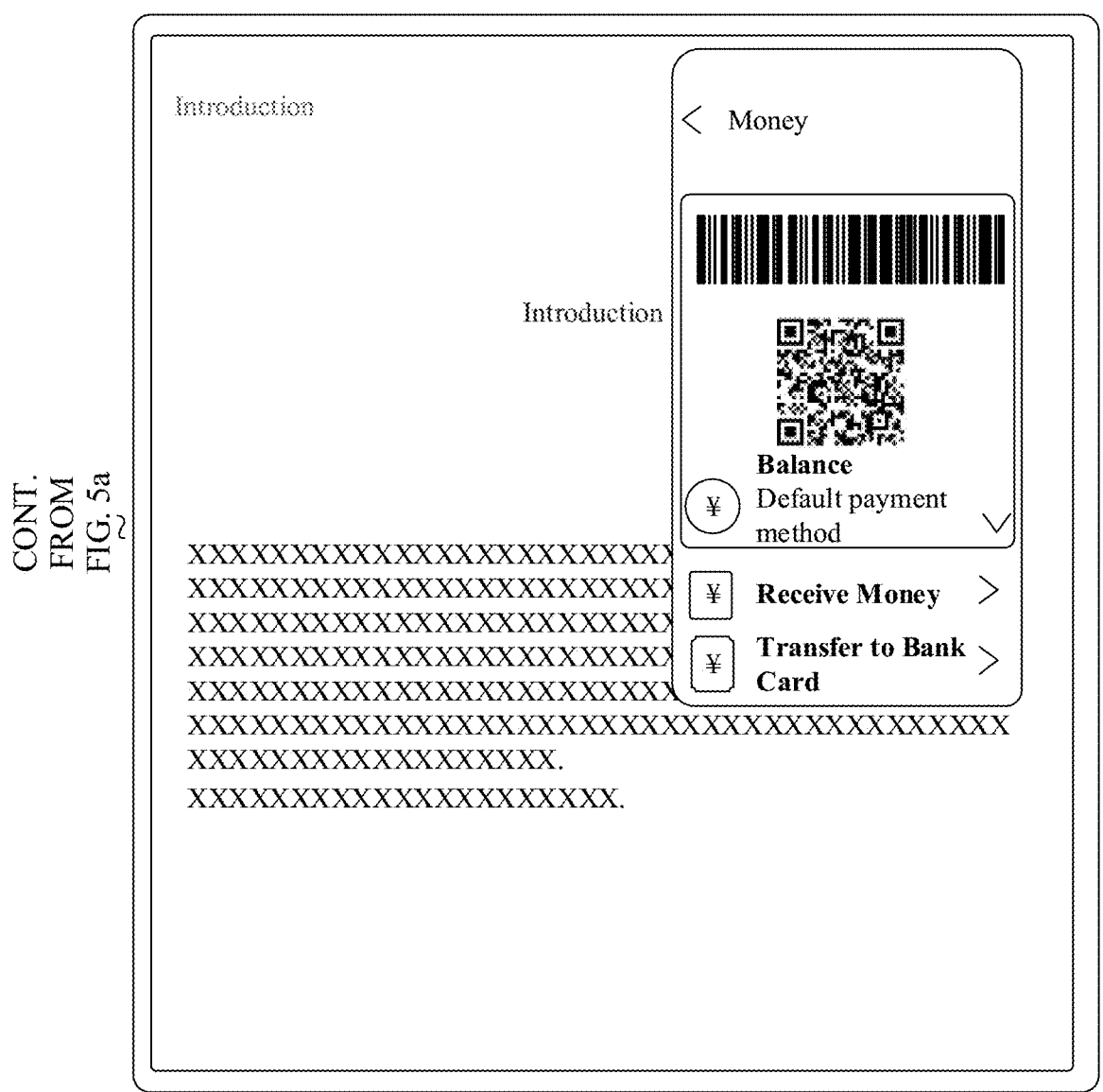
Figure 5C:
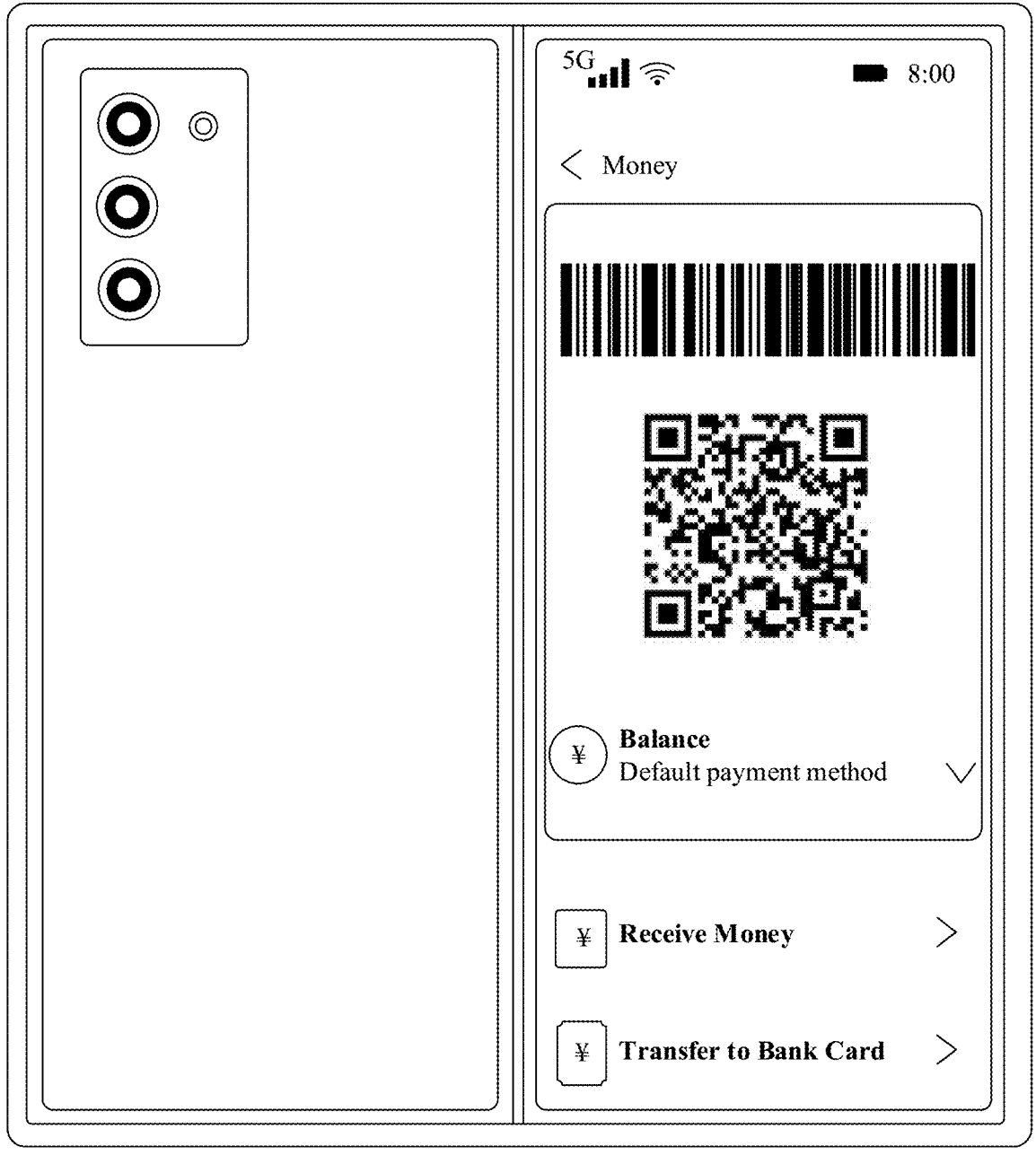

As an operation shown in FIG. 5a, the user taps on a control of payment code A, and in response to the operation of the user, the foldable screen device switches the window of the quick service to the payment code A shown in FIG. 5b, and also switches the window of the quick service to the payment code A as shown in FIG. 5c on the outer screen. The user can align the outer screen with the barcode scanner to facilitate code scanning payment without a need to invert the electronic device for code scanning.

In some other embodiments, the user may also double-tap a back of the electronic device (for example, double-tap the outer screen of the foldable screen) to wake up the outer screen (that is, turn on the outer screen), and display the window of the quick service as shown in FIG. 4d on the outer screen. Optionally, in response to an operation of double-tapping the back, the inner screen may also display the window of the quick service in the form of a floating window, as shown in FIG. 4c.

Optionally, in an unfolded state, the electronic device may turn off an operation authority of the outer screen. When the operation authority of the outer screen is turned off, the user cannot tap the outer screen to operate, and only an owner holding the electronic device in hand can open the payment code by tapping the control of the payment code on the inner screen, so as to avoid information disclosure caused by another person opening the payment code from the outer screen. Optionally, in a folded state, the electronic device may turn on the operation authority of the outer screen, and when the operation authority of the outer screen is turned on, the user may turn on the payment code by tapping the control of the payment code in the window of the quick service on the outer screen to perform code scanning payment.

As shown in FIG. 4a-FIG. 4d, that the window of the quick service includes four controls, namely, local health kit, payment code A, payment code B, and transport code, is used as an example. When the user taps a control of the local health kit in the window of the quick service, the outer screen can display a health code carrying personal health information. The health code can identify a health status of the user, to help the user scan the code for passing, or record the personal health information. When the user taps the control of the transport code in the window of the quick service, the outer screen can display the transport code, to help the user scan the transport code or pass a gate.

Figure 6A:
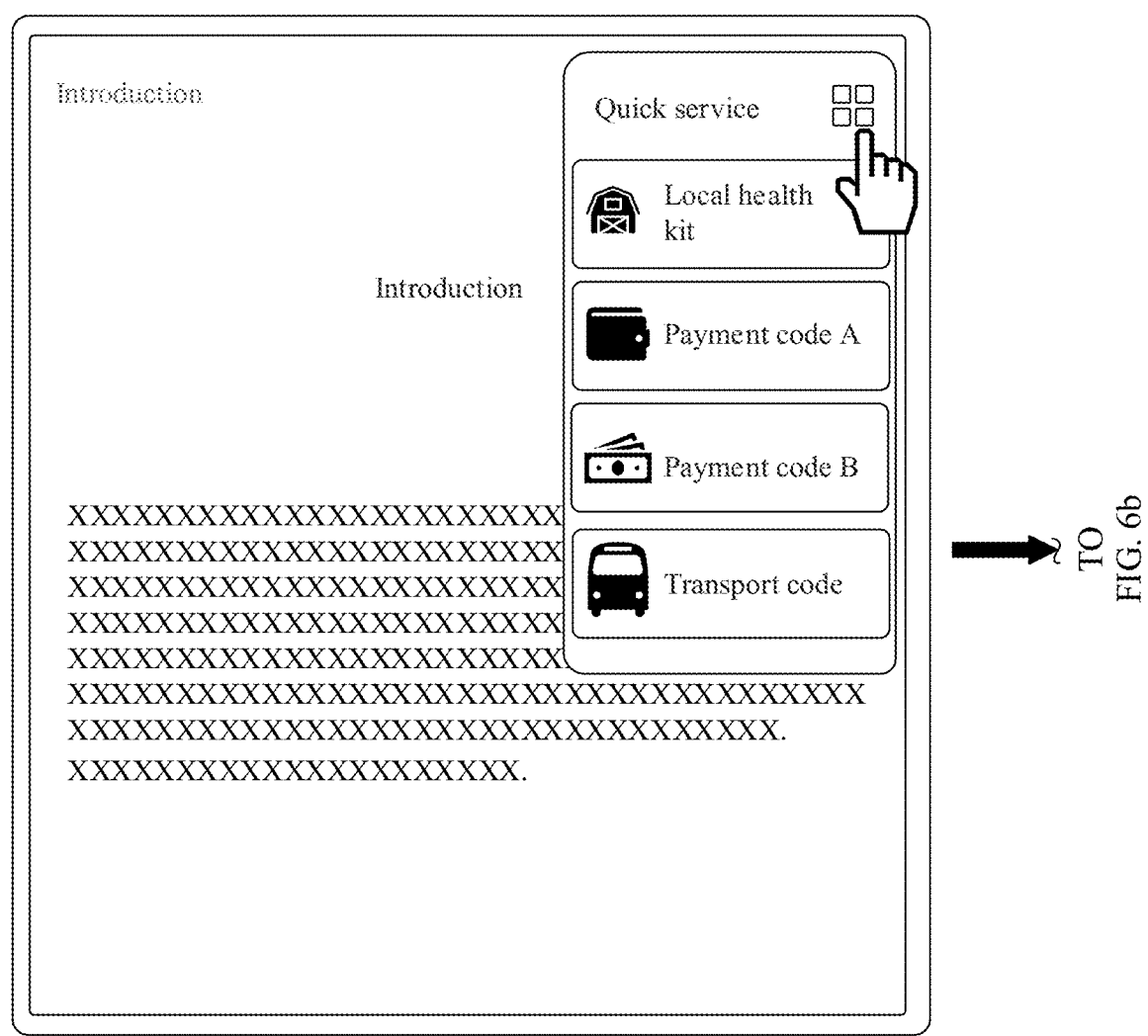
FIG. 6*a*-FIG. 6*d* are a schematic diagram of another example interface displayed on an inner screen and an outer screen according to an embodiment of this application.
Figure 6B:
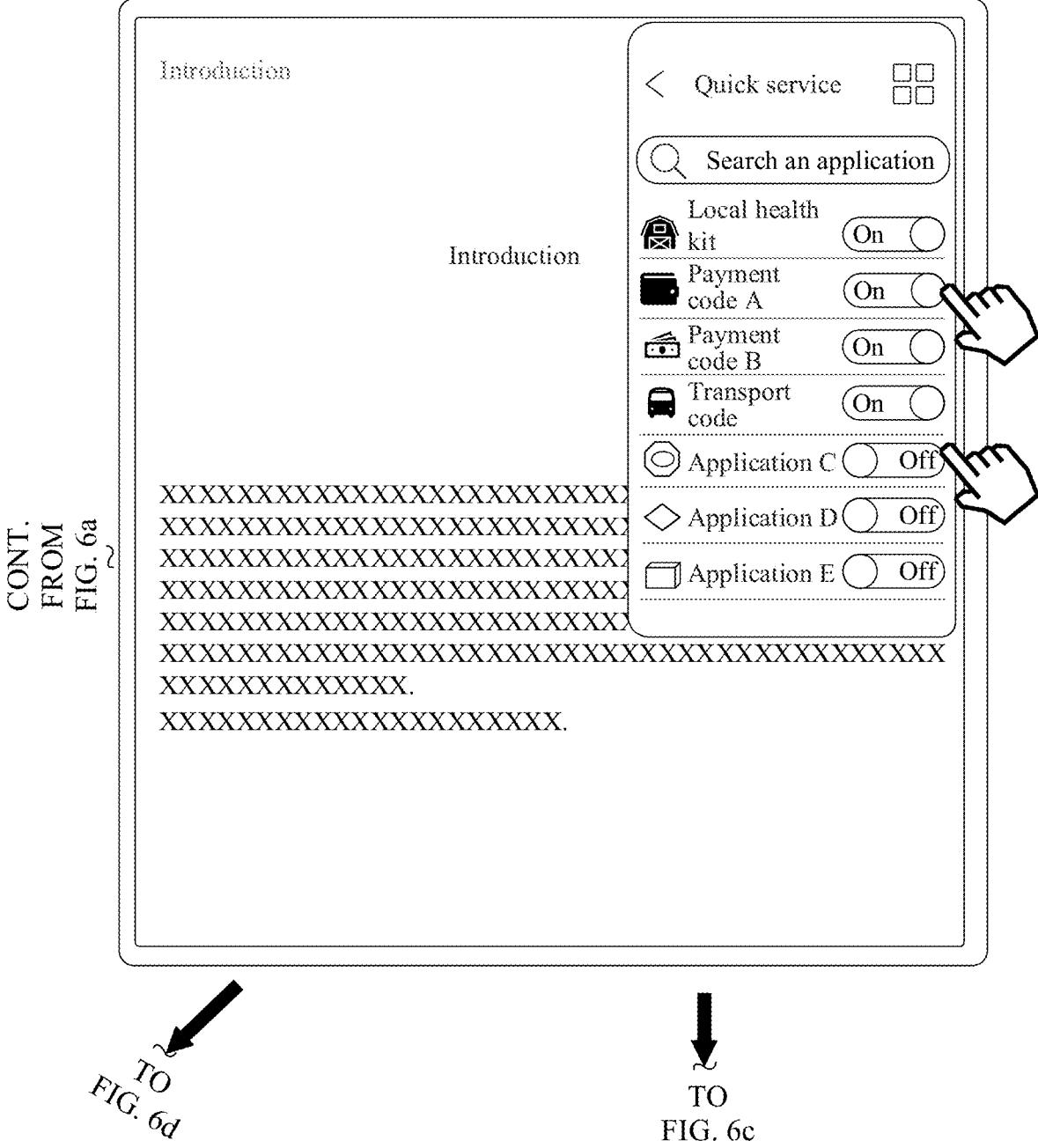
Figures 6B, 6C:
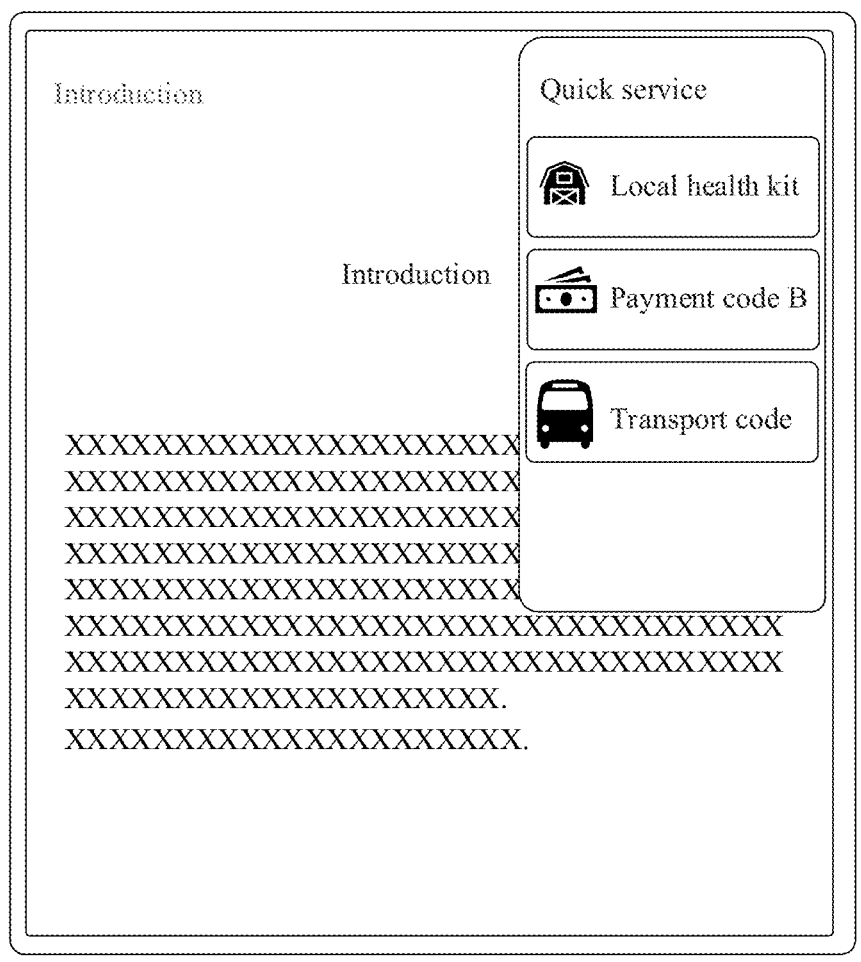
Figure 6D:
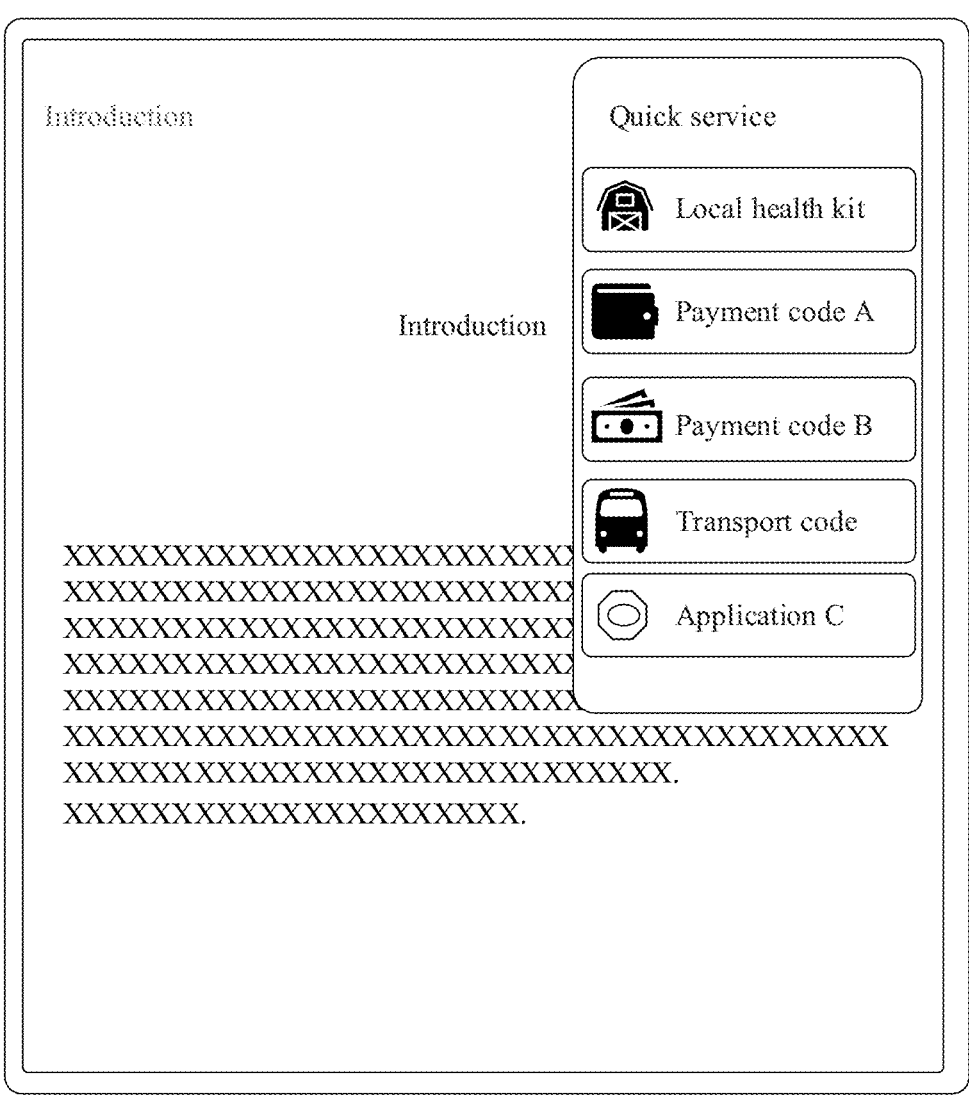
Figure 7A:
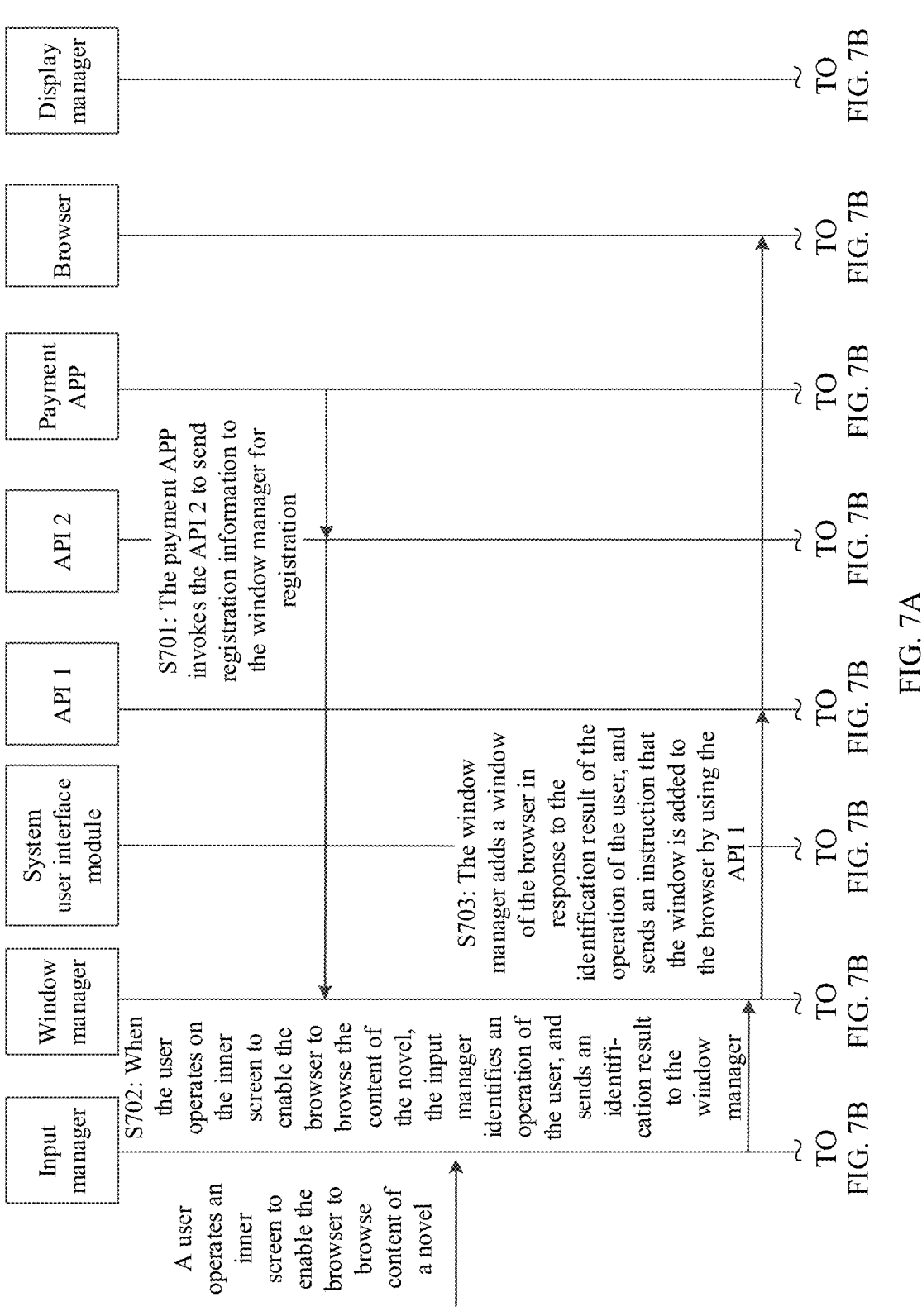
FIG. 7A-FIG. 7D are a diagram of an interaction process of an example screen display method according to an embodiment of this application.
Figure 7B:
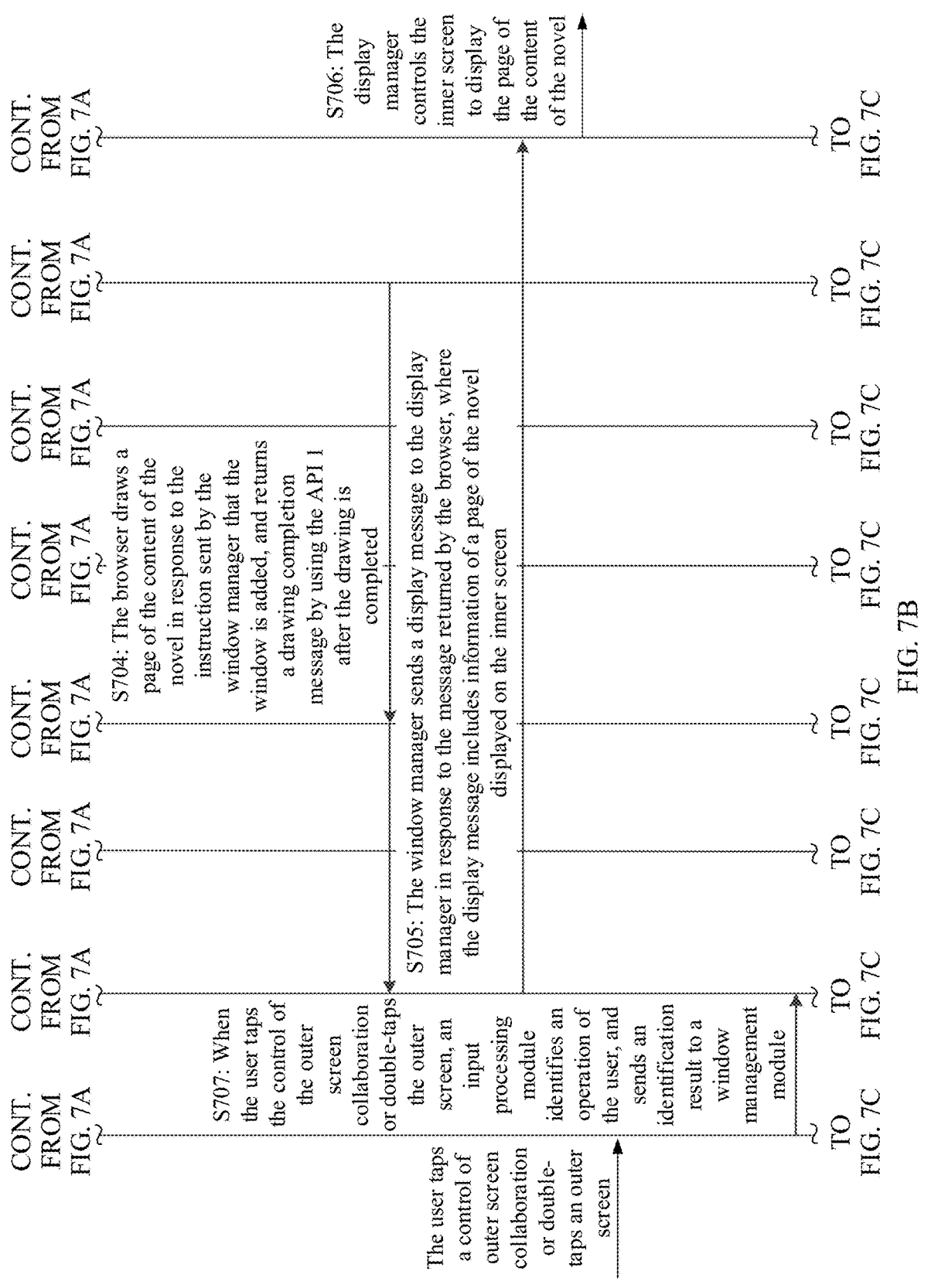
Figure 7C:
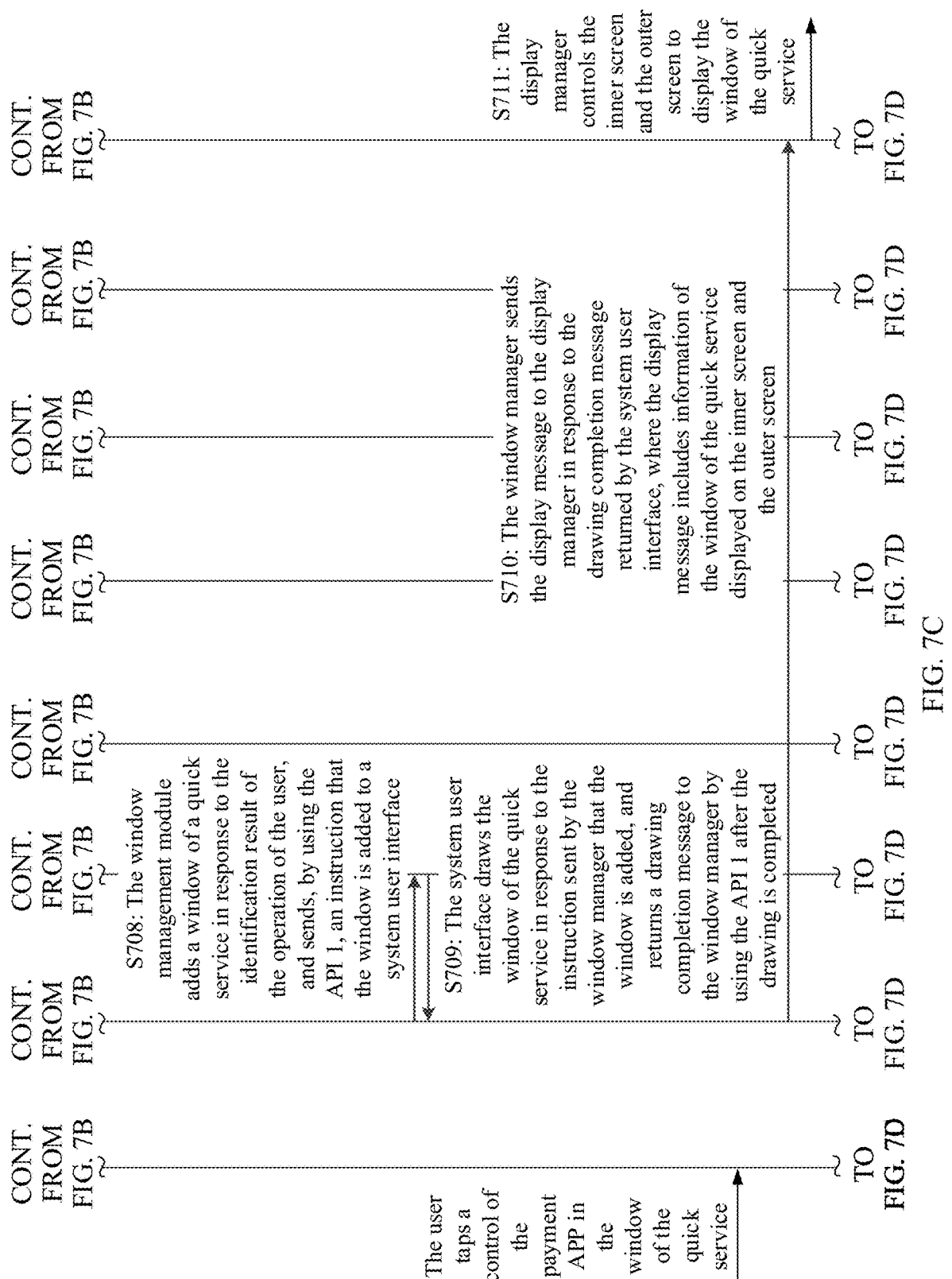
Figure 7D:
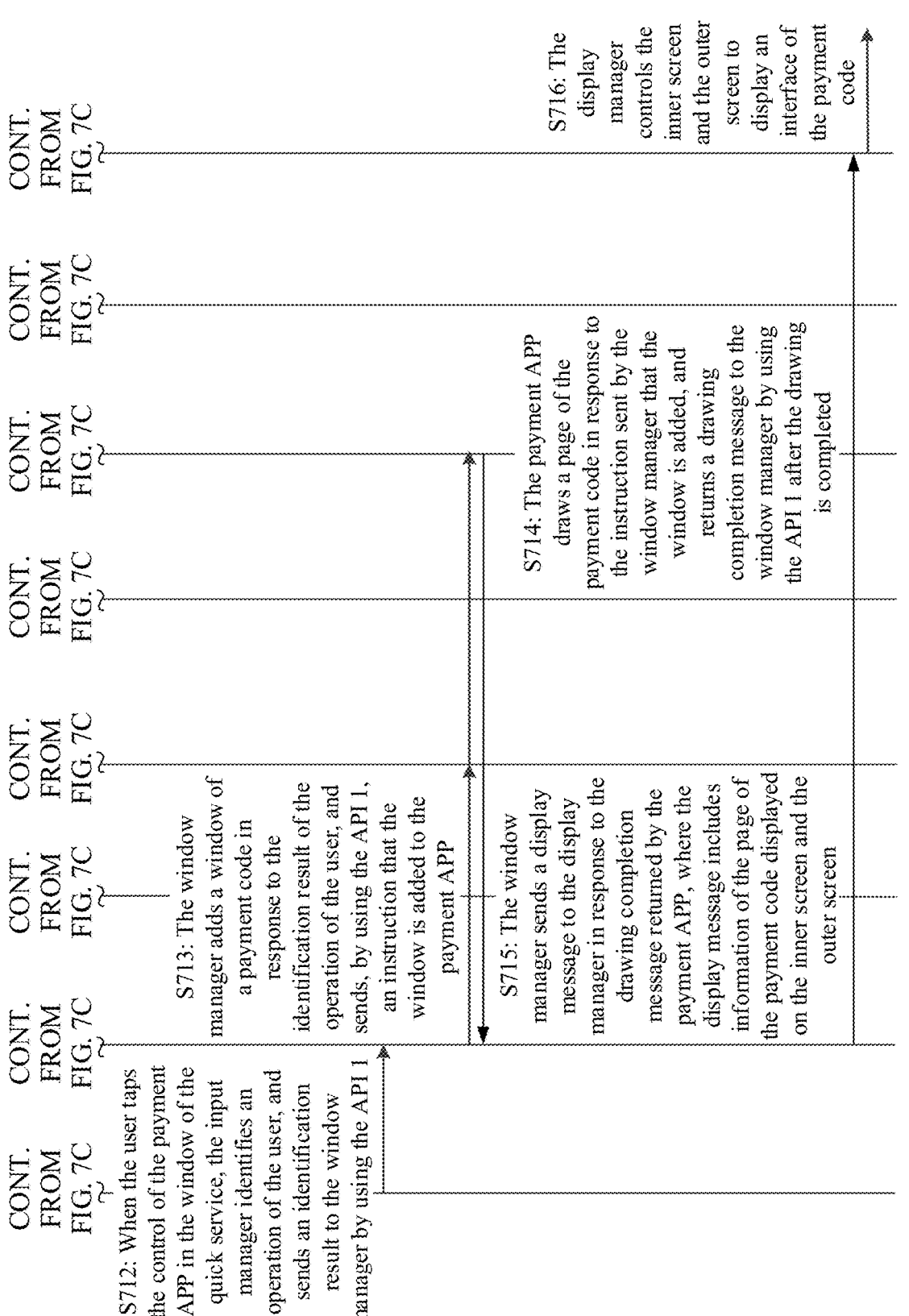

In some embodiments, controls in the window of the quick service may include corresponding controls of default APPs, and the user can edit types of the controls as required, including adding or deleting a control. For example, the user may perform an operation as shown in FIG. 6a, that is, tapping the setting button in the window of the quick service, and the window of the quick service may display a shortcut application setting interface as shown in FIG. 6b. The shortcut application setting interface includes a list of a plurality of APPs supporting the quick service, and each entry in the list includes a control key of the APP. The user can tap the control key of the APP to delete, from the quick service, the APP that has been added to the quick service. For example, if the user taps the control key of the payment code A on the shortcut application setting interface as shown in FIG. 6b, the quick service function of the payment code A is disabled, and as shown in FIG. 6c, the control of the payment code A no longer appears in the window of the quick service. The user can also add an APP that does not enable the quick service function to the quick service by tapping the control key. For example, if the user taps a control key of an application C on the shortcut application setting interface as shown in FIG. 6b, a quick service function of the application C is enabled, and as shown in FIG. 6d, a control of the application C may be added to the window of the quick service. If no APP on a current shortcut application setting interface needs to be edited, the user can also drag the list up and down to find an APP, or input a name of the APP in a search bar for searching, so that the user can easily edit the APP in the quick service, and use of the quick service is more flexible.

In the foregoing embodiment, the user can display a code scanning interface that needs to be displayed on the outer screen by operating the electronic device, and the code may include a payment code, a health code, a transport code, and the like. Therefore, the user does not need to flip over the electronic device to display the code scanning interface by using the inner screen, and only needs to display the outer screen to implement code scanning, thereby facilitating a code scanning operation. In addition, the user can also perform the code scanning operation without interrupting viewing of the inner screen by the user, thereby improving user experience.

In some embodiments, during installation, a third-party APP may send, by using an application programming interface (application programming interface. API) 2, registration information to a window manager for registration in a system, and the registration information is used to represent that the third-party APP can provide an outer screen collaboration service, for example, the information includes an icon of the third-party APP, a service name, and a callback method. A third-party APP that is not registered in the system can be considered to be unable to provide the outer screen collaboration service. Optionally, when running for the first time after the installation is completed, the third-party APP may send, by using the API 2, registration information to the window manager for registration in the system, or the third-party APP may store the registration information to a fixed path during installation, and the electronic device may obtain the registration information based on the fixed path when the electronic device is started, to determine which APP can provide the outer screen collaboration function. Optionally, the electronic device may also preset registration information of some third-party APPs in the system, such as a payment APP, and a transport APP, which are often APPs that people need to use on the outer screen, so that the electronic device may preset registration information of these APPS. It should be noted that the foregoing API 2 is an interface different from an API 1: The API 1 is an interface used by the third-party APP to add a window for display, and the API 2 is an interface used by the third-party APP to register and coordinate with the window manager.

FIG. 7A-FIG. 7D illustrate in detail an outer screen display process of an electronic device by using a scenario in which a user opens an outer screen for code scanning payment when reading a novel through a browser as an example. The process includes:

S701: The payment APP invokes the API 2 to send registration information of the payment APP to a window manager for registration.

S702: When the user operates on the inner screen of the electronic device to enable the browser to browse novel content, an input manager in the electronic device identifies an operation of the user, and sends an identification result to the window manager.

S703: The window manager adds a window of the browser in response to the identification result of the operation of the user, and sends, by using the API 1, an instruction that the window is added to the browser.

S704: The browser draws, in response to the instruction sent by the window manager that the window is added, a corresponding page of the browser for displaying the novel content, and returns a drawing completion message to the window manager by using the API 1 after the drawing is completed.

S705: The window manager sends a display message to a display manager in response to the drawing completion message returned by the browser, where the display message includes information of a novel page drawn by the browser displayed on the inner screen.

S706: The display manager controls the inner screen to display the novel page.

It should be noted that S701 is not necessarily performed before S702, but may be performed after S702, S703, S704, S705, or S706, provided that S701 is performed before S707.

S707: When the user taps the control of the outer screen collaboration or double-taps the outer screen, an input processing module identifies an operation of the user, and sends an identification result to the window management module.

S708: The window management module adds the window of the quick service in response to the identification result of the operation of the user, and sends, by using the API 1, an instruction that the window is added to a system user interface (system UI).

S709: The system user interface draws the window of the quick service in response to the instruction sent by the window manager that the window is added, and returns a drawing completion message to the window manager by using the API 1 after the drawing is completed.

S710: The window manager sends the display message to the display manager in response to the drawing completion message returned by the system user interface, where the display message includes information of the window of the quick service displayed on the inner screen and the outer screen.

S711: The display manager controls the inner screen and the outer screen to display the window of the quick service.

S712: When the user taps the control of the payment APP in the window of the quick service, the input manager identifies an operation of the user, and sends an identification result to the window manager by using the API 1.

S713: The window manager adds a window of the payment code in response to the identification result of the operation of the user, and sends, by using the API 1, an instruction that the window is added to the payment APP.

S714: The payment APP draws a page of the payment code in response to the instruction sent by the window manager that the window is added, and returns a drawing completion message to the window manager by using the API 1 after the drawing is completed.

S715: The window manager sends a display message to the display manager in response to the drawing completion message returned by the payment APP, where the display message includes information of the page of the payment code displayed on the inner screen and the outer screen.

S716: The display manager controls the inner screen and the outer screen to display the interface of the payment code.

In this case, the user can perform code scanning payment by using the outer screen without a need to flip over the electronic device, to make the code scanning payment more convenient.

If a user needs to share a screen with another person, the user can also project an interface of an inner screen to an outer screen for display by enabling an outer screen collaboration function, and the another person can view; by using the outer screen, the interface that the user needs to display. The user does not need to flip over an electronic device to share the screen with another user, to make screen sharing more convenient.

Figure 8A:
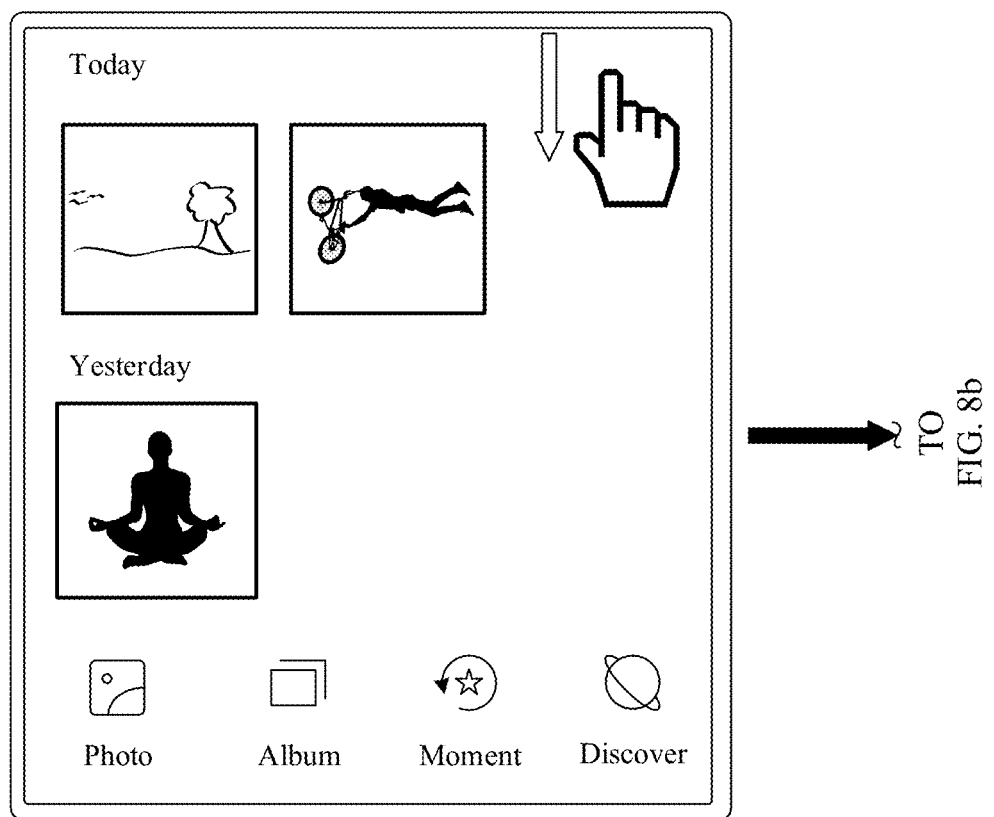
FIG. 8*a*-FIG. 8*d* are a schematic diagram of another example interface displayed on an inner screen and an outer screen according to an embodiment of this application.
Figure 8B:
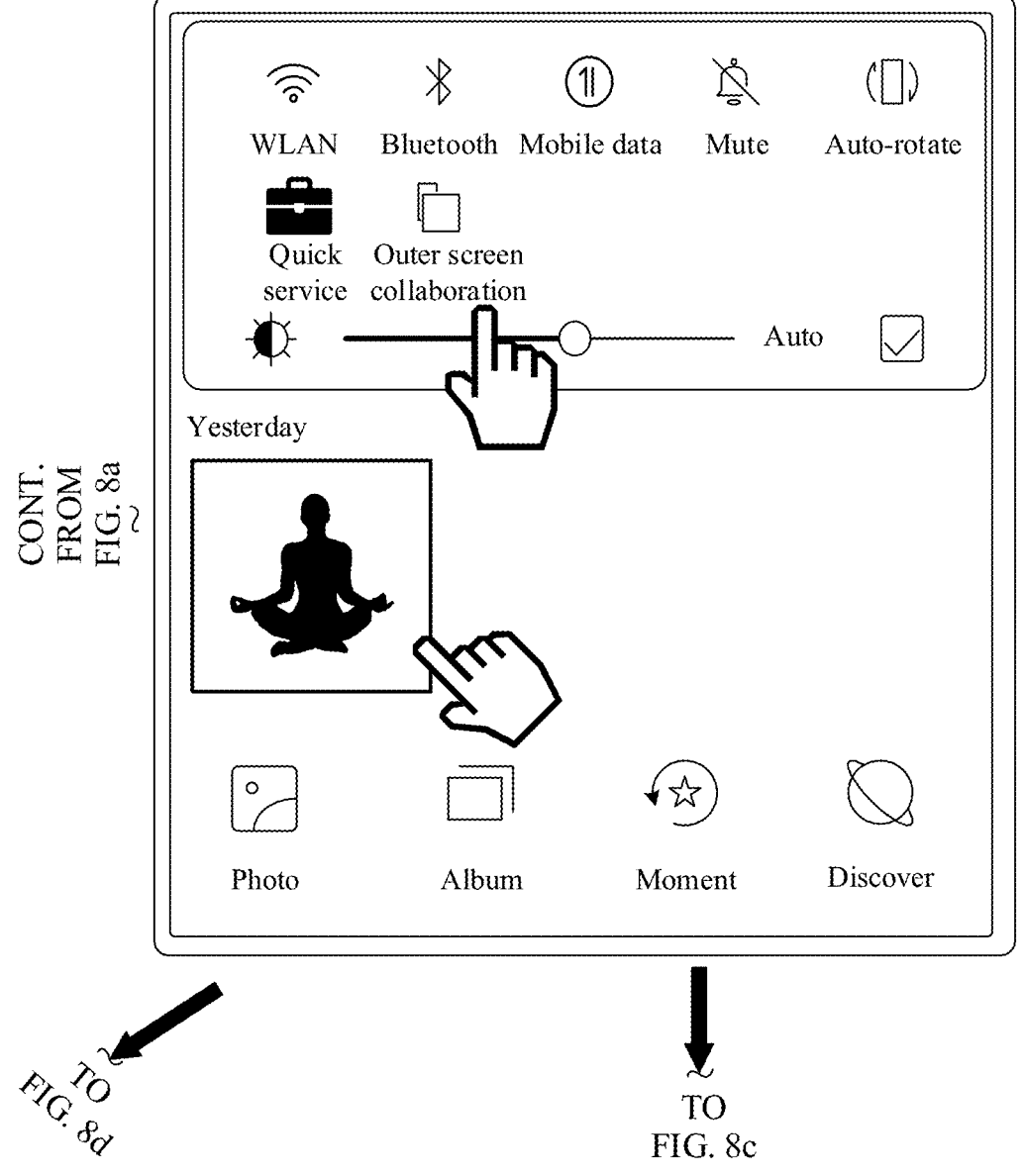

For example, an owner displays a picture to another person. After the user opens a gallery; the inner screen may display an interface of the gallery as shown in FIG. 8a, and the interface of the gallery includes a plurality of photos. The user may perform an operation as shown in FIG. 8a, that is, pulling down from the top of the inner screen, and then the top of the inner screen displays a pull-down taskbar as shown in FIG. 8b. The pull-down taskbar includes a screen-projecting control. FIG. 8a-FIG. 8d show an example in which the screen-projecting control is displayed as a control of "outer screen collaboration".

Figures 8B, 8C:
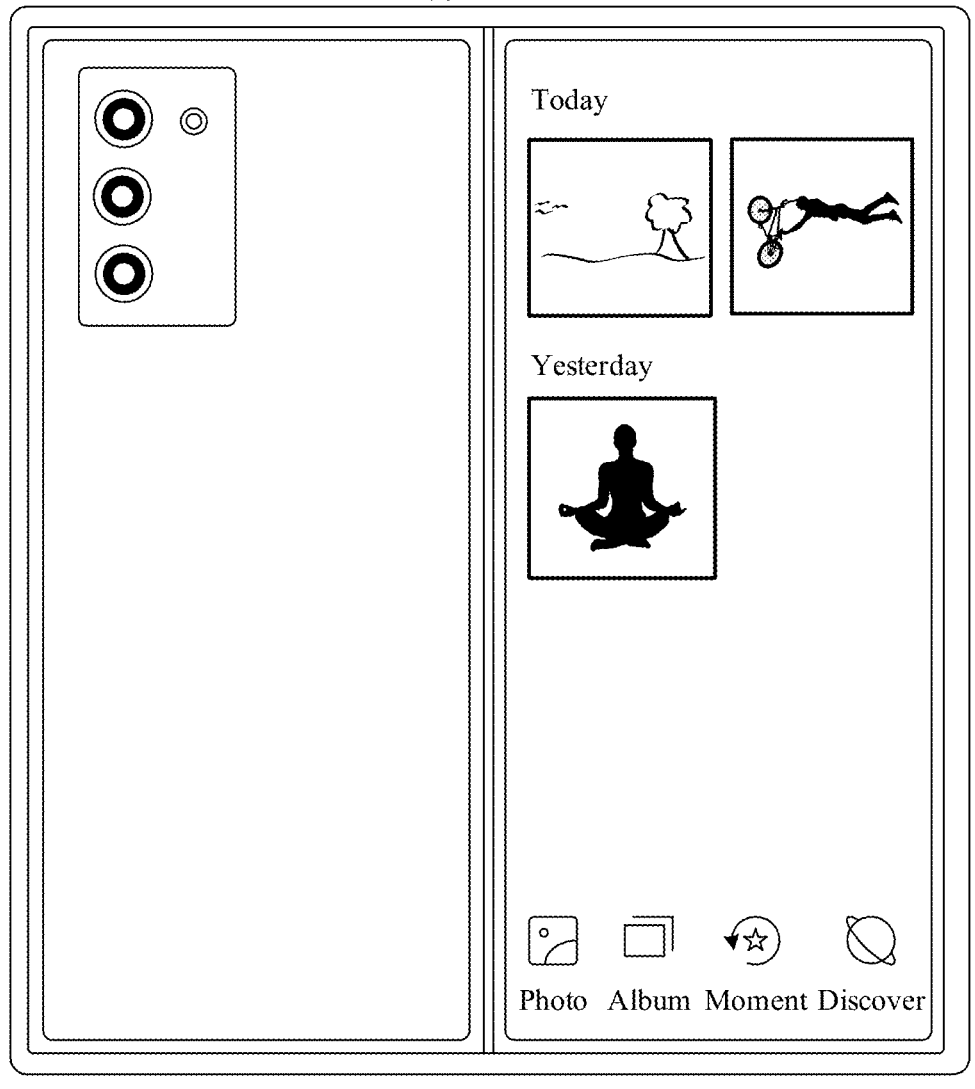
Figure 8D:
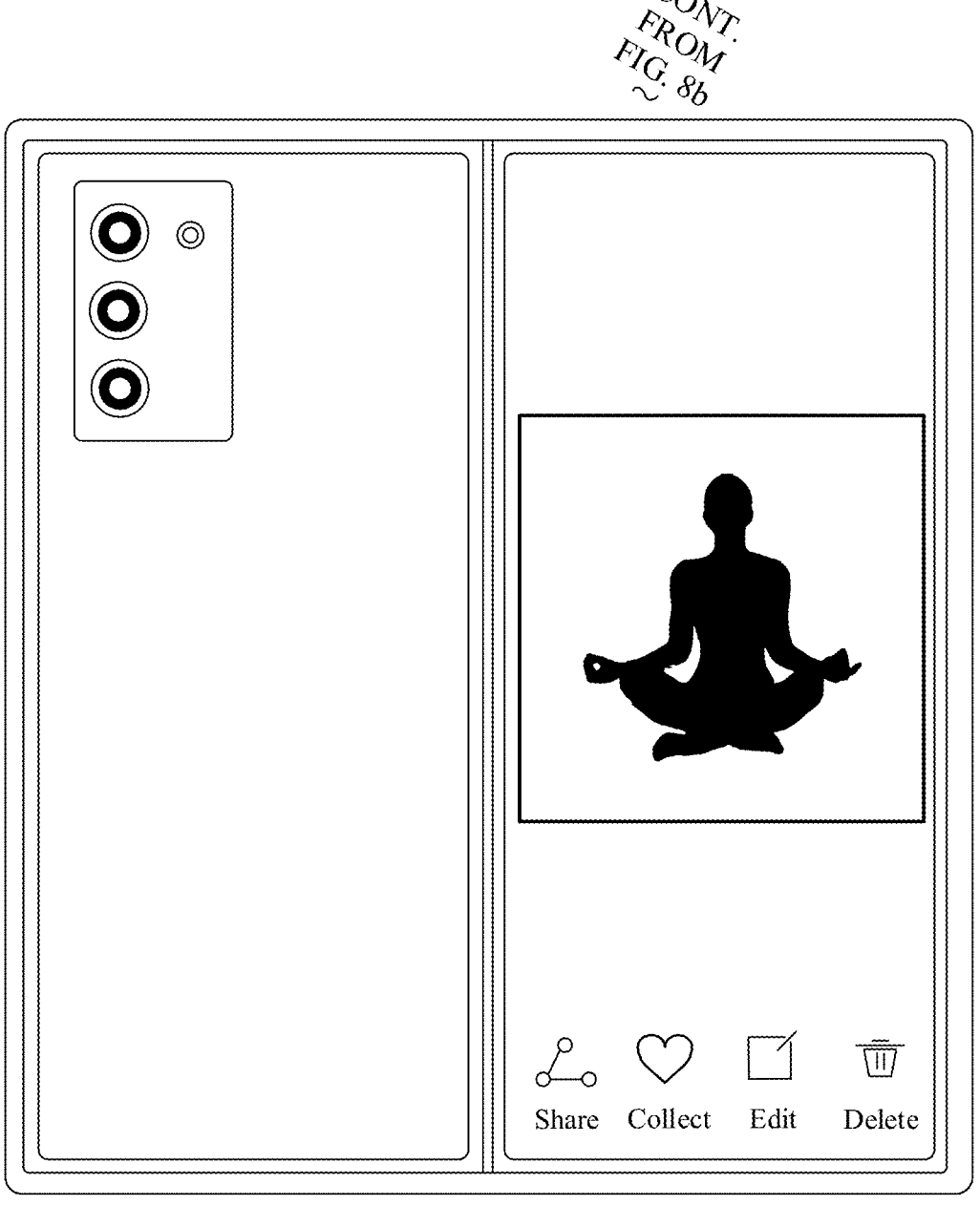

If the user performs an operation of tapping the control of the "outer screen collaboration" in the pull-down taskbar as shown in FIG. 8b, the outer screen may be an interface of the gallery as shown in FIG. 8*c*. If the user performs an operation of tapping one of the pictures as shown in FIG. 8*b*, the inner screen unfolds to display the picture. In this case, if the outer screen is in an outer screen collaboration mode, the outer screen can be expanded to display the picture tapped by the user as shown in FIG. 8*d*. Another person can view, by using the outer screen, the picture tapped by the user. When the user slides left and right to switch the picture on the inner screen, the outer screen may synchronously display content displayed on the inner screen, so that another person can view, by using the outer screen, the content that the user needs to share.

In some embodiments, when an outer screen collaboration function is enabled, the electronic device may turn off an operation authority of the outer screen, to prevent another person from operating on the outer screen to switch displayed content, so as to prevent privacy disclosure of the user. In some embodiments, when the outer screen collaboration function is enabled, the electronic device may also turn on the operation authority of the outer screen, so that another user operates on the outer screen for use in a process of observing the outer screen; for example, the another user can slide the outer screen left and right to switch a picture, tap an editing control on the outer screen to edit a picture, tap a collecting control on the outer screen to collect a picture, or tap a sharing control on the outer screen to share a picture to another application. The operation authority of the outer screen of the electronic device is turned on, interaction between the inner screen and the outer screen in a process of collaboration can be improved, so as to enrich a collaboration function of the electronic device.

In some embodiments, when enabling the outer screen collaboration function, the user may also select a mirror collaboration mode or an asynchronous collaboration mode as required. The mirror collaboration mode is a mode in which the outer screen and the inner screen display the same content. The asynchronous collaboration mode is a mode in which content displayed on the outer screen is different from or is not identical with content displayed on the inner screen; for example, the outer screen displays the interface of an APP 1, and the inner screen displays the interface of an APP 2, or the outer screen displays the interface of the APP 1, and the inner screen displays the interface of the APP 1 in a form of a floating window in addition to the interface of the APP 2.

In the mode of asynchronous collaboration, the electronic device can project an interface of an APP that runs on the forefront end to the outer screen for display, and an interface of another APP can be displayed only on the inner screen. For example, the user invokes the quick service while viewing content of the browser. In this case, the electronic device is in the asynchronous collaboration mode by default. The window of the quick service is displayed in the form of a floating window while the interface of the browser is displayed on the inner screen, and the outer screen displays only the window of the quick service, but does not display the interface of the browser.

Figures 9A, 9B:
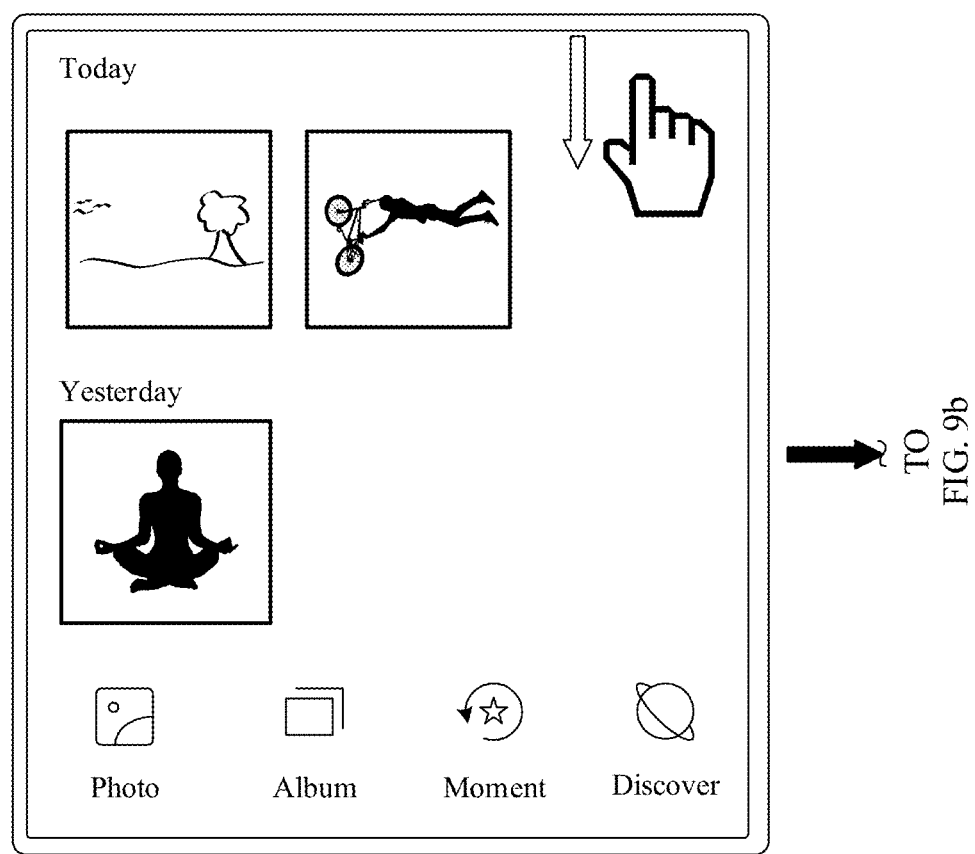
FIG. 9*a*-FIG. 9*d* are a schematic diagram of another example interface displayed on an inner screen and an outer screen according to an embodiment of this application.
Figures 9A, 9B, 9C:
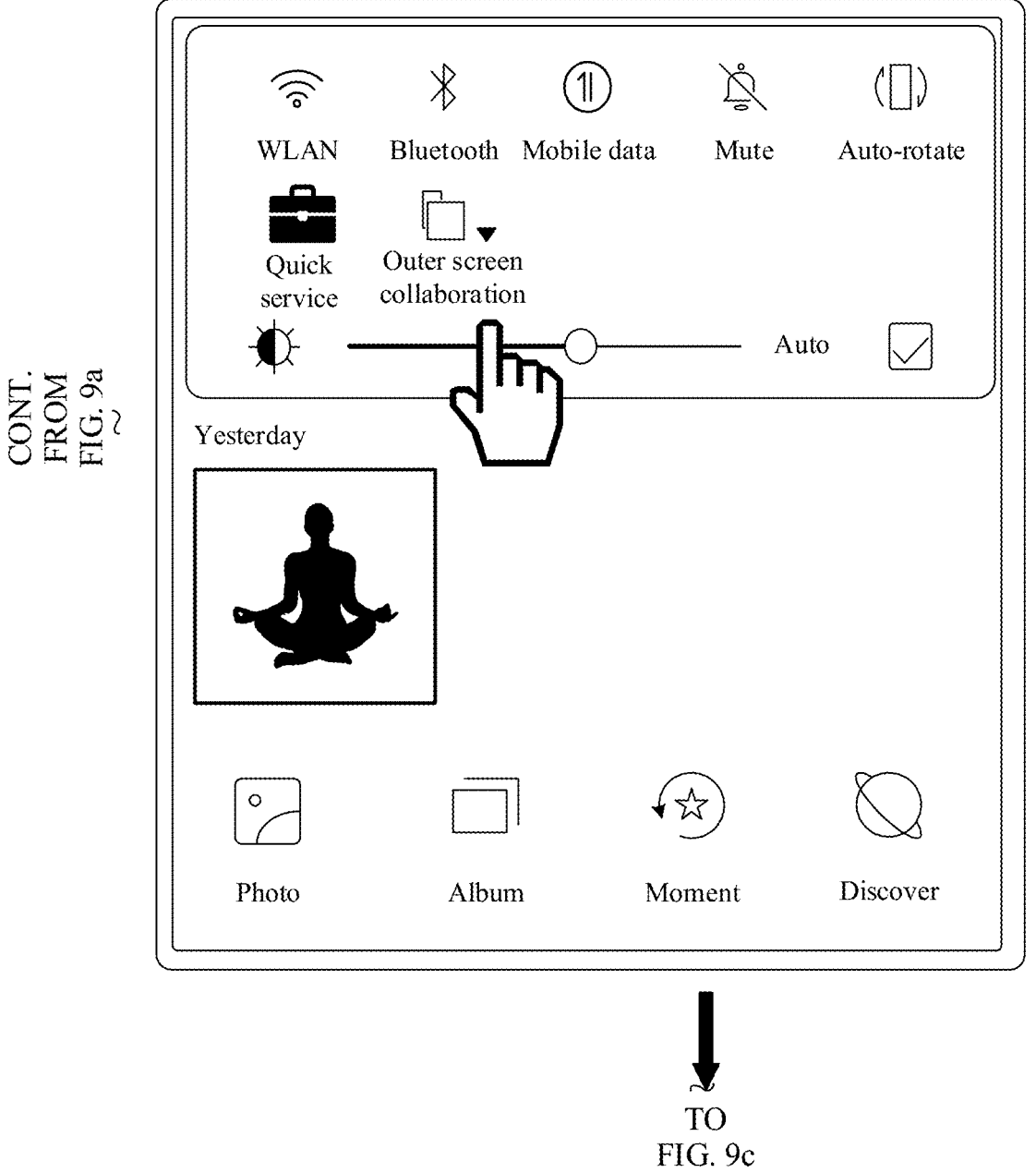
Figures 9B, 9C:
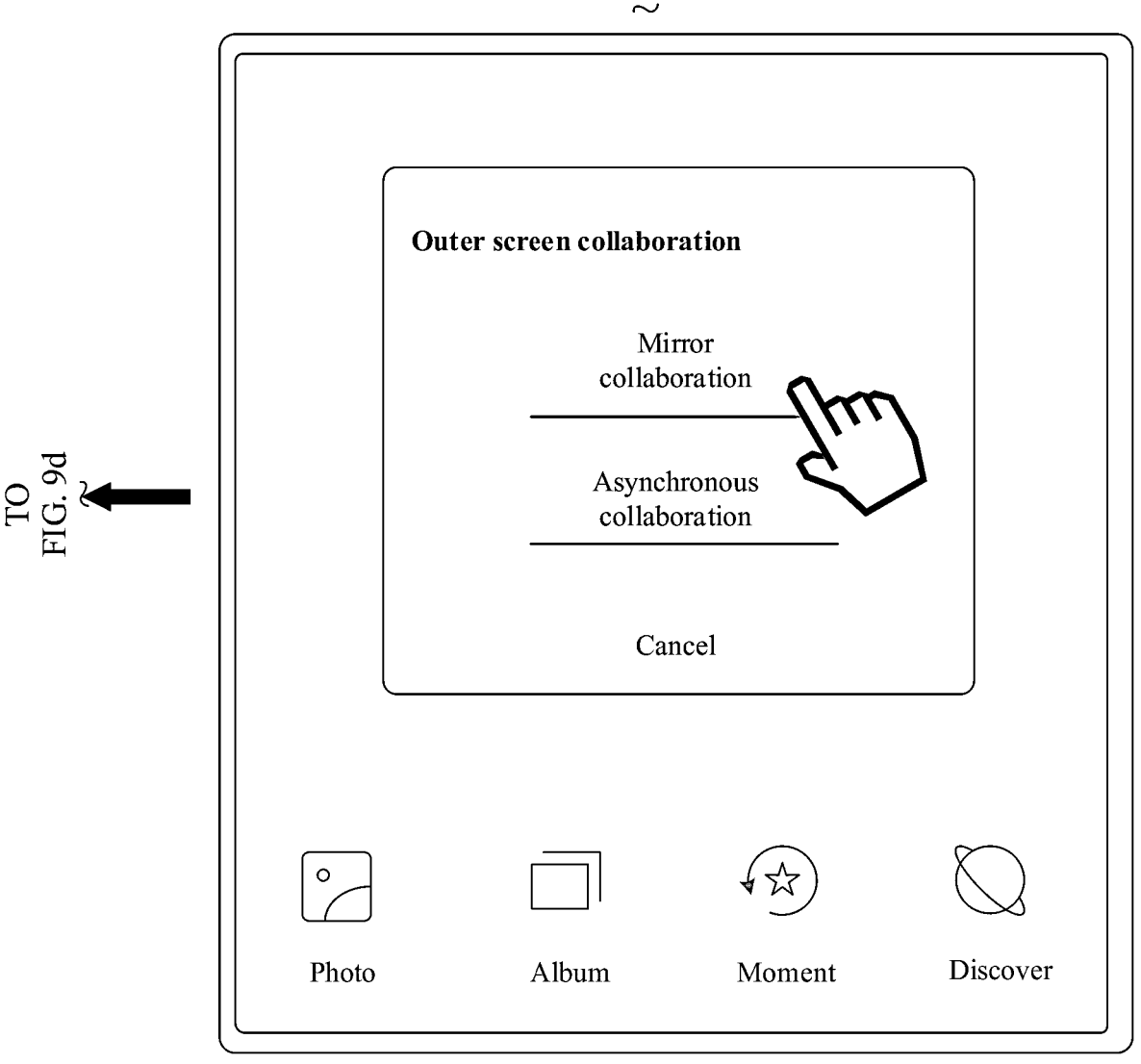

In some embodiments, when the user needs to display a picture to another person, the user can enable the pull-down taskbar by performing an operation of pulling down from the top of the inner screen, as shown in FIG. 9*a*, on an interface of the gallery displayed on the inner screen, and the inner screen displays the pull-down taskbar as shown in FIG. 9*b*. In the pull-down taskbar, the user taps the control of the "outer screen collaboration", and the interface of the inner screen pops up a selection window of the collaboration mode as shown in FIG. 9*c*. The selection window of the collaboration mode includes a control of the mirror collaboration and a control of the asynchronous collaboration, and the user may select an appropriate collaboration mode as required.

Figure 9D:
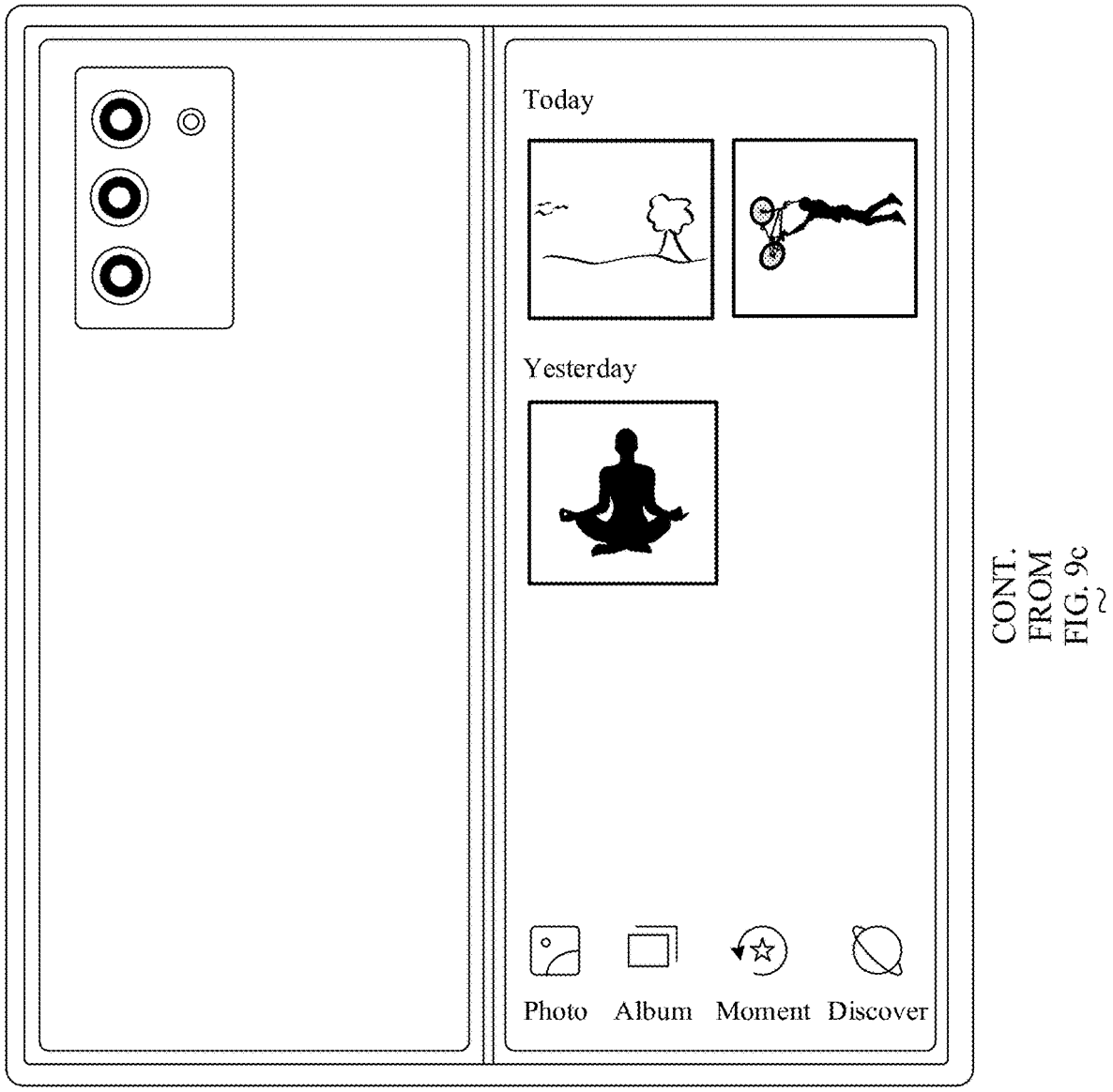
Figure 10A:
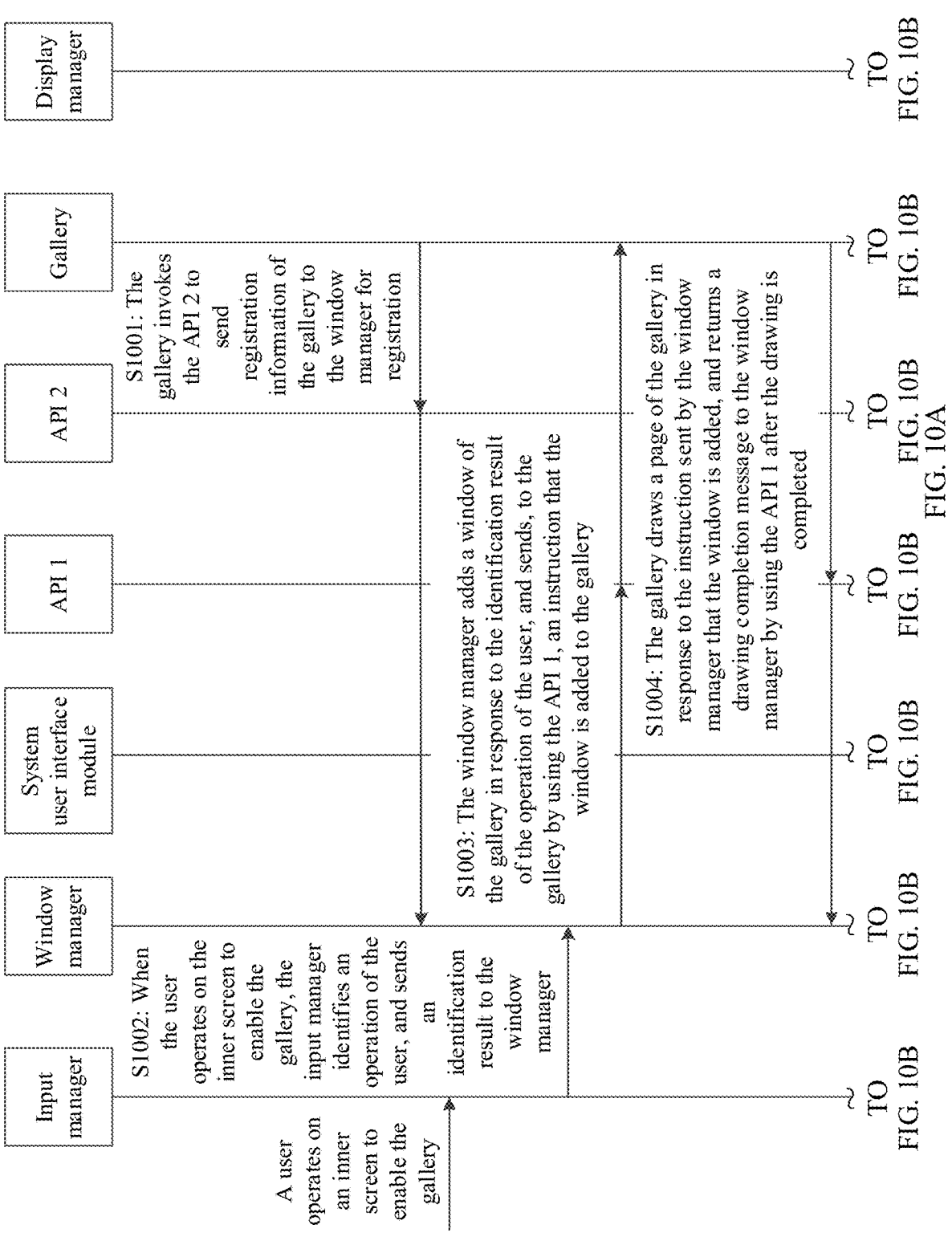
Figure 10C:
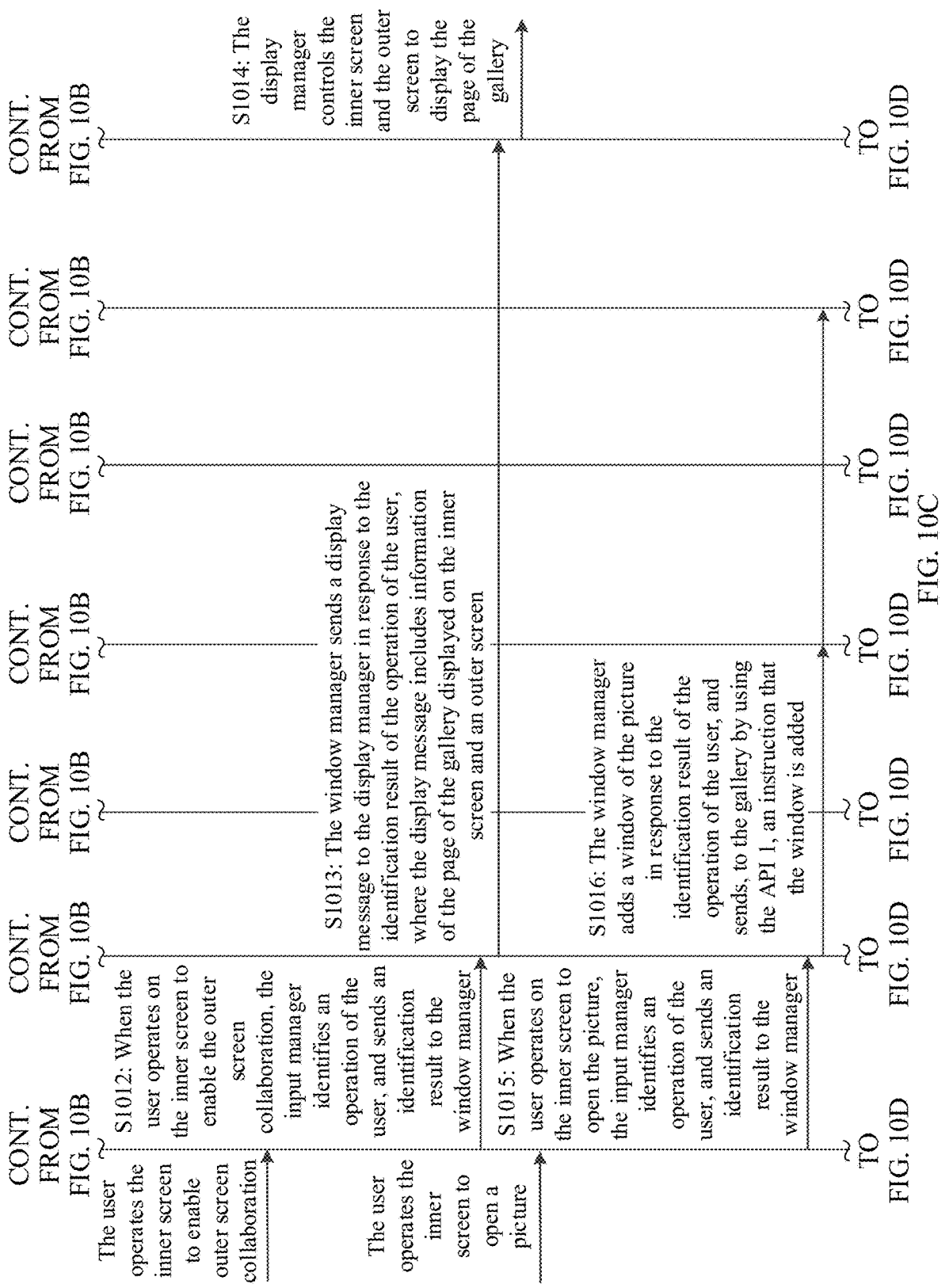

When the user selects the mode of the mirror collaboration, the outer screen displays the same content as the inner screen, for example, the outer screen displays an interface of a gallery as shown in FIG. 9*d*. When the user opens one of the pictures in the gallery, the outer screen is also expanded to display the picture. When the user slides back and forth on the inner screen to switch between pictures, the outer screen also switches between pictures accordingly.

Optionally, the user may also tap a "cancel" control in the selection window of the collaboration mode to disable the outer screen collaboration function. In some embodiments, some applications may be set to a default outer screen collaboration mode. For example, in the embodiment shown in FIG. 8*a*-FIG. 8*d*, when the user enables the outer screen collaboration function of the gallery, the gallery application may be set to a default mirror collaboration mode, and the user does not need to select.

In some embodiments, when the user needs to display a video to another person, as a process of the embodiment as shown in FIG. 9*a*-FIG. 9*d*, when the user enables the outer screen collaboration function, the outer screen displays the same video content as that displayed on the inner screen, to implement video sharing. The user can also control video playing by operating on a video playing interface on the inner screen. For example, the user taps a key such as start, pause, or stop in the video playing interface on the inner screen, and the outer screen can also synchronously display the interface of video that is being played on the inner screen in response to the operation of the user.

FIG. 10*a*-FIG. 10*d* illustrate in detail a process of displaying a picture on an outer screen of an electronic device by using a scenario in which a user shares a picture as an example. The process includes:

S1001: The gallery invokes the API 2 to send registration information of the gallery to a window manager for registration.

S1002: When the user operates on the inner screen of the electronic device to enable the gallery, an input manager in the electronic device identifies an operation of the user, and sends an identification result to the window manager.

S1003: The window manager adds a window of the gallery in response to the identification result of the operation of the user, and sends, to the gallery by using the API 1, an instruction that the window is added.

S1004: The gallery draws a page of the gallery in response to the instruction sent by the window manager that the window is added, and returns a drawing completion message to the window manager by using the API 1 after the drawing is completed.

S1005: The window manager sends a display message to the display manager in response to the drawing completion message returned by the gallery, where the display message includes information of the page of the gallery displayed on the inner screen.

S1006: The display manager controls the inner screen to display the page of the gallery.

It should be noted that S1001 is not necessarily performed before S1002, but may be performed after S1002, S1003, S1004, S1005, or S1006, provided that S1001 is performed before S1007.

S1007: When the user enables the pull-down taskbar by sliding from the top of the inner screen, an input processing module identifies an operation of the user, and sends an identification result to the window management module.

S1008: The window management module adds the window of the pull-down taskbar in response to the identification result of the operation of the user, and sends an instruction that the window is added to a system user interface.

S1009: The system user interface draws the window of the pull-down taskbar in response to the instruction sent by the window manager that the window is added, and returns a drawing completion message to the window manager after the drawing is completed.

S1010: The window manager sends the display message to the display manager in response to the drawing completion message returned by the system user interface, where the display message includes information of the window of the gallery displayed on the inner screen.

S1011: The display manager controls the inner screen to display the window of the gallery.

S1012: When the user operates on the inner screen to enable the outer screen collaboration, an input manager identifies an operation of the user, and sends an identification result to the window manager.

S1013: The window manager sends a display message to the display manager in response to the identification result of the operation of the user, where the display message includes information of the page of the gallery displayed on the inner screen and the outer screen.

S1014: The display manager controls the inner screen and the outer screen to display the page of the gallery.

S1015: When the user operates on the inner screen to open the picture, the input manager identifies an operation of the user, and sends an identification result to the window manager.

S1016: The window manager adds a window of the picture in response to the identification result of the operation of the user, and sends, to the gallery by using the API 1, an instruction that the window is added.

S1017: The gallery draws a page of the picture in response to the instruction sent by the window manager that the window is added, and returns a drawing completion message to the window manager by using the API 1 after the drawing is completed.

S1018: The window manager sends a display message to the display manager in response to the drawing completion message returned by the gallery, where the display message includes information of the page of the picture displayed on the inner screen and the outer screen.

S1019: The display manager controls the inner screen and the outer screen to display the page of the picture.

In this case, the user can display the picture to another person by using the outer screen without a need to flip over the electronic device, to make sharing of the picture more convenient.

When a parent needs to use an electronic device to take a picture of a child, in a scenario as shown in FIG. 11, if the parent is worried that inattention of the child affects a shooting effect, the parent can use an outer screen to play a cartoon to attract attention of the child before shooting is performed. In this case, an inner screen can display an interface for shooting preview. In this way, shooting performed by the parent is not affected, and the attention of the child is attracted, thereby improving a shooting effect and speed.

Figures 12A, 12B:
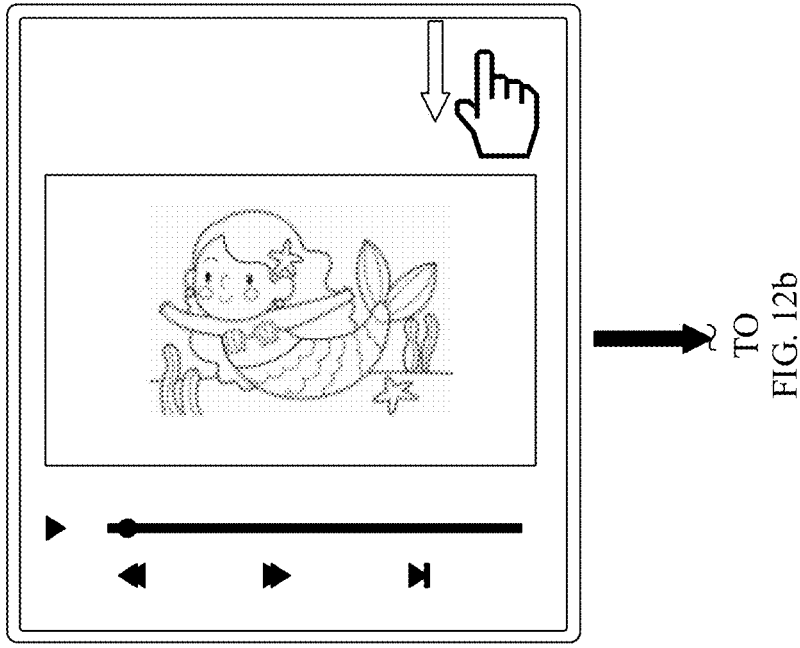
FIG. 12*a*-FIG. 12*d* are a schematic diagram of another example interface displayed on an inner screen and an outer screen according to an embodiment of this application.
Figures 12A, 12B, 12C:
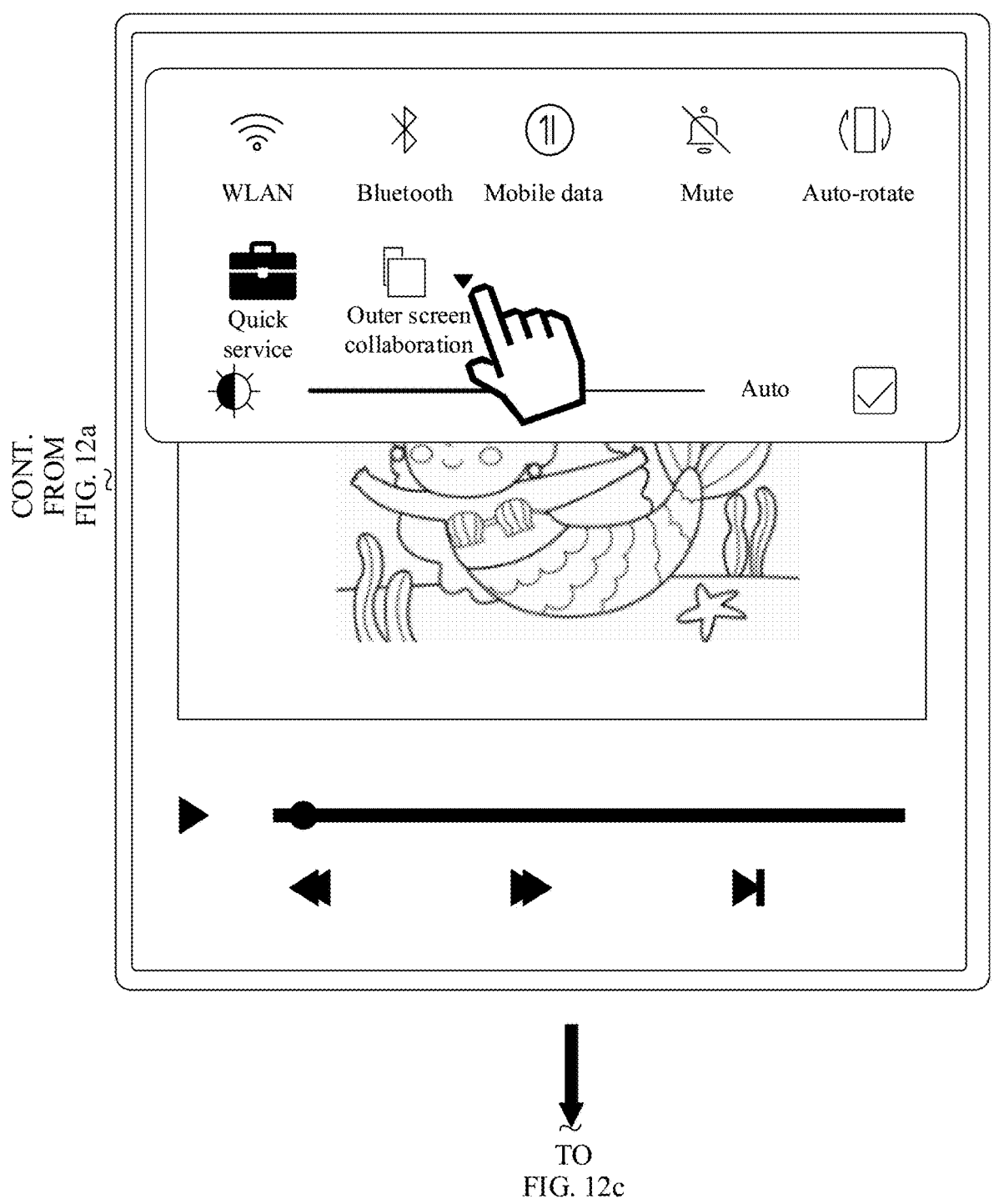
Figure 12C:
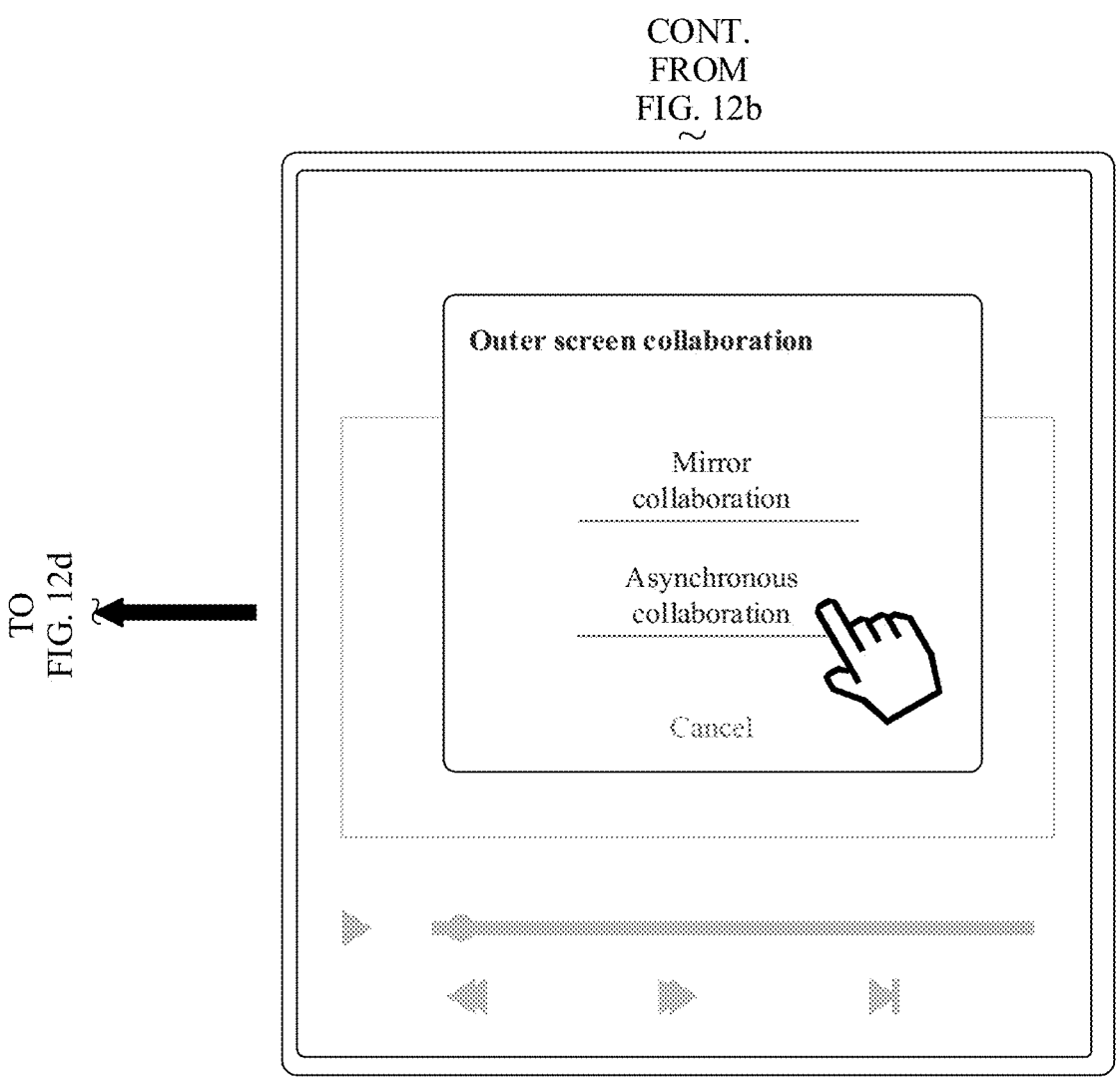
Figure 12D:
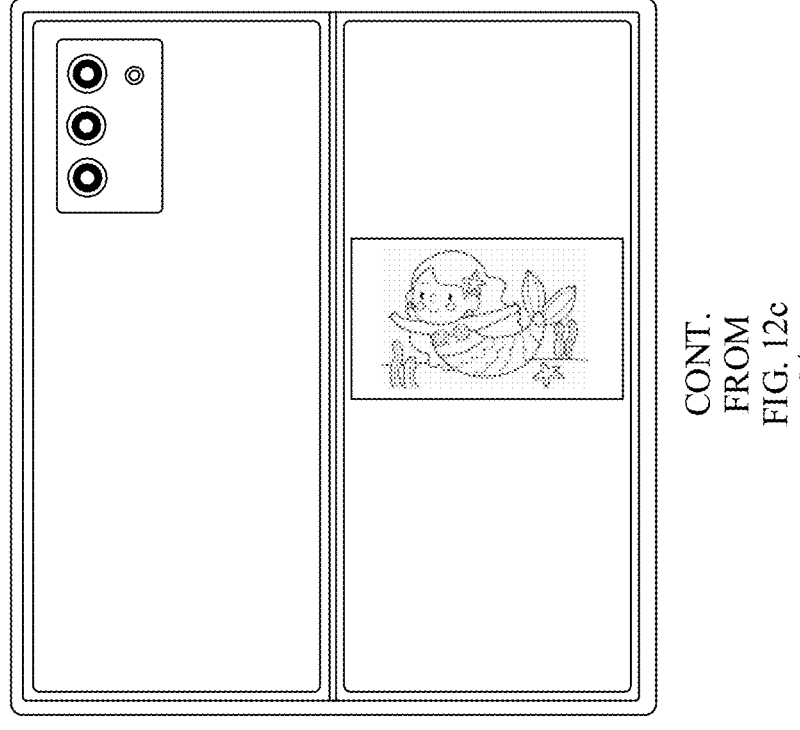

Specifically, a user as a parent may play a locally stored cartoon or enable another video APP to play a video. In this case, the inner screen may display an interface of video playing as shown in FIG. 12a. When the user performs an operation of pulling down from the top of the inner screen as shown in FIG. 12a, the inner screen displays a pull-down taskbar as shown in FIG. 12b. The user performs an operation as shown in FIG. 12b, that is, tapping a control of "outer screen collaboration" in the pull-down taskbar, and an interface of the inner screen pops up a selection window of a collaboration mode as shown in FIG. 12c. The selection window of the collaboration mode includes a control of mirror collaboration and a control of asynchronous collaboration. When the user taps a control of "asynchronous collaboration" in the interface shown in FIG. 12c, the outer screen may display an interface of video playing as shown in FIG. 12d.

Figure 13A:
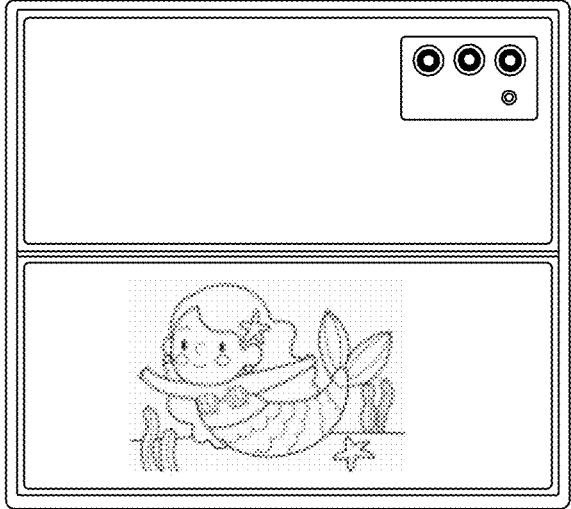
FIG. 13*a*-FIG. 13*b* are a schematic diagram of another example interface displayed on an inner screen and an outer screen according to an embodiment of this application.
Figure 13B:
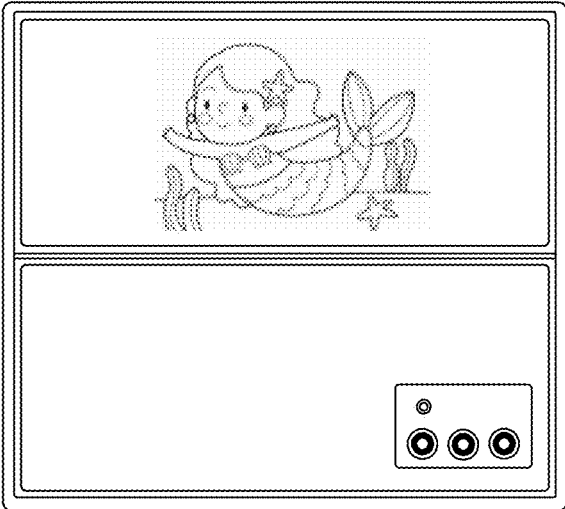

Optionally, to allow the child to view a larger video interface, the electronic device may also be held horizontally, that is, the outer screen is in a landscape orientation mode, in this case the outer screen may display the interface of video playing in the landscape orientation as shown in FIG. 13a or FIG. 13b.

In this case, an outer screen authority of the electronic device can be turned off, and the child cannot operate on the outer screen and only has a viewing authority, so as to prevent a misoperation of the child from affecting shooting. The user may operate on the inner screen to control video playing, for example, tap a control such as a playback, pause, or next episode, to control video playing.

Figures 14A, 14B:
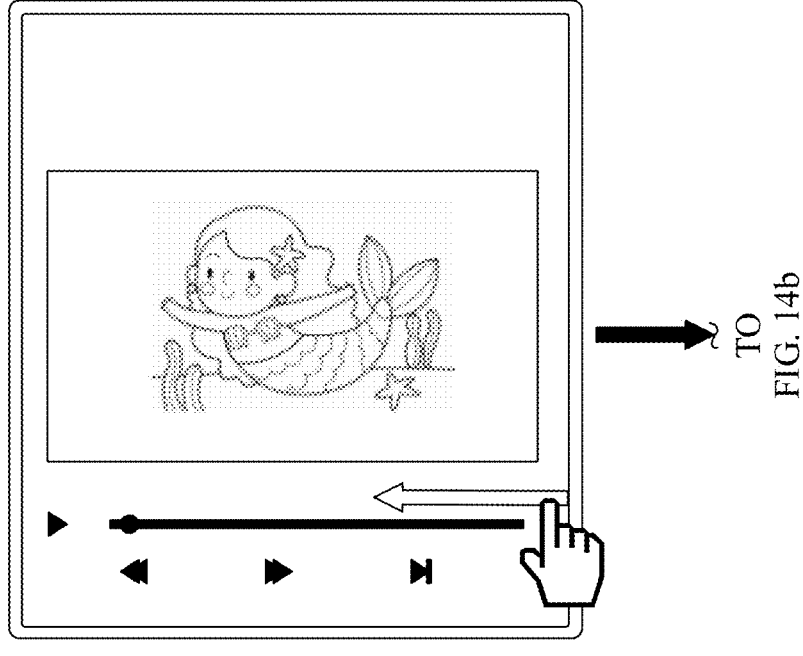
FIG. 14*a*-FIG. 14*c* are a schematic diagram of another example interface displayed on an inner screen and an outer screen according to an embodiment of this application.
Figures 14A, 14B, 14C:
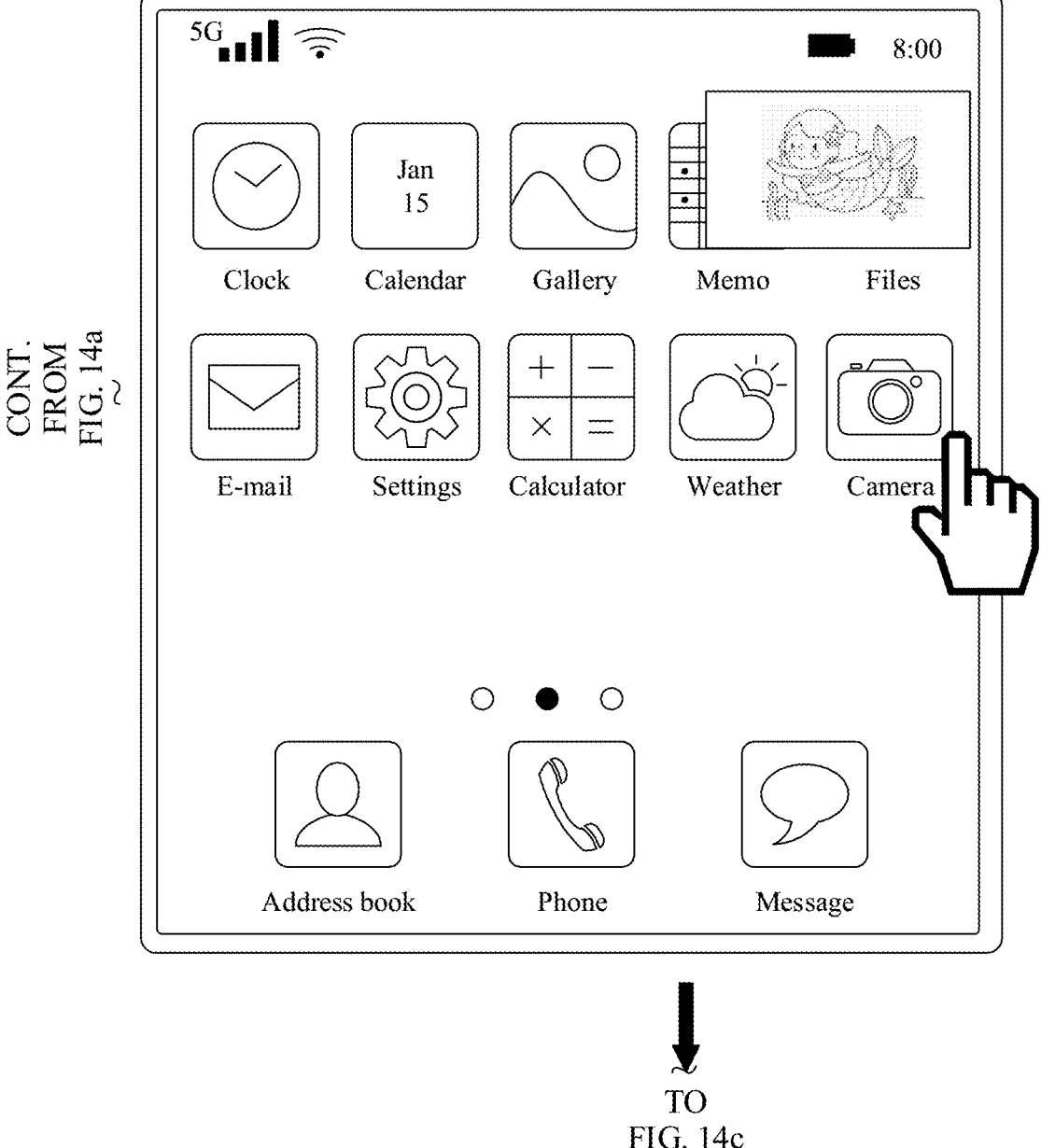
Figures 14B, 14C:
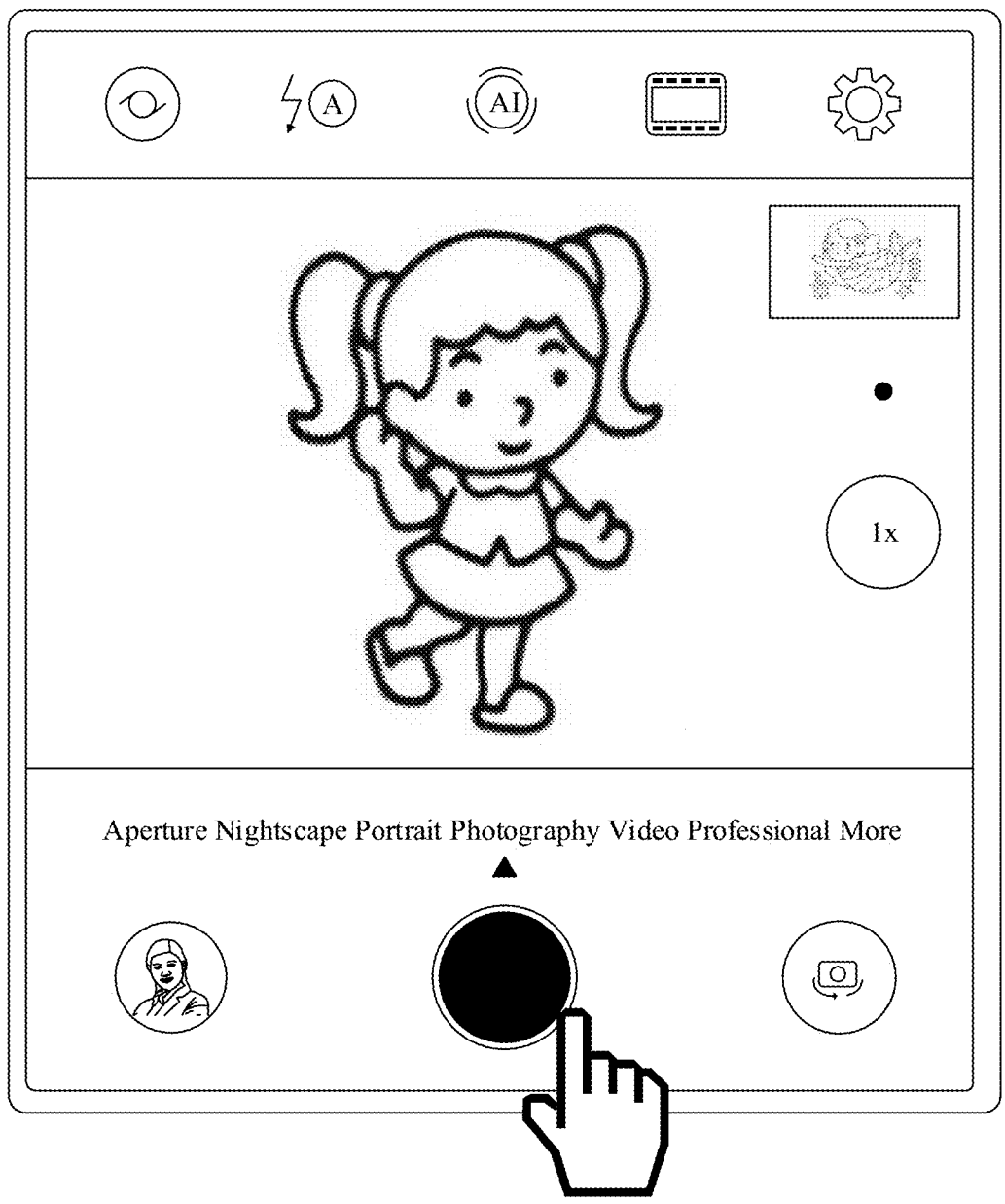

When a child views a cartoon by using the outer screen, the user can enable a shooting APP for shooting or video recording. Optionally, as an operation shown in FIG. 14a, the user may slide from a side of the inner screen toward a middle of the inner screen to exit the video playing interface. In this case, the video playing interface is not closed because the electronic device is in an outer screen collaboration state, but is displayed in a corner of the inner screen in a form of a reduced floating window as shown in FIG. 14b. Then, the user can enable a camera for shooting by tapping an icon of the camera on the desktop as shown in FIG. 14b. In a shooting process performed by the user, the outer screen can always play the cartoon to attract the attention of the child, and the inner screen displays a preview interface of shooting as shown in FIG. 14c.

Figures 15A, 15B:
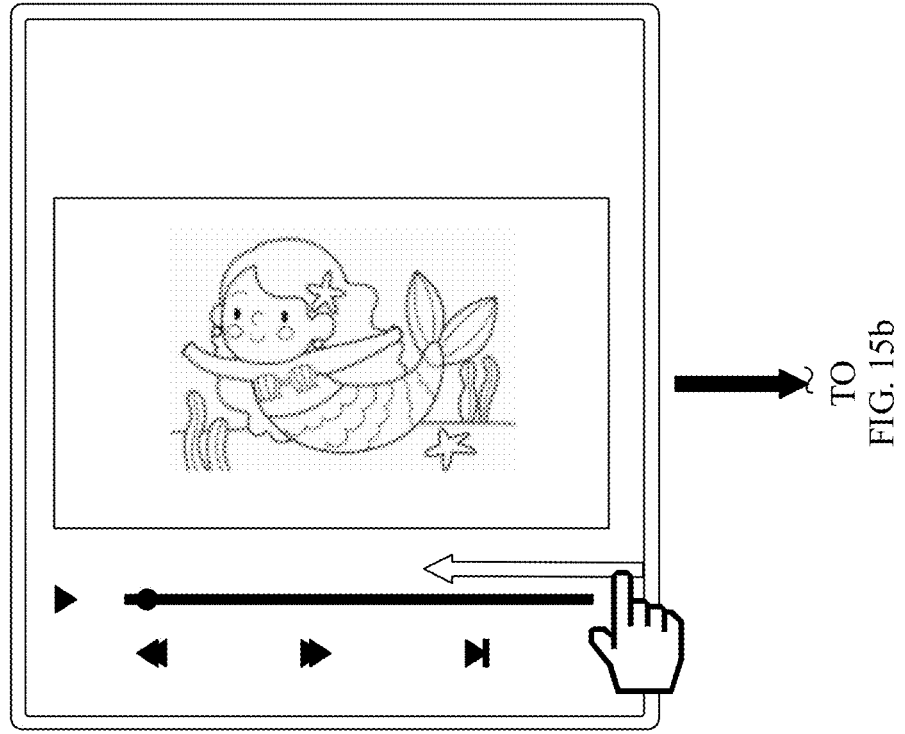
FIG. 15*a*-FIG. 15*c* are a schematic diagram of another example interface displayed on an inner screen and an outer screen according to an embodiment of this application.
Figures 15A, 15B, 15C:
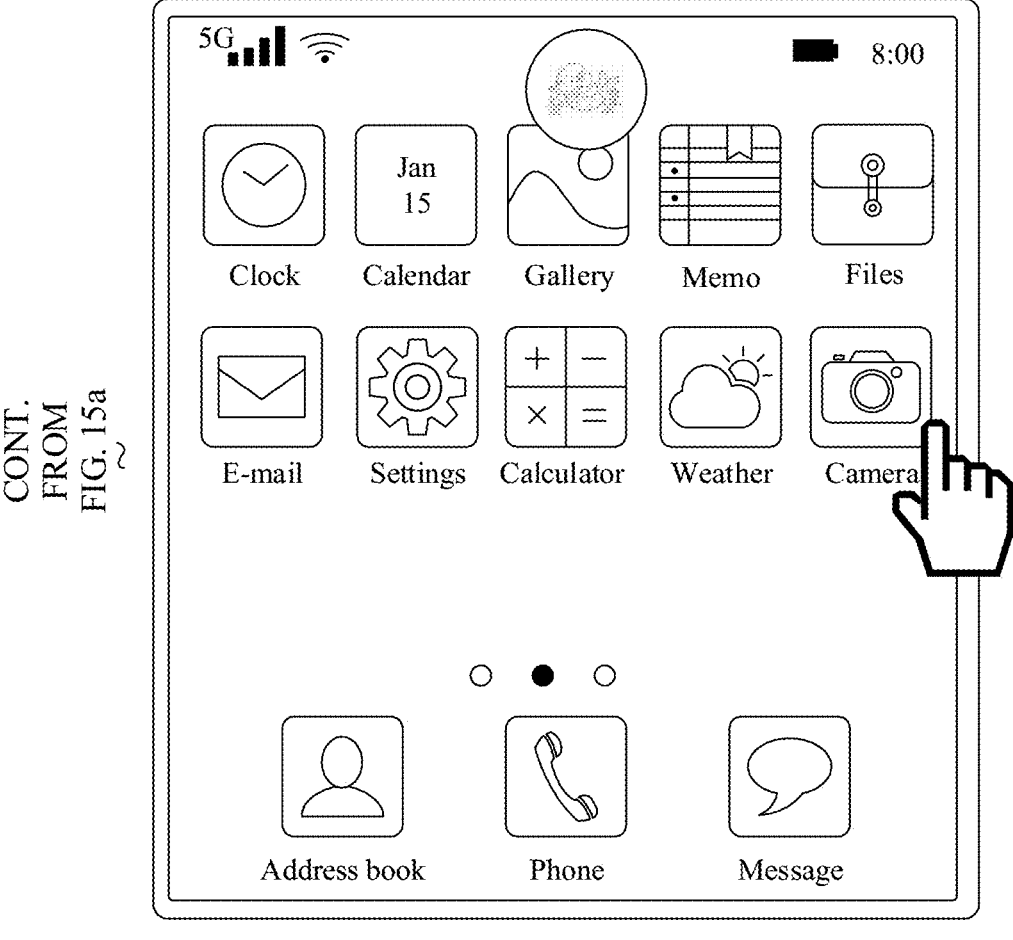
Figures 15B, 15C:
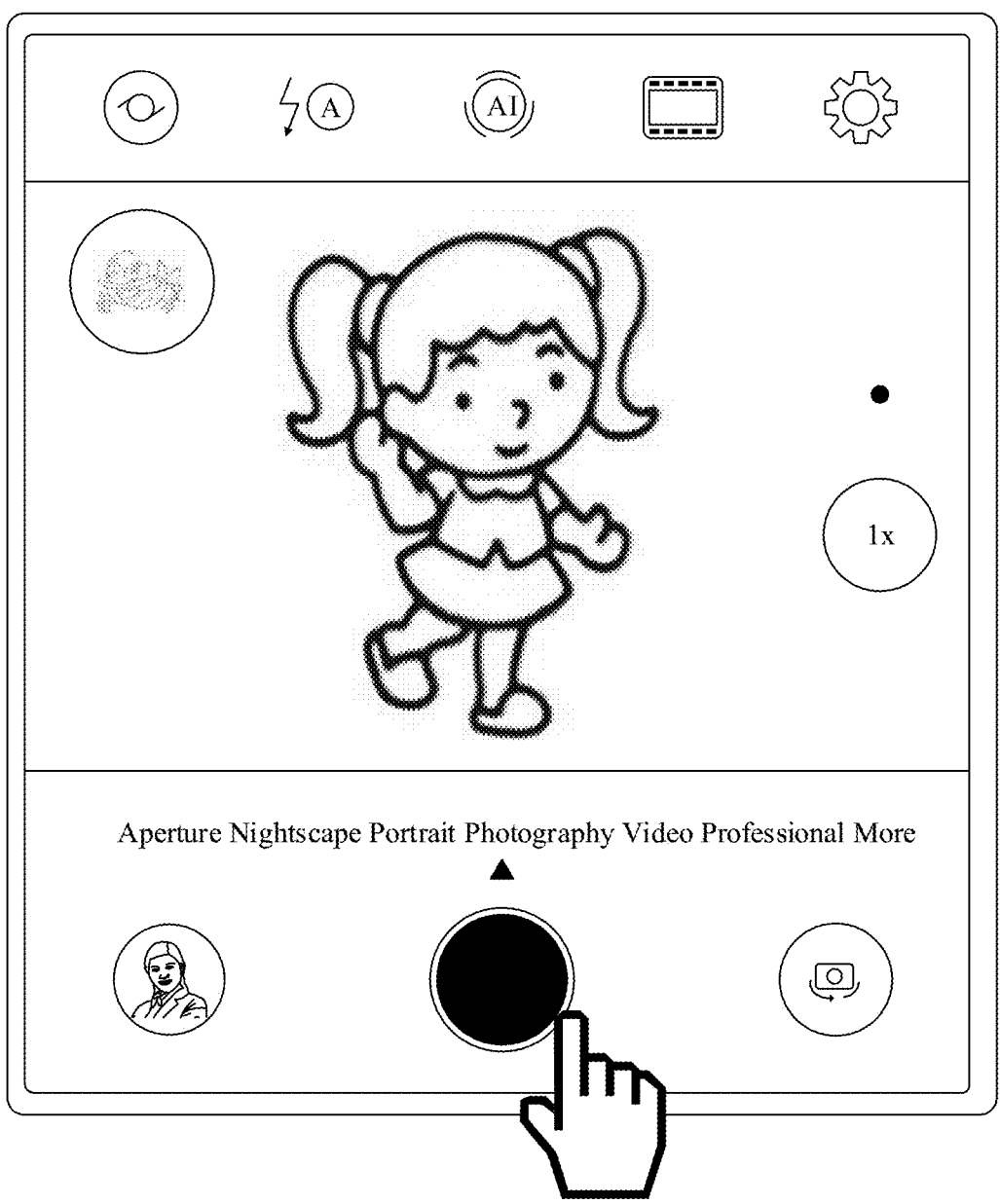

Optionally, as an operation shown in FIG. 15a, the user may slide from the side of the inner screen toward the middle of the inner screen to exit the video playing interface. In this case, because the electronic device is in the outer screen collaboration state, the video playing interface is displayed in a corner of the inner screen in the form of a reduced floating window as shown in FIG. 15b. Then, the user can enable a camera for shooting by tapping an icon of the camera on the desktop as shown in FIG. 15b. In a shooting process performed by the user, the outer screen can always play the cartoon to attract the attention of the child, and the inner screen displays a preview interface of shooting as shown in FIG. 15c.

Figures 16A, 16B:
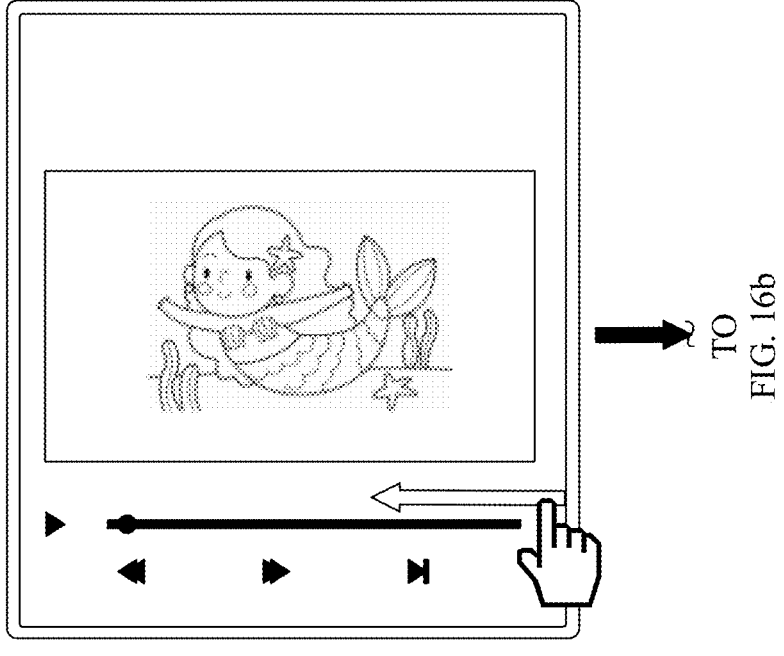
FIG. 16*a*-FIG. 16*c* are a schematic diagram of another example interface displayed on an inner screen and an outer screen according to an embodiment of this application.
Figure 16B:
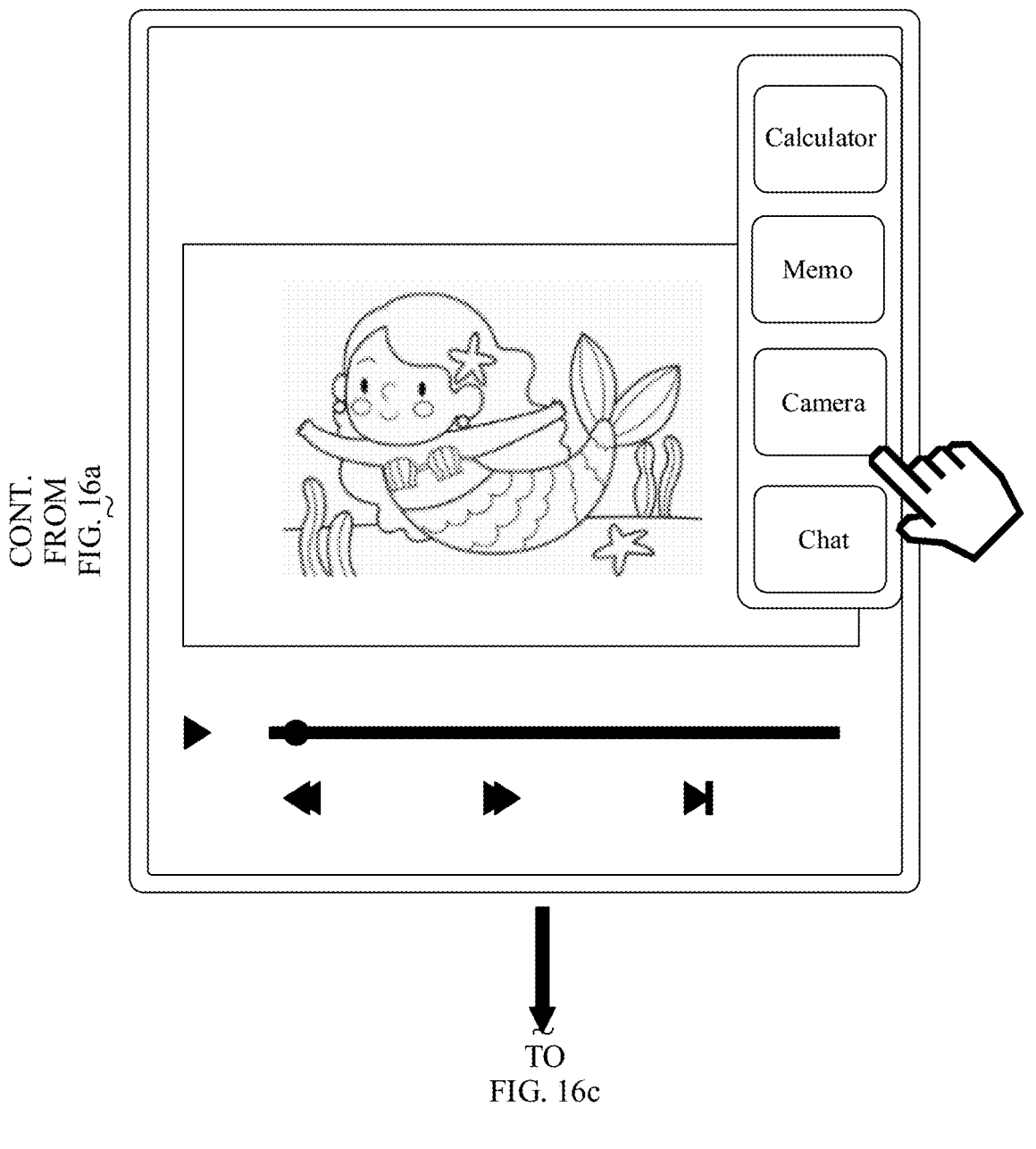
Figure 16C:
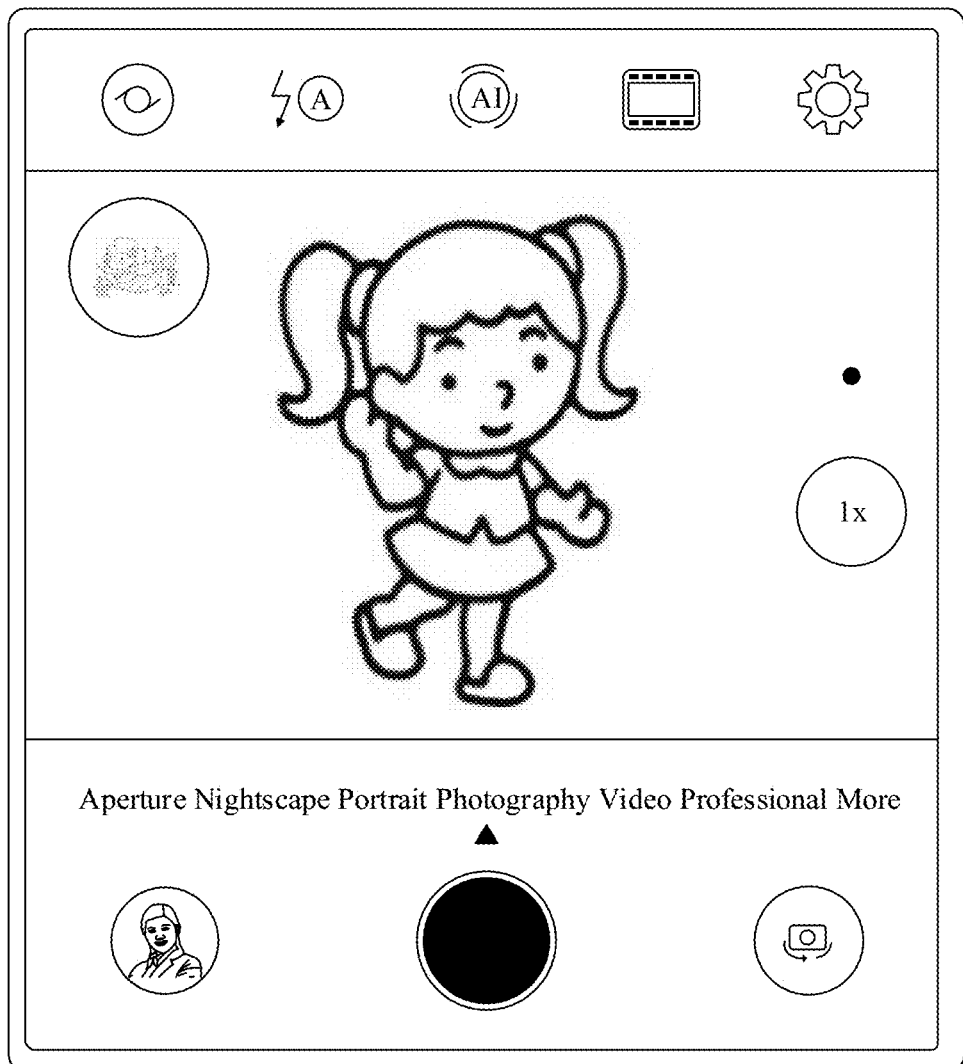
Figure 17A:
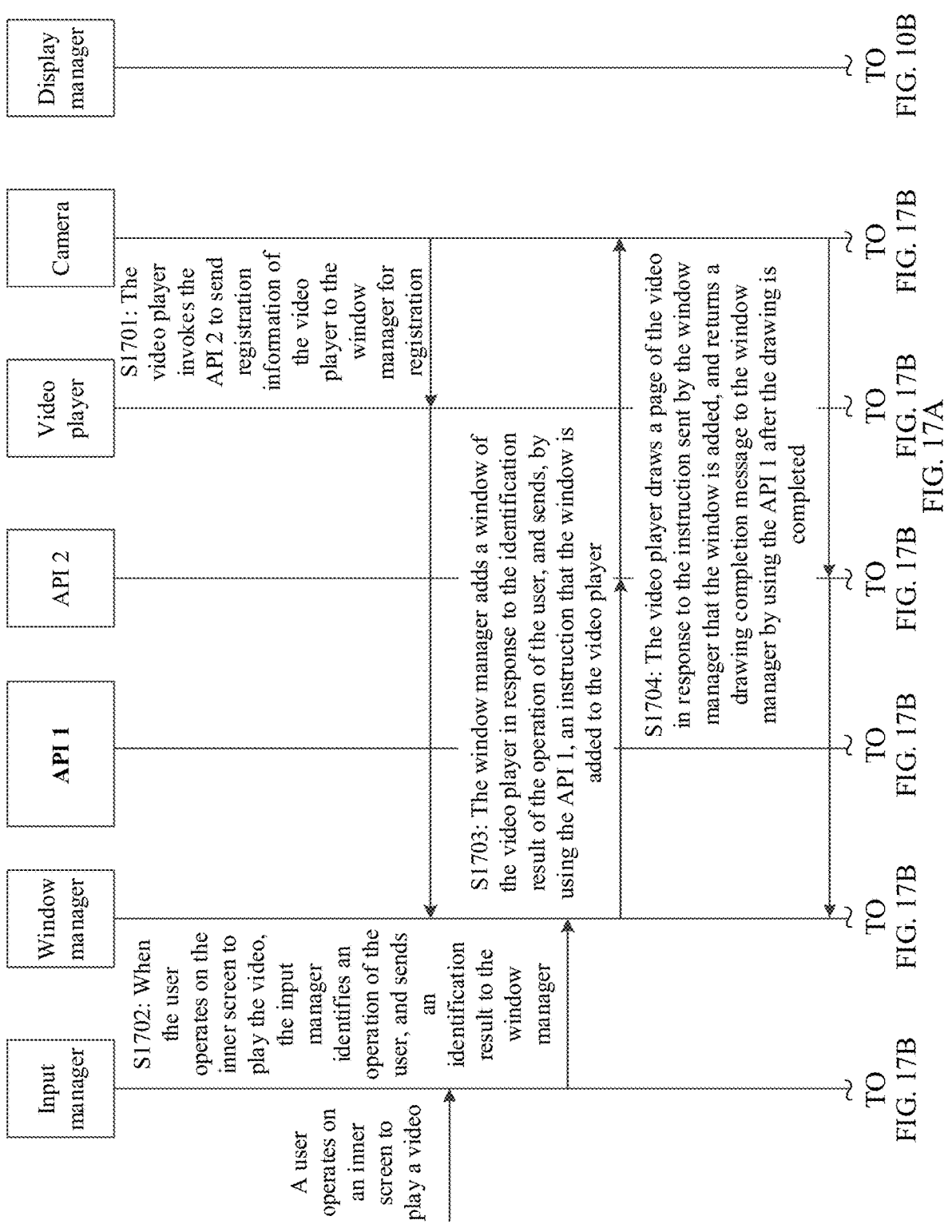
Figure 17C:
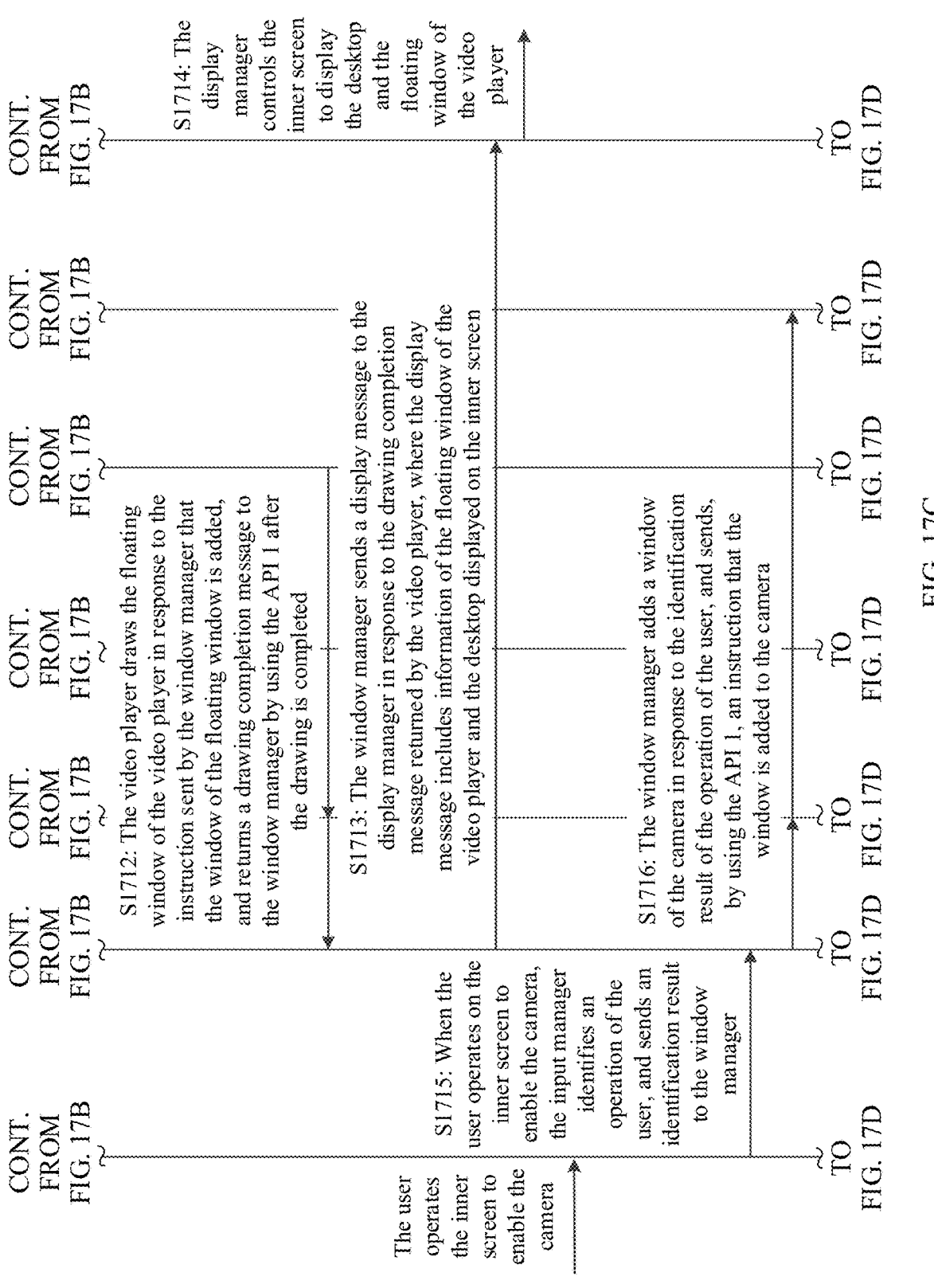

Optionally, in an asynchronous collaboration mode, as an operation shown in FIG. 16a, the user may also slide from the side of the inner screen toward the middle of the inner screen and pause, to open a side bar as shown in FIG. 16b, and tap the icon of the camera from the side bar, to enable the camera for shooting. In this case, the inner screen may display the preview interface of shooting as shown in FIG. 16c, and simultaneously display the interface of video playing displayed on the outer screen in a form of a floating ball on the inner screen. The user can alternatively drag the floating window or the floating ball on the inner screen, to move to a different position, so as to avoid a region of an operation. The user can set a parameter of camera shooting by operating on the inner screen in the preview interface of shooting.

FIG. 17A-FIG. 17D illustrate in detail a process of displaying a video on an outer screen of an electronic device by using a scenario in which a user plays the video to a child by using the outer screen and shoots the child simultaneously as an example. The process includes:

S1701: The video player invokes an API 2 to send registration information of the video player to a window manager for registration.

S1702: When the user operates on the inner screen of the electronic device to play the video, an input manager in the electronic device identifies an operation of the user, and sends an identification result to the window manager.

S1703: The window manager adds a window of the video player in response to the identification result of the operation of the user, and sends an instruction that the window is added to the video player by using an API 1.

S1704: The video player draws a page of the video in response to the instruction sent by the window manager that the window is added, and returns a drawing completion message to the window manager by using the API 1 after the drawing is completed.

S1705: The window manager sends a display message to the display manager in response to the drawing completion message returned by the video player, where the display message includes information of the page of the video player displayed on the inner screen.

S1706: The display manager controls the inner screen to display the page of the video player.

It should be noted that S1701 is not necessarily performed before S1702, but may be performed after S1702, S1703, S1704, S1705, or S1706, provided that S1701 is performed before S1707.

S1707: When the user operates on the inner screen to enable the outer screen collaboration, an input manager identifies an operation of the user, and sends an identification result to the window manager.

S1708: The window manager sends a display message to the display manager in response to the identification result of the operation of the user, where the display message includes information of the interface of video playing displayed on the inner screen and the outer screen.

S1709: The display manager controls the inner screen and the outer screen to display the interface of video playing.

S1710: When the user slides inward from a side of the inner screen, an input processing module identifies an operation of the user, and sends an identification result to the window management module.

S1711: The window management module adds the window of the desktop and the window of the floating window of the video player in response to the identification result of the operation of the user, and sends an instruction that the window of the floating window is added to the video player.

S1712: The video player draws the floating window of the video player in response to the instruction sent by the window manager that the window of the floating window is added, and returns a drawing completion message to the window manager by using the API 1 after the drawing is completed.

S1713: The window manager sends a display message to the display manager in response to the drawing completion message returned by the video player, where the display message includes information of the floating window of the video player and the desktop displayed on the inner screen.

S1714: The display manager controls the inner screen to display the desktop and the floating window of the video player.

S1715: When the user operates on the inner screen to enable the camera, the input manager identifies an operation of the user, and sends an identification result to the window manager.

S1716: The window manager adds a window of the camera in response to the identification result of the operation of the user, and sends, by using the API 1, an instruction that the window is added to the camera.

S1717: The camera draws an interface of the camera in response to the instruction sent by the window manager that the window is added, and returns a drawing completion message to the window manager by using the API 1 after the drawing is completed.

S1718: The window manager sends a display message to the display manager in response to the drawing completion message returned by the camera, where the display message includes information of the interface of the camera displayed on the inner screen.

S1719: The display manager controls the inner screen to display a page of the camera, and displays the interface of video playing in the form of a floating window.

In this way, the user can play a video to the child by using the outer screen to attract the attention of the child, and simultaneously use the interface of preview shooting of the inner screen for shooting. In this way, shooting performed by the parent is not affected, and the attention of the child is attracted, to make the child cooperative during shooting, thereby improving a shooting effect and speed.

Figures 18A, 18B:
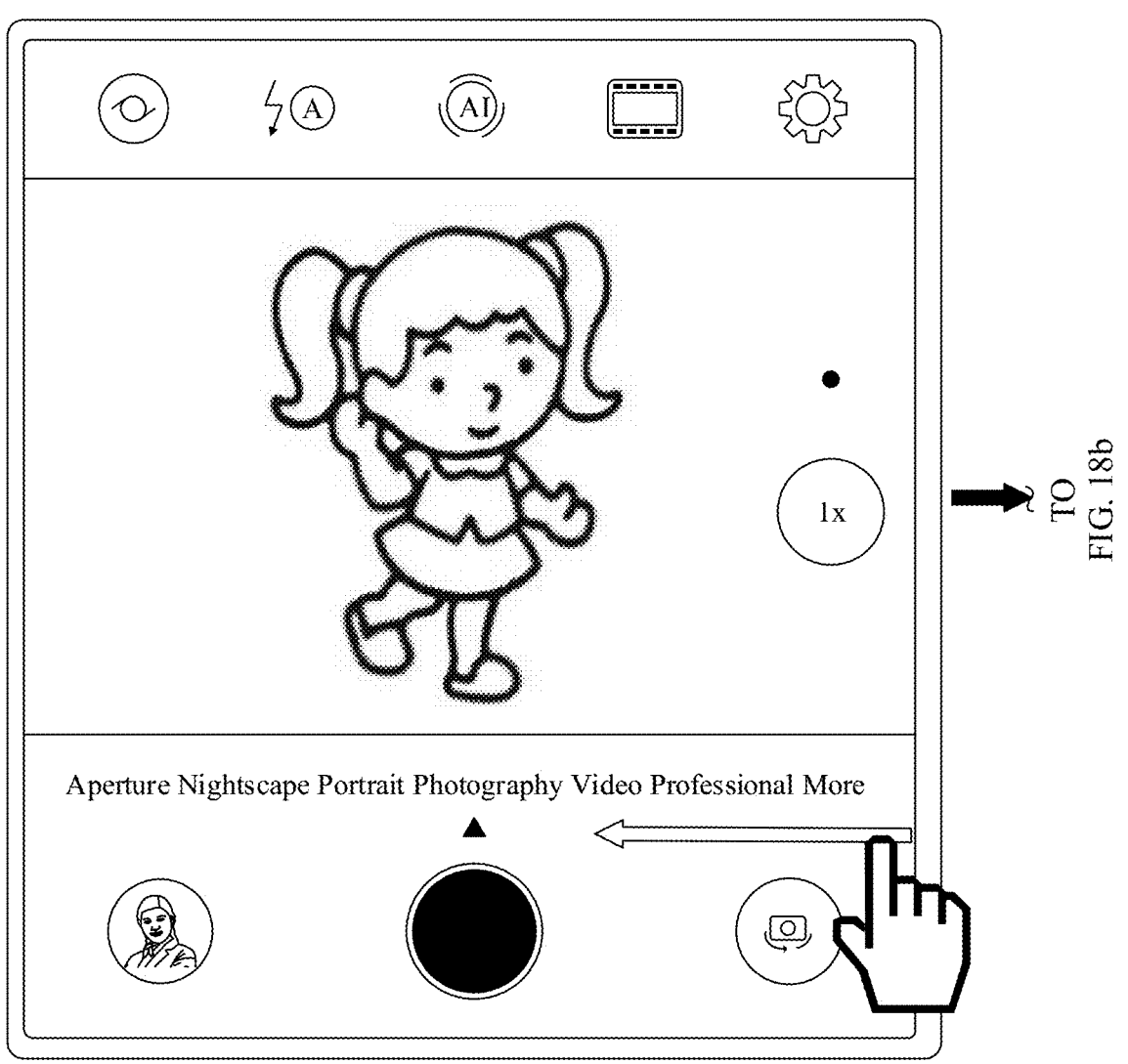
FIG. 18*a*-FIG. 18*c* are a schematic diagram of another example interface displayed on an inner screen according to an embodiment of this application.
Figures 18A, 18B, 18C:
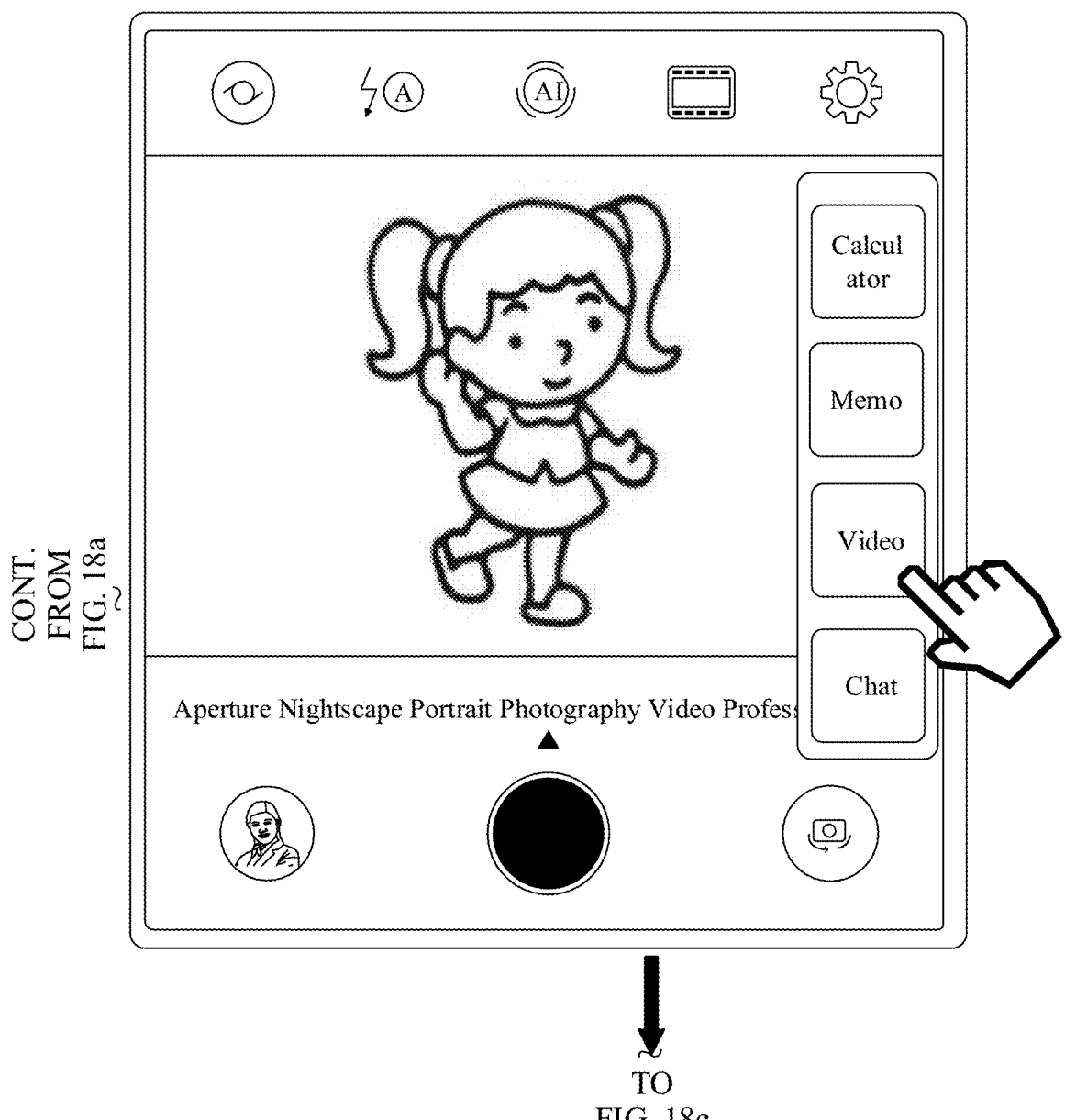
Figures 18B, 18C:
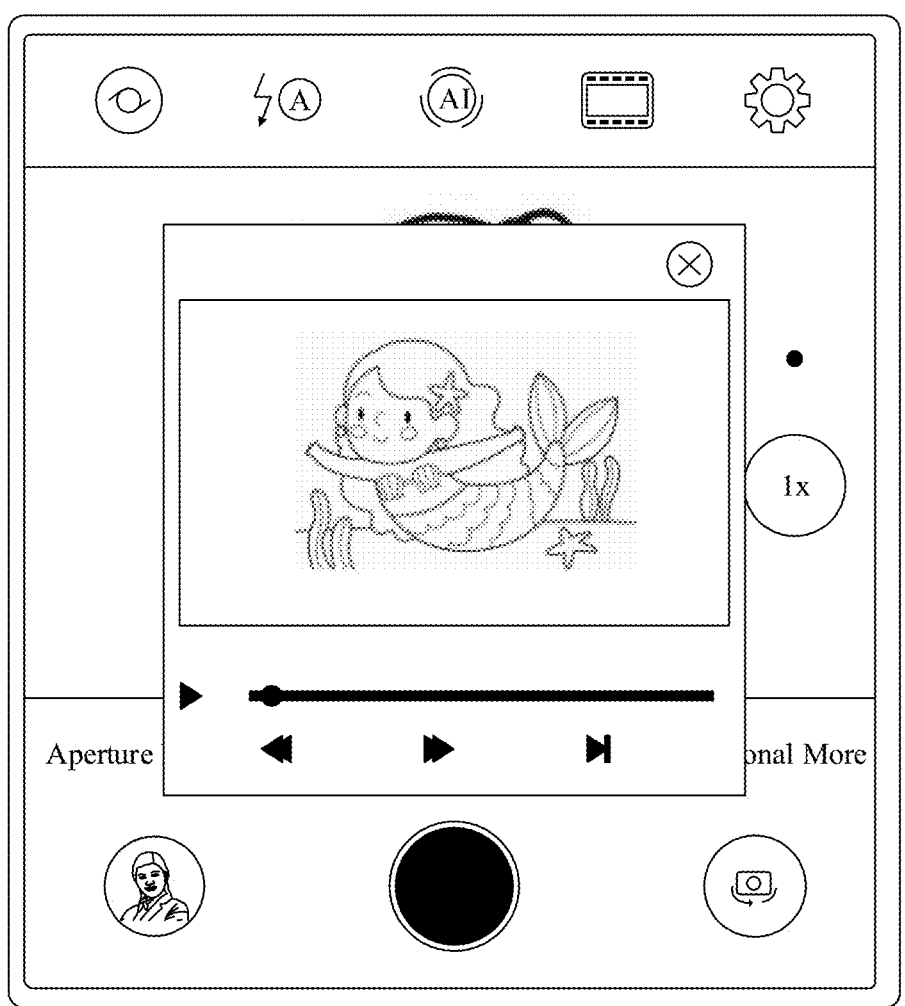

When the user enables the camera to shoot the child and finds that the child is distracted, the user may slide from the side of the screen toward the middle of the screen and pause, to open the side bar in the interface of shooting preview as shown in FIG. 18a, and the side bar may be displayed on the inner screen as shown in FIG. 18b. The user taps the video player in the interface shown in FIG. 18b to play the video, and in this case, as shown in FIG. 18c, the interface of the video player can be displayed in the form of a floating window above the preview interface of the camera. In this case, the user can enable the outer screen collaboration and select the asynchronous collaboration in the pull-down taskbar, so that the inner screen can display an interface as shown in FIG. 14c or FIG. 15c, that is, the preview interface of the camera and a floating window or a floating ball of a reduced video player; and the outer screen may display, as shown in FIG. 12d, FIG. 13a or FIG. 13b, an interface of the video player.

When the user ends display, the user can tap the control of the outer screen collaboration in the pull-down taskbar to disable the outer screen collaboration. In this case, the outer screen can be turned off or display the desktop of the outer screen, instead of displaying the previously displayed interface.

FIG. 19 is a flowchart of another example screen display method according to an embodiment of this application. The method is applied to an electronic device including a first screen and a second screen. In this embodiment, that the first screen is an inner screen and the second screen is an outer screen, where the inner screen and the outer screen are respectively disposed on two opposite sides of the electronic device is used as an example for description. The method includes:

S1901: Receive a first operation performed by a user.

Optionally, the user may perform the first operation on the inner screen, for example, may tap an icon of a quick service on a desktop, to open a window of the quick service. Optionally, the user may also perform the first operation on the outer screen, for example, may double-tap the outer screen or tap the outer screen with two fingers, to open the window of the quick service.

S1902: Display a first interface on the first screen in response to the first operation, where the first interface includes a first control.

In response to the first operation, the outer screen may display the first interface. In this embodiment, that the first interface is the window of the quick service is used as an example for description. The first interface may be a window of a quick service as shown in FIG. 4d. The window of the quick service may include one or more service controls, and each service control corresponds to an APP or a set page of an APP. For example, a payment service control may correspond to a payment APP, or may correspond to a page of a payment code of the payment APP. Optionally, the service control in the window of the quick service may include a first control corresponding to an APP that the user needs to quickly invoke.

S1903: Receive a second operation performed by the user on the first control.

Through the window of the quick service, the electronic device receives the second operation performed by the user to select the first control. For example, the second operation is an operation of tapping a first control that needs to be displayed from at least one service control in the window of the quick service.

In some embodiments, an operation authority of the outer screen may be in a turn-off state, to avoid privacy disclosure or information loss due to a misoperation performed by another person, and the user may perform the second operation on the inner screen. In some embodiments, the operation authority of the outer screen may be in a turn-on state, and another person may perform the second operation on the outer screen to select the first control, to select a to-be-displayed service code as required with permission of an owner, thereby further facilitating use.

S1904: Display, in response to the second operation, a second interface corresponding to the first control on the second screen.

In response to the second operation, the electronic device displays the second interface corresponding to the first control on the outer screen, such as a service code. For example, if the first control selected by the user is a control of the payment APP, a corresponding service code may be the payment code; if the first control selected by the user is a control of a personal health APP, a corresponding service code may be a personal health code; and if the first control selected by the user is a control of a transport APP, a corresponding service code may be a transport code. It should be noted that the service code herein may be in a form of a bar code, a quick response code, or the like. A specific form of the service code is not limited in this embodiment of this application.

In the foregoing embodiment, the electronic device can display the first interface on the outer screen based on the first operation of the user, for example, the window of the quick service, and then under triggering of the second operation, display, by using the outer screen, the second interface corresponding to the first control selected by the user, for example, the interface of the service code, to avoid inconvenience caused to the user due to flipping over the electronic device for code scanning, and make the code scanning operation more convenient and fast. When the electronic device is in a folded state, that is, the inner screen is in the folded state, the inner screen is turned off in this case. If the user can double-tap the outer screen to wake up the outer screen, and the operation authority of the outer screen is in the turn-on state, the user can perform the second operation on the outer screen to open the corresponding second interface. In this way, the user can scan a code without a need to unfold the inner screen, thereby improving convenience of code scanning.

In some embodiments, a possible implementation of step S1901 may include: receiving the first operation when the first screen displays a third interface, where the third interface is one of the following interfaces: a lock screen interface, an AOD interface, a desktop, and an interface of a first APP. When the user views the interface of the first APP displayed on the inner screen, for example, when the user uses a browser to display the content of a novel, and in this case, if the user needs to perform an operation such as code scanning payment or code scanning ride, the first operation may be performed to open the window of the quick service (that is, the first interface), and the second operation may be performed in the window of the quick service to enable the outer screen to display the service code that needs to be displayed (that is, the second interface), so that the user can use the outer screen to perform the code scanning operation without flipping over the electronic device. Because only the service code is displayed on the outer screen, the first interface of the first APP does not need to be displayed to another person or device, so that information of the user is prevented from being disclosed, and the user can perform code scanning while continuously using the first APP, thereby protecting privacy of the user and improving code scanning experience of the user.

Optionally, the first APP may be any one of a browser APP, a video APP, a game APP, a conference APP, a document APP, and a video call APP. That the user operates the electronic device to display the service code that needs to be displayed on the outer screen may not affect that the user uses any one of the browser APP, the video APP, the game APP, the conference APP, the document APP, and the video call APP on the inner screen, thereby improving the code scanning experience of the user.

In some embodiments, the first operation is an operation of sliding down on the inner screen (that is, the first screen) to enable a pull-down taskbar and tapping a control of a quick service in the pull-down taskbar. When using the inner screen, the user can slide down from the top of the inner screen to enable the pull-down taskbar, and tap the control of the quick service in the pull-down taskbar to open the window of the quick service. This manner is more accurate and does not cause misoperation.

In some embodiments, the first operation is an operation of double-tapping the outer screen (that is, the second screen). The user can also perform the operation of double-tapping on the outer screen to turn on the outer screen and open the window of the quick service on the outer screen. In this way, the user can open the window of the quick service by the quick service, double-tapping on the outer screen, without a need to accurately operate on the inner screen, so that an operation manner is more flexible and more convenient.

In some embodiments, the first interface includes at least one of a control of the payment code, a control of the transport code, and a control of the personal health code. The payment code, the transport code, and the personal health code are most frequently used service codes, and one or more of these service codes are stored in the window of the quick service, to significantly reduce a quantity of times that the user manually enables an APP to open a service code, thereby improving user experience.

In some embodiments, the user may also manage (for example, add or delete) the service control in the window of the quick service.

For example, the window of the quick service in FIG. 4a-FIG. 4d includes: a control of local health kit, a control of payment code A, a control of payment code B, and a control of transport code. The user may perform a third operation. For the third operation, refer to the operation, shown in FIG. 6a, of tapping the second control in the window of the quick service on the inner screen. The second control may be a menu control. The electronic device receives and responds to the third operation, and displays an APP management list as shown in FIG. 6b in the window of the quick service displayed on the inner screen. The APP management list includes icons of a plurality of APPs supporting the quick service and a plurality of state buttons, and the icons of the plurality of APPs supporting the quick service are in an one-to-one correspondence with the plurality of state buttons; that is, an icon of each APP of the quick service corresponds to a state button representing a state thereof. Each state button may include two states: turn-on and turn-off. The turn-on state indicates that the window of the quick service includes a control of an APP of a quick service corresponding to the state button. If the user needs to delete an icon of an APP corresponding to the state button from the window of the quick service, the state button may be manually switched to be in the turn-off state. The turn-off state indicates that the window of the quick service does not include a control of a corresponding APP. If the user needs to add the icon of the APP corresponding to this state button to the window of the quick service, the state button may be manually switched to be in the turn-on state. When the electronic device receives a fourth operation performed by the user on a target state button, where the target state button is any one of the plurality of state buttons, in response to the fourth operation, the electronic device may add or delete the icon of the APP that supports the quick service and that corresponds to the target state button in the window of the quick service. That is, if the target state button is in the turn-off state, the turn-off state may be switched to the turn-on state when the user performs the fourth operation of tapping the target state button. Originally, the window of the quick service does not include the icon of the APP corresponding to the target state button, and in this case, the icon of the APP corresponding to the target state button can be added to the window of the quick service. If the target state button is in the turn-on state, when the user performs the fourth operation of tapping the target state button, the turn-on state may be switched to the turn-off state. Originally, the window of the quick service includes the icon of the APP corresponding to the target state button, and in this case, the icon of the APP corresponding to the target state button may be deleted from the window of the quick service. In this embodiment, the user can open the APP management list by operating the menu control in the window of the quick service, and then manage the service control in the window of the quick service by operating the state button corresponding to the icon of the APP supporting the quick service in the APP management list. In the method, the user may manages a type of the service control in the window of the quick service, so that personalized requirements of different users can be satisfied by an operation of invoking the service code through the window of the quick service, thereby improving user experience.

FIG. 20 is a flowchart of another example screen display method according to an embodiment of this application. The method is applied to an electronic device, and the electronic device includes a first screen and a second screen. In this embodiment, that the first screen is an inner screen, and the second screen is an outer screen, where the first screen and the second screen are respectively disposed on two opposite sides of the electronic device is used as an example for description. The method includes:

S2001: Display a third interface on the first screen, where the third interface is an interface of a first APP.

When a user uses the first APP, the electronic device may display the third interface of the first APP on the inner screen. A type of the first APP is not limited in this embodiment of this application, and may include, but is not limited to, any one of a browser APP, a video APP, a game APP, a conference APP, a document APP, and a video call APP. A first interface of the first APP may be an interface displayed by the game APP, may be a video playing interface displayed by the video APP, or may be an interface of document content displayed by the document APP. This is not limited in this embodiment of this application.

S2002: Receive a fifth operation performed by the user, where the fifth operation is an operation of enabling a collaboration function of the first screen and the second screen (such as a collaboration function of the inner screen and the outer screen).

When the user needs to perform code scanning, the fifth operation of enabling the collaboration function of the inner screen and the outer screen may be performed, for example, the user taps an enable button of the collaboration function on a desktop, or slides down a pull-down taskbar on the inner screen and taps a control of the outer screen collaboration in the pull-down taskbar.

S2003: Display, in response to the fifth operation, the interface of the first APP displayed on the first screen on the second screen.

In this case, the electronic device may display, under triggering of the fifth operation of the user, the interface of the first APP displayed on the inner screen on the outer screen. When the user continues to operate the first APP on the inner screen, the outer screen may continue to follow the inner screen to display the interface of the first APP displayed on the inner screen. For example, when the inner screen displays a first interface, that is, thumbnails of pictures in a gallery, the outer screen displays the thumbnails of the pictures in the gallery displayed on the inner screen if the user performs the fifth operation. In this case, if the user taps one of the pictures on the inner screen to display an enlarged picture of the picture, the outer screen synchronously displays the enlarged picture of the picture displayed on the inner screen.

In the embodiment shown in FIG. 20, when the user performs the fifth operation, the electronic device may enable the collaboration function of the inner screen and the outer screen, to enable the outer screen to display content displayed on the inner screen, so that the interface of the first APP can be displayed to another user for viewing without a need to flip over the electronic device, so as to avoid inconvenience caused by flipping over the electronic device to share the screen, make screen sharing more convenient, and improve user experience of sharing screen.

In some embodiments, the fifth operation is an operation of sliding down on the first screen to enable the pull-down taskbar, tapping the control of the outer screen collaboration in the pull-down taskbar, and selecting asynchronous collaboration in a pop-up selection window of the outer screen collaboration. That is, when the user slides down from the top of the inner screen, the pull-down taskbar can be pulled out. The pull-down taskbar includes the control of the outer screen collaboration. When the user taps the control of the outer screen collaboration or taps a menu button of the control of the outer screen collaboration, the inner screen can pop up the selection window of the outer screen collaboration. The selection window of the outer screen collaboration may include a control of the asynchronous collaboration. When the user taps the control of the asynchronous collaboration, the electronic device enables the asynchronous collaboration mode of the collaboration function. Optionally, the fifth operation is an operation of sliding down on the first screen to enable the pull-down taskbar, tapping the control of the outer screen collaboration in the pull-down taskbar, and selecting the asynchronous collaboration in a pop-up selection window of the outer screen collaboration. That is, when the user slides down from the top of the inner screen, the pull-down taskbar can be pulled out. The pull-down taskbar includes the control of the outer screen collaboration. When the user taps the control of the outer screen collaboration or taps a menu button of the control of the outer screen collaboration, the inner screen can pop up the selection window of the outer screen collaboration. The selection window of the outer screen collaboration may further include a control of mirror collaboration. When the user taps the control of the mirror collaboration, the electronic device enables a mirror collaboration mode of a collaboration function. The user can select different modes of the collaboration function as required to adapt to the current usage scenario.

In some embodiments, the electronic device may also receive a sixth operation performed by the user to enable a second APP on the inner screen when a mode of collaboration function is the asynchronous collaboration mode. In response to the sixth operation, the electronic device displays an interface of the second APP on the inner screen, and simultaneously displays the interface of the first APP in a form of a floating window on the inner screen. When the user enables the collaboration function, if the mode of the asynchronous collaboration is selected, the outer screen can display content that is not identical with the content on the inner screen. That is, if the user enables the asynchronous collaboration mode when the interface of the first APP is displayed on the inner screen, the interface of the second APP is displayed on the inner screen when the user operates on the inner screen to enable the second APP, that is, performs the sixth operation. In this case, the outer screen still displays the interface of the first APP, and the interface of the first APP may be displayed in a floating window on the inner screen, to prompt the user with content displayed on the outer screen. In this embodiment, after the collaboration function of the asynchronous collaboration mode is enabled, the interface display of the first APP can be maintained to display on the outer screen, and the user can use the second APP on the inner screen. In addition, the user can monitor a presentation status of the first APP by using the interface of the first APP displayed on a floating window on the inner screen, so that screen sharing forms are richer, to enrich functions of the electronic device, facilitate use of the user, and improve user experience.

The sixth operation of enabling the second APP performed by the user may be an operation performed on the inner screen, the user first taps "Home" button to exit the interface of the first APP and return to the desktop, and then taps an icon of the second APP from the desktop to enable the second APP. Alternatively, in the sixth operation, the user may enable a side sidebar by sliding a distance from a side of the inner screen toward the middle of the inner screen and pausing in the interface of the first APP, and then tap an icon of the second APP in the side sidebar to enable the second APP.

In some embodiments, the electronic device may also receive a seventh operation performed by the user to operate the first APP on the inner screen when a mode of collaboration function is the mirror collaboration mode. In response to the seventh operation, the electronic device switches the interface of the first APP to display content indicated by the seventh operation, and synchronously displays the content indicated by the seventh operation on the outer screen, so that the inner screen and the outer screen display the same content. The seventh operation may be an operation of arbitrarily switching an interface of the first APP. That is, when the user enables the collaboration function, if the mirror collaboration mode is selected, the outer screen can display content that is the same as the content on the inner screen. In this embodiment, after a collaboration function of a mirror collaboration mode is enabled, the user can maintain a same interface between the outer screen and the inner screen to implement screen sharing, so as to avoid operation inconvenience caused by flipping over the electronic device due to a same screen viewed by a plurality of people. In this method, screen sharing is more convenient, and user experience is improved.

In some embodiments, the first APP is any one of a gallery APP, a video APP, and a document APP. The user can share a gallery APP interface, a video APP interface, a document APP interface, and the like to the outer screen by enabling the collaboration function of the inner screen and the outer screen, to help the user share a picture, a video, a document, and the like.

In some embodiments, the second APP is a camera APP when the first APP is a video APP. When a parent needs to take a picture for a child and is worried that inattention of the child affects a shooting effect, the parent can enable the video APP, and enable the asynchronous collaboration mode, to share a video APP interface to the outer screen to attract attention of the child. Then the parent enables the camera APP for shooting. This ensures that the attention of the child can be directed towards a shooting electronic device, so that the user can shoot the child easily and the shooting effect is ensured.

The foregoing describes the examples of the screen display method provided in this application in detail. It may be understood that, to implement the foregoing functions, the corresponding apparatus includes a corresponding hardware structure and/or a software module for performing each function. A person skilled in the art should be easily aware that, units and algorithms steps in the examples described with reference to the embodiments disclosed in this specification may be implemented in a form of hardware or in a form of a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the foregoing screen display apparatus may be divided into function modules based on the foregoing method examples. For example, each function module may be obtained through division for a function, or two or more functions may be integrated into one module. The integrated module may be implemented in a form of hardware, or may be implemented in a form of a software function module. It should be noted that module division in this application is an example, and is merely logical function division. In actual implementation, there may be another division manner.

FIG. 21 is a schematic diagram of a structure of a screen display apparatus according to this application. An apparatus 2100 is applied to an electronic device, the electronic device includes a first screen and a second screen, and the first screen and the second screen are respectively disposed on two opposite sides of the electronic device. For example, the electronic device includes an inner screen and an outer screen. The apparatus 2100 includes:

a first receiving module 2101, configured to receive a first operation performed by a user; and a first display module 2102, configured to display a first interface on the first screen in response to the first operation, where the first interface includes a first control.

The first receiving module 2101 is further configured to receive a second operation performed by the user on the first control.

The first display module 2102 is further configured to display, in response to the second operation, a second interface corresponding to the first control on the second screen.

In some embodiments, a second display module 2103 is further included, and is configured to display a third interface on the first screen, where the third interface is an interface of a first APP.

The first receiving module 2101 is specifically configured to receive the first operation when the first screen displays the third interface.

In some embodiments, the first APP is any one of a browser APP, a video APP, a game APP, a conference APP, a document APP, and a video call APP.

In some embodiments, the first operation is an operation of sliding down on the first screen to enable a pull-down taskbar and tapping a control of a quick service in the pull-down taskbar.

In some embodiments, the first operation is an operation of double-tapping the second screen.

In some embodiments, the first interface includes at least one of a control of the payment code, a control of the transport code, and a control of the personal health code.

In some embodiments, the first interface is a window of the quick service, and the first receiving module 2101 is further configured to receive a third operation performed by the user, where the third operation is an operation of tapping a menu control on the first interface.

The second display module 2103 is further configured to display an APP management list on the first screen in response to the third operation, where the APP management list includes icons of a plurality of APPs supporting the quick service and a plurality of state buttons, and the icons of the plurality of APPs supporting the quick service are in an one-to-one correspondence with the plurality of state buttons.

The first receiving module 2101 is further configured to receive a fourth operation performed by the user, where the fourth operation is an operation performed on a target state button, and the target state button is any one of the state buttons.

The second display module 2103 is further configured to, in response to the fourth operation, add or delete an icon of an APP that supports the quick service and that corresponds to the target state button in the window of the quick service.

Figure 22:
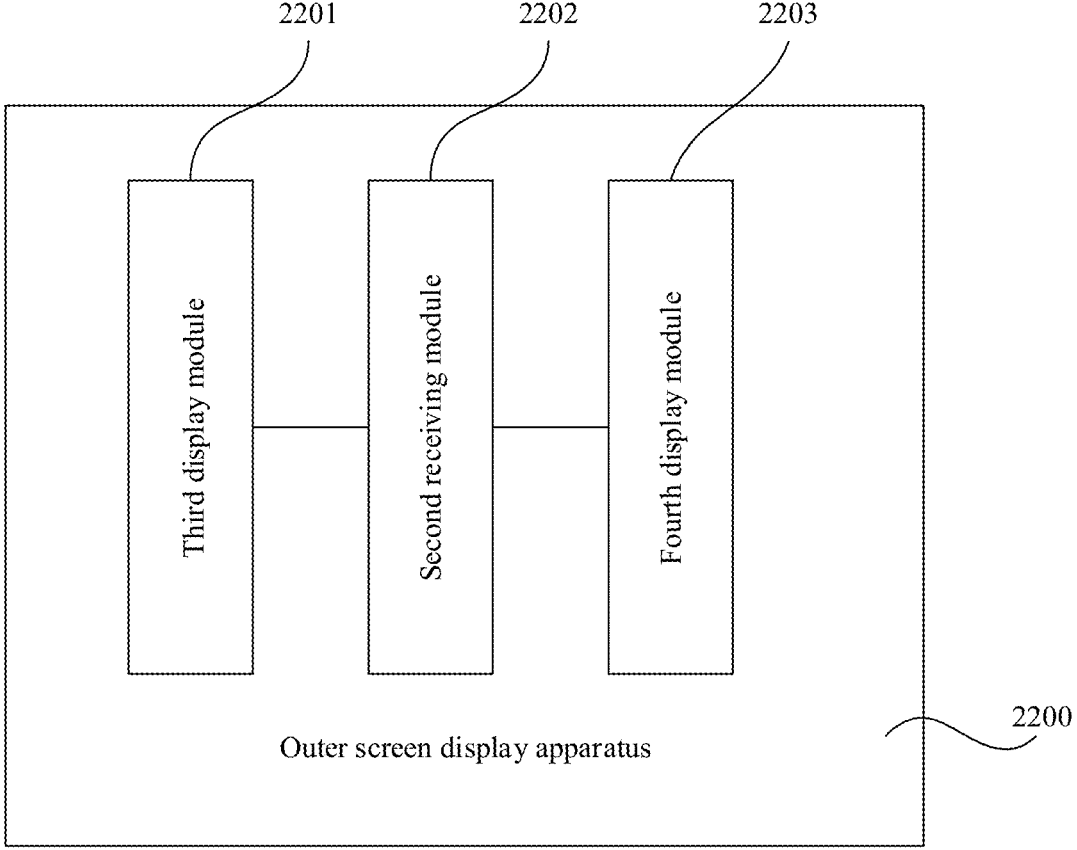
FIG. 22 is a schematic diagram of a structure of another example screen display apparatus according to an embodiment of this application.

FIG. 22 is a schematic diagram of a structure of a screen display apparatus according to this application. An apparatus 2200 is applied to an electronic device, the electronic device includes a first screen and a second screen, and the first screen and the second screen are respectively disposed on two opposite sides of the electronic device. For example, the electronic device includes an inner screen and an outer screen. The apparatus 2200 includes:

a third display module 2201, configured to display a first interface on the first screen, where the first interface is one of the following interface: a lock screen interface, an AOD interface, a desktop, and an interface of a first APP;

a second receiving module 2202, configured to receive a fifth operation performed by a user, where the fifth operation is an operation of enabling a collaboration function of the first screen and the outer screen; and a fourth display module 2202, configured to display the interface of the first APP on the second screen in response to the fifth operation.

In some embodiments, when a mode of the collaboration function is an asynchronous collaboration mode, the second receiving module 2202 is further configured to receive a sixth operation performed by the user, and the sixth operation is an operation of enabling a second APP on the first screen.

The third display module 2201 is further configured to: in response to the sixth operation, display an interface of the second APP on the first screen, and display the interface of the first APP in a form of a floating window on the first screen.

In some embodiments, the fifth operation is an operation of sliding down on the first screen to enable the pull-down taskbar, tapping a control of outer screen collaboration in the pull-down taskbar, and selecting asynchronous collaboration in a pop-up selection window of the outer screen collaboration.

In some embodiments, the sixth operation is an operation that is performed on the first screen for exiting the interface of the first APP and enabling the second APP from the desktop; or, an operation that is performed on the first screen for invoking a sidebar and tapping an icon of the second APP in the sidebar.

In some embodiments, when a mode of the collaboration function is a mirror collaboration mode, the second receiving module 2202 is further configured to receive a seventh operation performed by the user, where the seventh operation is an operation that is performed on the second APP on the first screen.

The third display module 2201 is further configured to display, in response to the seventh operation, content indicated by the seventh operation on the first screen.

The fourth display module 2202 is further configured to display, in response to the seventh operation, content indicated by the seventh operation on the second screen.

In some embodiments, the fifth operation is an operation of sliding down on the first screen to enable the pull-down taskbar, tapping a control of outer screen collaboration in the pull-down taskbar, and selecting mirror collaboration in a pop-up selection window of the outer screen collaboration.

In some embodiments, the first APP is any one of a gallery APP, a video APP, and a document APP.

In some embodiments, the second APP is a camera APP when the first APP is a video APP.

For a specific manner in which the apparatus 2100 and the apparatus 2200 perform the screen display method and resulting beneficial effects, reference may be made to related descriptions in the method embodiment. Details are not described herein again.

An embodiment of this application further provides an electronic device, including the processor. The electronic device provided in this embodiment may be the terminal device 100 as shown in FIG. 1, and the terminal device 100 is configured to perform the foregoing screen display method. When an integrated unit is used, the terminal device may include a processing module, a storage module, and a communication module. The processing module may be configured to control and manage an action of the terminal device, for example, may be configured to support the terminal device in performing steps performed by a display unit, a detection unit, and a processing unit. The storage module may be configured to support the terminal device in storing program code, data, and the like. The communication module may be configured to support communication between the terminal device and another device.

The processing module may be a processor or a controller. The processing module may implement or execute various example logical blocks, modules, and circuits described with reference to content disclosed in this application. The processor may alternatively be a combination, for example, a combination including one or more microprocessors or a combination of digital signal processing (digital signal processing. DSP) and a microprocessor, for implementing a computing function. The storage module may be a memory. The communication module may specifically be a radio frequency circuit, a Bluetooth chip, a Wi-Fi chip, or another device that interacts with another terminal device.

In an embodiment, when the processing module is a processor and the storage module is a memory, the terminal device in this embodiment may be a device be of the structure shown in FIG. 1.

An embodiment of this application further provides a computer-readable medium. The computer-readable medium stores a computer program, and when the computer program is executed by a processor, the processor is enabled to perform methods according to any one of the foregoing embodiments.

An embodiment of this application further provides a computer program product. When the computer program product is run on a computer, the computer is enabled to perform the foregoing related steps, so as to implement the screen display method in the foregoing embodiment.

The electronic device, computer-readable storage medium, and computer program product provided in the embodiments are all configured to perform the corresponding method provided above. Therefore, for beneficial effects that can be achieved, reference may be made to the beneficial effects in the corresponding method provided above, and details are not described herein again.

In embodiments provided in this application, it should be understood that the disclosed apparatus and method may be implemented in other manners. For example, the described apparatus embodiment is merely an example. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, or the indirect couplings or communication connections between the apparatuses or units. The replaced units may or may not be physically separate, and parts displayed as units may or may not be physical units, that is, may be located in one position, or may be distributed in a plurality of different positions. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A screen display method, applied to an electronic device, wherein the electronic device comprises a first screen and a second screen, the first screen and the second screen are respectively disposed on two opposite sides of the electronic device, and the method comprises:

receiving, with the electronic device in an unfolded state to expose both the first screen and the second screen, a first operation performed by a user;

displaying a first interface on the first screen and the second screen in response to the first operation, wherein the first interface comprises a first control and an operation authority of the second screen is deactivated to prevent touch input on the second screen;

receiving a second operation performed by the user on the first control;

displaying, in response to the second operation, a second interface corresponding to the first control on the second screen;

displaying a third interface on the first screen, wherein the third interface is one of the following interfaces: a lock screen interface, an always on display (AOD) interface, a desktop, and an interface of a first application (APP);

receiving a fifth operation performed by a user, wherein the fifth operation is an operation of enabling a collaboration function of the first screen and the second screen; and in response to the fifth operation, displaying the interface of the first APP displayed on the first screen on the second screen.

2. The method according to claim 1, wherein the receiving the first operation performed by a user comprises:

receiving the first operation when a third interface is displayed on the first screen, wherein the third interface is one of the following interfaces: a lock screen interface, an always on display (AOD) interface, a desktop, and an interface of a first application (APP).

3. The method according to claim 2, wherein the first APP is any one of a browser APP, a video APP, a game APP, a conference APP, a document APP, and a video call APP.

4. The method according to claim 1, wherein the first operation is an operation of sliding down on the first screen to enable a pull-down taskbar and tapping a control of a quick service in the pull-down taskbar.

5. The method according to claim 1, wherein the first interface comprises at least one of a control of a payment code, a control of a transport code, and a control of a personal health code.

6. The method according to claim 4, wherein the first interface is a window of the quick service, and the method further comprises:

receiving a third operation performed by the user, wherein the third operation is an operation of tapping a second control on the first interface;

displaying an APP management list on the first screen in response to the third operation, wherein the APP management list comprises icons of a plurality of APPs supporting quick services and a plurality of state buttons, and the icons of the plurality of APPs supporting quick services are in an one-to-one correspondence with the plurality of state buttons;

receiving a fourth operation performed by the user, wherein the fourth operation is an operation performed on a target state button, and the target state button is any one of the state buttons; and in response to the fourth operation, adding or deleting an icon of an APP that supports the quick service and that corresponds to the target state button in the window of the quick service.

7. A screen display method, applied to an electronic device, wherein the electronic device comprises a first screen and a second screen, the first screen and the second screen are respectively disposed on two opposite sides of the electronic device, and the method comprises:

displaying a third interface on the first screen, wherein the third interface is one of the following interfaces: a lock screen interface, an always on display (AOD) interface, a desktop, and an interface of a first application (APP);

receiving a fifth operation performed by a user, wherein the fifth operation is an operation of enabling a collaboration function of the first screen and the second screen; and in response to the fifth operation, displaying the interface of the first APP displayed on the first screen on the second screen; and deactivating an operation authority of the second screen to prevent touch input on the second screen when the electric device is an unfolded state to expose both the first screen and the second screen;

wherein when a mode of the collaboration function is a mirror collaboration mode, the method further comprises:

receiving a seventh operation performed by the user, wherein the seventh operation is an operation that is performed on the first APP on the first screen; and in response to the seventh operation, synchronously displaying, content indicated by the seventh operation on the first screen and the second screen.

8. The method according to claim 7, wherein when a mode of the collaboration function is an asynchronous collaboration mode, the method further comprises:

receiving a sixth operation performed by the user, wherein the sixth operation is an operation of enabling a second APP on the first screen; and in response to the sixth operation, displaying an interface of the second APP on the first screen, and displaying the interface of the first APP in a form of a floating window on the first screen.

9. The method according to claim 8, wherein the fifth operation is an operation of sliding down on the first screen to enable a pull-down taskbar, tapping a control of outer screen collaboration in the pull-down taskbar, and selecting the asynchronous collaboration mode in a pop-up selection window of the outer screen collaboration.

10. The method according to claim 8, wherein the sixth operation is an operation that is performed on the first screen for exiting the interface of the first APP and enabling the second APP from the desktop; or, an operation that is performed on the first screen for invoking a sidebar and tapping an icon of the second APP in the sidebar.

11. The method according to claim 7, wherein the fifth operation is an operation of sliding down on the first screen to enable a pull-down taskbar, tapping a control of outer screen collaboration in the pull-down taskbar, and selecting the mirror collaboration mode in a pop-up selection window of the outer screen collaboration.

12. The method according to claim 7, wherein the first APP is any one of a gallery APP, a video APP, and a document APP.

13. The method according to claim 8, wherein the second APP is a camera APP when the first APP is a video APP.

14. An electronic device, wherein the electronic device comprises a first screen and a second screen, the first screen and the second screen are respectively disposed on two opposite sides of the electronic device, comprising: a processor, a memory and an interface, wherein the processor, the memory, and the interface respectively match with each other, so that the electronic device performs the following steps:

receiving, with the electronic device in an unfolded state to expose both the first screen and the second screen, a first operation performed by a user;

displaying a first interface on the first screen and the second screen in response to the first operation, wherein the first interface comprises a first control and an operation authority of the second screen is deactivated to prevent touch input on the second screen;

receiving a second operation performed by the user on the first control;

displaying, in response to the second operation, a second interface corresponding to the first control on the second screen;

displaying a third interface on the first screen, wherein the third interface is one of the following interfaces: a lock screen interface, an always on display (AOD) interface, a desktop, and an interface of a first application (APP);

receiving a fifth operation performed by a user, wherein the fifth operation is an operation of enabling a collaboration function of the first screen and the second screen; and in response to the fifth operation, displaying the interface of the first APP displayed on the first screen on the second screen.

15. The method according to claim 1, wherein a software of the electronic device comprises an application framework layer;

the application framework layer comprises a first application programming interface (API) and a second API;

the first API is an interface for adding a window display; and the second API is an interface for registering a collaboration service;

wherein the second interface is an user interface of an application registered in the electronic device by using the second API.

16. The method according to claim 7, wherein a software of the electronic device comprises an application framework layer;

the application framework layer comprises a first application programming interface (API) and a second API;

the first API is an interface for adding a window display; and the second API is an interface for registering a collaboration service;

wherein the first APP is registered in the electronic device by using the second API.

17. The method according to claim 1, wherein when a mode of the collaboration function is an asynchronous collaboration mode, the method further comprises:

receiving a sixth operation performed by the user, wherein the sixth operation is an operation of enabling a second APP on the first screen; and in response to the sixth operation, displaying an interface of the second APP on the first screen, and displaying the interface of the first APP in a form of a floating window on the first screen.

18. The method according to claim 17, wherein the second APP is a camera APP when the first APP is a video APP.

19. The electronic device according to claim 14, wherein the first operation is an operation of sliding down on the first screen to enable a pull-down taskbar and tapping a control of a quick service in the pull-down taskbar.

20. The electronic device according to claim 14, wherein the first interface comprises at least one of a control of a payment code, a control of a transport code, and a control of a personal health code.

* * * * *